United States Patent
Youngberg et al.

(10) Patent No.: US 12,229,255 B2
(45) Date of Patent: *Feb. 18, 2025

(54) METHODS AND SYSTEMS FOR MULTI-TOOL ORCHESTRATION

(71) Applicant: Capital One Services, LLC, McLean, VA (US)

(72) Inventors: Adam Youngberg, Allen, TX (US); David Filbey, Plano, TX (US); Kishore Prabakaran Fernando, Little Elm, TX (US); Stephen Kent, Fairfax, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 357 days.

This patent is subject to a terminal disclaimer.

(21) Appl. No.: 17/740,110

(22) Filed: May 9, 2022

(65) Prior Publication Data

US 2022/0261480 A1 Aug. 18, 2022

Related U.S. Application Data

(63) Continuation-in-part of application No. 17/208,658, filed on Mar. 22, 2021, now Pat. No. 11,651,084, and
(Continued)

(51) Int. Cl.
*G06F 21/55* (2013.01)
*G06F 9/445* (2018.01)
(Continued)

(52) U.S. Cl.
CPC ........ *G06F 21/554* (2013.01); *G06F 9/44536* (2013.01); *G06F 21/105* (2013.01);
(Continued)

(58) Field of Classification Search
CPC .................................................. G06F 21/554
See application file for complete search history.

(56) References Cited

U.S. PATENT DOCUMENTS 6,944,775 B2   9/2005   Barton et al.
7,207,065 B2   4/2007   Chess et al.
(Continued)

FOREIGN PATENT DOCUMENTS

WO   2016018289 A1   2/2016

OTHER PUBLICATIONS

Codeburner—One static analysis tool to rule them all; http://groupon.github.io/codeburner/; Apr. 21, 2016 (Year: 2016).
(Continued)

*Primary Examiner* — Simon P Kanaan
(74) *Attorney, Agent, or Firm* — TROUTMAN PEPPER HAMILTON SANDERS LLP; Christopher J. Forstner; John A. Morrissett

(57) ABSTRACT

A system for performing code security scan includes a non-transitory computer readable medium and a processor. The non-transitory computer readable medium stores a plurality of identifiers each identifying a software security analysis tool of one of several categories, including SAST, DAST and OSA tools. The processor receives an identification of code to be scanned. The processor selects at least two identifiers from the plurality of identifiers. The at least two identifiers identify at least two select software security analysis tools for execution on the identified code. The processor receives an execution result from each select software security analysis tool after performing execution on the identified code. The processor aggregates the execution result from each select software security analysis tool. A user interface displays an aggregation of the execution result from each select software security analysis tool.

20 Claims, 24 Drawing Sheets

Related U.S. Application Data a continuation-in-part of application No. 17/181,600, filed on Feb. 22, 2021, now Pat. No. 11,651,083, and a continuation-in-part of application No. 16/718,777, filed on Dec. 18, 2019, now Pat. No. 11,328,058, said application No. 17/208,658 is a continuation of application No. 16/593,412, filed on Oct. 4, 2019, now Pat. No. 10,956,579, said application No. 17/181,600 is a continuation of application No. 16/551,563, filed on Aug. 26, 2019, now Pat. No. 10,929,543, which is a continuation of application No. 16/177,236, filed on Oct. 31, 2018, now Pat. No. 10,395,041, said application No. 16/593,412 is a continuation of application No. 16/177,275, filed on Oct. 31, 2018, now Pat. No. 10,467,419, said application No. 16/718,777 is a continuation of application No. 16/177,178, filed on Oct. 31, 2018, now Pat. No. 10,534,912.

(51) Int. Cl.
  G06F 21/10 (2013.01)
  G06F 21/56 (2013.01)
  G06F 21/57 (2013.01)
  G06F 9/52 (2006.01)

(52) U.S. Cl.
  CPC ......... *G06F 21/562* (2013.01); *G06F 21/563* (2013.01); *G06F 21/566* (2013.01); *G06F 21/577* (2013.01); *G06F 9/52* (2013.01); *G06F 11/3604* (2013.01); *G06F 2221/033* (2013.01)

(56) References Cited

U.S. PATENT DOCUMENTS

| | | | |
|---|---|---|---|
| 8,661,547 B1 | 2/2014 | Kononov et al. | |
| 9,208,312 B2 | 12/2015 | Wiseman et al. | |
| 9,264,395 B1 | 2/2016 | Stamos | |
| 9,418,230 B2 | 8/2016 | Archer et al. | |
| 9,501,345 B1 | 11/2016 | Lietz et al. | |
| 9,544,327 B1 | 1/2017 | Sharma et al. | |
| 9,589,560 B1 | 3/2017 | Vitaladevuni et al. | |
| 9,633,182 B2 | 4/2017 | Scapa | |
| 9,749,349 B1 | 8/2017 | Czarny et al. | |
| 9,781,148 B2 * | 10/2017 | Mahaffey | H04W 12/02 |
| 9,846,781 B2 | 12/2017 | Kejriwal et al. | |
| 9,996,693 B2 | 6/2018 | Sun et al. | |
| 10,116,681 B2 | 10/2018 | Cornell et al. | |
| 10,581,897 B1 | 3/2020 | Natanzon et al. | |
| 2003/0051154 A1 | 3/2003 | Barton et al. | |
| 2006/0124726 A1 | 6/2006 | Kotovich et al. | |
| 2007/0162761 A1 | 7/2007 | Davis et al. | |
| 2008/0235141 A1 | 9/2008 | Hilerio et al. | |
| 2009/0024663 A1 | 1/2009 | McGovern | |
| 2009/0044024 A1 | 2/2009 | Oberheide et al. | |
| 2009/0249488 A1 | 10/2009 | Robinson et al. | |
| 2010/0083240 A1 | 4/2010 | Siman | |
| 2010/0218256 A1 | 8/2010 | Thomas et al. | |
| 2010/0281248 A1 | 11/2010 | Lockhart et al. | |
| 2010/0333069 A1 | 12/2010 | Chandra et al. | |
| 2011/0231361 A1 | 9/2011 | Patchava et al. | |
| 2012/0054857 A1 | 3/2012 | Bisso et al. | |
| 2012/0084859 A1 | 4/2012 | Radinsky et al. | |
| 2013/0097701 A1 | 4/2013 | Moyle et al. | |
| 2013/0111592 A1 | 5/2013 | Zhu et al. | |
| 2013/0227695 A1 | 8/2013 | Shankar | |
| 2013/0247167 A1 | 9/2013 | Paul et al. | |
| 2013/0312102 A1 | 11/2013 | Brake et al. | |
| 2014/0181975 A1 | 6/2014 | Spernow et al. | |
| 2014/0304818 A1 | 10/2014 | Li | |
| 2014/0337982 A1 | 11/2014 | Crosby et al. | |
| 2015/0020203 A1 | 1/2015 | Xie et al. | |
| 2015/0052606 A1 | 2/2015 | Romero et al. | |
| 2015/0096035 A1 | 4/2015 | Beskrovny et al. | |
| 2015/0113332 A1 | 4/2015 | Fu | |
| 2015/0180883 A1 | 6/2015 | Aktas et al. | |
| 2015/0215332 A1 | 7/2015 | Curcic et al. | |
| 2015/0237063 A1 | 8/2015 | Cotton et al. | |
| 2015/0244737 A1 | 8/2015 | Siman | |
| 2015/0309813 A1 | 10/2015 | Patel | |
| 2015/0356280 A1 | 12/2015 | Lori | |
| 2016/0092185 A1 | 3/2016 | Botti et al. | |
| 2016/0099963 A1 | 4/2016 | Mahaffey et al. | |
| 2016/0202972 A1 | 7/2016 | Sass et al. | |
| 2016/0275116 A1 | 9/2016 | Shi et al. | |
| 2016/0292066 A1 | 10/2016 | Stevens et al. | |
| 2016/0373480 A1 | 12/2016 | Sridhar | |
| 2017/0091459 A1 | 3/2017 | Childress et al. | |
| 2017/0169228 A1 | 6/2017 | Brucker et al. | |
| 2017/0212829 A1 | 7/2017 | Bales et al. | |
| 2017/0244740 A1 | 8/2017 | Mahabir et al. | |
| 2017/0249143 A1 | 8/2017 | Sass et al. | |
| 2017/0270303 A1 | 9/2017 | Roichman et al. | |
| 2018/0007077 A1 | 1/2018 | Boia et al. | |
| 2018/0025154 A1 | 1/2018 | Cornell et al. | |
| 2018/0144127 A1 | 5/2018 | Duer et al. | |
| 2018/0157842 A1 | 6/2018 | Holz et al. | |
| 2018/0176245 A1 | 6/2018 | Cornell et al. | |
| 2018/0330102 A1 | 11/2018 | Siman et al. | |
| 2019/0005206 A1 | 1/2019 | Sahoo et al. | |
| 2019/0065833 A1 | 2/2019 | Wang et al. | |
| 2019/0102286 A1 | 4/2019 | Duer et al. | |
| 2019/0114435 A1 | 4/2019 | Bhalla et al. | |
| 2019/0141075 A1 | 5/2019 | Gay et al. | |
| 2019/0171550 A1 | 6/2019 | Eizenman et al. | |
| 2019/0180035 A1 | 6/2019 | Esperer et al. | |
| 2019/0180039 A1 | 6/2019 | Considine et al. | |
| 2019/0205542 A1 | 7/2019 | Kao et al. | |
| 2019/0325145 A1 | 10/2019 | Siman et al. | |
| 2019/0354686 A1 | 11/2019 | Czaplewski et al. | |

OTHER PUBLICATIONS

SCALe: A Tool for Managing Output from Static Analysis Tools; https://insights.sei.cmu.edu/sei_blog/2018/09/scale-a-tool-for-managing-output-from-static-code-analyzers.html; Sep. 24, 2018 (Year: 2018).

\* cited by examiner

METHODS AND SYSTEMS FOR MULTI-TOOL ORCHESTRATION

CROSS-REFERENCE TO RELATED APPLICATIONS

This application is a continuation-in-part of, and claims priority under 35 U.S.C. § 120 to, U.S. patent application Ser. No. 16/718,777, filed Dec. 18, 2019, which is a continuation of U.S. patent application Ser. No. 16/177,178, now U.S. Pat. No. 10,534,912, filed Oct. 31, 2018, the entire contents of each are fully incorporated herein by reference.

This application is also a continuation-in-part of, and claims priority under 35 U.S.C. § 120 to, U.S. patent application Ser. No. 17/181,600, filed Feb. 22, 2021, which is a continuation of U.S. patent application Ser. No. 16/551,563, now U.S. Pat. No. 10,929,543, filed on Aug. 26, 2019, which is a continuation of U.S. patent application Ser. No. 16/177,236, now U.S. Pat. No. 10,395,041, filed Oct. 31, 2018, the entire contents of each are fully incorporated herein by reference.

This application also a continuation-in-part of, and claims priority under 35 U.S.C. § 120 to, U.S. patent application Ser. No. 17/208,658, filed Mar. 22, 2021, which is a continuation of U.S. patent application Ser. No. 16/593,412, now U.S. Pat. No. 10,956,579, filed Oct. 4, 2019, which is a continuation of U.S. patent application Ser. No. 16/177,275, now U.S. Pat. No. 10,467,419, filed Oct. 31, 2018, the entire contents of each are fully incorporated herein by reference.

This disclosure incorporates by reference U.S. patent application Ser. No. 16/177,236, filed Oct. 31, 2018, entitled "Methods and Systems for Reducing False Positive Findings", U.S. patent application Ser. No. 16/177,275, filed Oct. 31, 2018, entitled "Methods and Systems for Determining Software Risk Scores," and U.S. patent application Ser. No. 16/177,299, filed Oct. 31, 2018, entitled "Methods and Systems for De-duplication of Findings," the contents of which are incorporated by reference herein as if they were restated in full.

FIELD OF THE DISCLOSURE

The presently disclosed subject matter relates generally to orchestrating multiple software security analysis tools, more particularly, to systems and methods implementing an orchestration or abstraction layer to trigger and monitor scan activities, and receive scan results of multiple software security analysis tools.

BACKGROUND

Some existing tools provide a mechanism to retrieve scan results from software security testing tools, but do not have the ability to start scan activity or monitor the scan activity throughout the scan process. When multiple security testing tools are needed to perform scans, a user often became frustrated with the lack of orchestration of these tools. For instance, there is a lack of an intelligent mechanism integrating and updating scan results obtained from different, independent, third party tools. The user had to separately manage each of these tools. As a result, the user had to spend most of time running tools, leaving a limited amount of time to interpret scan results.

In view of the foregoing, a need exists for an orchestration solution that automatically orchestrates multiple software security analysis tools, such as selectively activates and monitors their scans, receives scan results, aggregates and updates scan results, and provides easy visualization of the aggregate scan results. Embodiments of the present disclosure are directed to this and other considerations.

BRIEF SUMMARY

Aspects of the disclosed technology include systems and methods for performing or orchestrating a code security scan. Consistent with the disclosed embodiments, a system includes a non-transitory computer readable medium and a processor. The non-transitory computer readable medium stores a plurality of identifiers each identifying a software security analysis tool of one of the following categories: a first category of at least one software security analysis tool for performing Static Application Security Testing (SAST), a second category of at least one software security analysis tool for performing Dynamic Application Security Testing (DAST); and a third category of at least one software security analysis tool for performing Open Source Analysis (OSA). The processor receives an identification of code to be scanned. The processor selects at least two identifiers from the plurality of identifiers. The at least two identifiers identify at least two select software security analysis tools for execution on the identified code. The processor receives an execution result from each select software security analysis tool after performing execution on the identified code. The processor aggregates the execution result from each select software security analysis tool. The processor displays, in a user interface, an aggregation of the execution result from each select software security analysis tool.

Another aspect of the disclosed technology relates to a multi-tool security analysis system that includes one or more processors. The system also includes a memory in communication with the one or more processors and storing instructions. When executed by the one or more processors, the stored instructions are configured to cause the system to receive, from a host server via a real-time API, an analysis request comprising a software code identifier for software code to be analyzed and identification of two or more analysis tools comprising one or more SAST tools, one or more DAST tools, and one or more OSA tools. The analysis tools are presented on a multi-tool security analysis website associated with the host server. Responsive to the analysis request, the system activates execution of the two or more identified analysis tools to analyze the software code. The system aggregates an analysis output from each of the two or more identified analysis tools to create an aggregate result. The system provides, to the host server via the real-time API, the aggregate result for presentation on the multi-tool security analysis website.

A further aspect of the disclosed technology relates to a multi-tool security analysis system that includes one or more processors, and a memory in communication with the one or more processors and storing instructions. When executed by the one or more processors, the stored instructions are configured to cause the system to receive an analysis request comprising a software code identifier for software code to be analyzed and a user-selection of two or more analysis tools comprising one or more SAST tools, one or more DAST tools, and one or more OSA tools. The analysis tools are presented on a multi-tool security analysis website. Responsive to receiving the analysis request, the system directs the two or more identified analysis tools to analyze the software code. The system aggregates a vendor-specific output from each of the two or more identified analysis tools to create an aggregate result. The system provides the aggregate result for presentation on the multi-tool security analysis website.

Consistent with the disclosed embodiments, methods for performing orchestration on multiple software security analysis tools are disclosed.

Further features of the present disclosure, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, explain the principles of the disclosed technology. In the drawings:

FIG. 6 is an example screenshot of a graphical user interface of the orchestration system according to one aspect of the disclosed technology.

FIG. 8 is an additional example screenshot of the graphical user interface of the orchestration system according to one aspect of the disclosed technology.

DETAILED DESCRIPTION

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified.

Multi-Tool Orchestration

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

Figure 1:
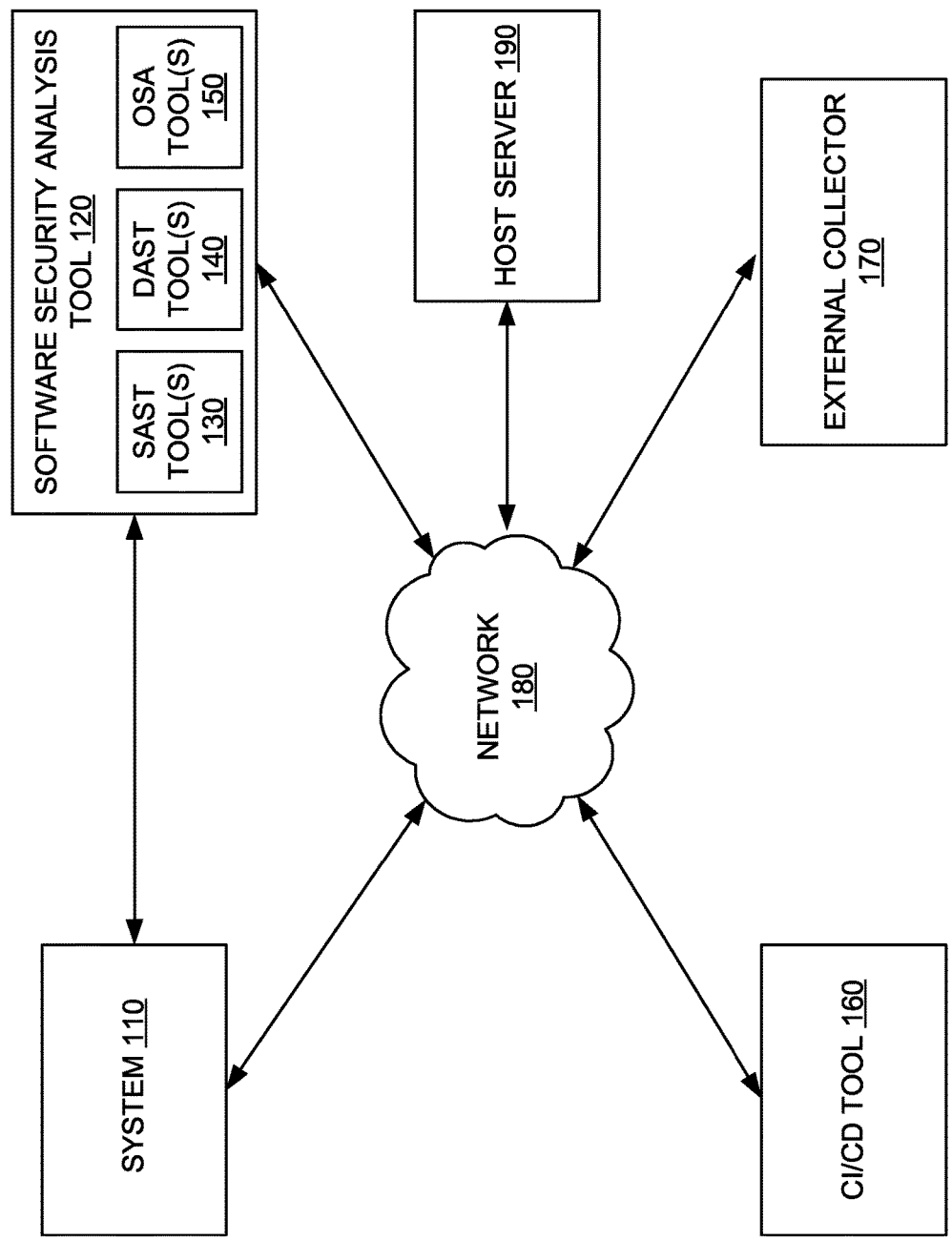
FIG. 1 is a diagram of an example environment that may be used to implement one or more embodiments of the present disclosure.

FIG. 1 shows an example environment 100 that may implement certain aspects of the present disclosure. The components and arrangements shown in FIG. 1 are not intended to limit the disclosed embodiments as the components used to implement the disclosed processes and features may vary. As shown in FIG. 1, in some implementations the environment 100 may include one or more of the following: one or more multi-tool orchestration systems 110, one or more software security analysis tools 120, one or more continuous integration, continuous delivery (CI/CD) tools 160, one or more external collectors 170, one or more networks 180, and one or more host servers 190.

The orchestration system 110 may act as an orchestration or abstraction layer for the software security analysis tools 120. The orchestration system 110 may interface with and collect information from various software security analysis tools 120 behind scenes. Acting as an abstraction layer on top of underlying interfaces for each software security analysis tool 120, the orchestration system 110 presents a simplified solution to orchestrate scan activities, track scan activity, and review results once scans are completed.

The software security analysis tools 120 may include one or more categories, such as a first category of one or more static application security testing (SAST) tools 130, a second category of one or more dynamic application security testing (DAST) tools 140, and a third category of one or more open source analysis (OSA) tools 150, among other possibilities.

Each software security analysis tool 120 of the first, second and third categories may be a standalone solution, a network-based client-server solution, a web-based solution, or a cloud-based solution, among other possibilities. Each software security analysis tool 120 may be provided by a different third party licensor or vendor, and thus each may be independent of each other. The SAST tools 130 may include Checkmarx™ and Fortify™, among other possibilities. The DAST tools 140 may include WebInspect™ and Contrast™, among other possibilities. The OSA tools 150 may include Whitesource™ and Blackduck™, among other possibilities.

The orchestration system 110 may orchestrate the multiple software security analysis tools 120 by selectively activating their scan functions, monitoring or tracking their scan activities throughout scan processes, and reviewing scan results once scans are completed.

Figure 2:
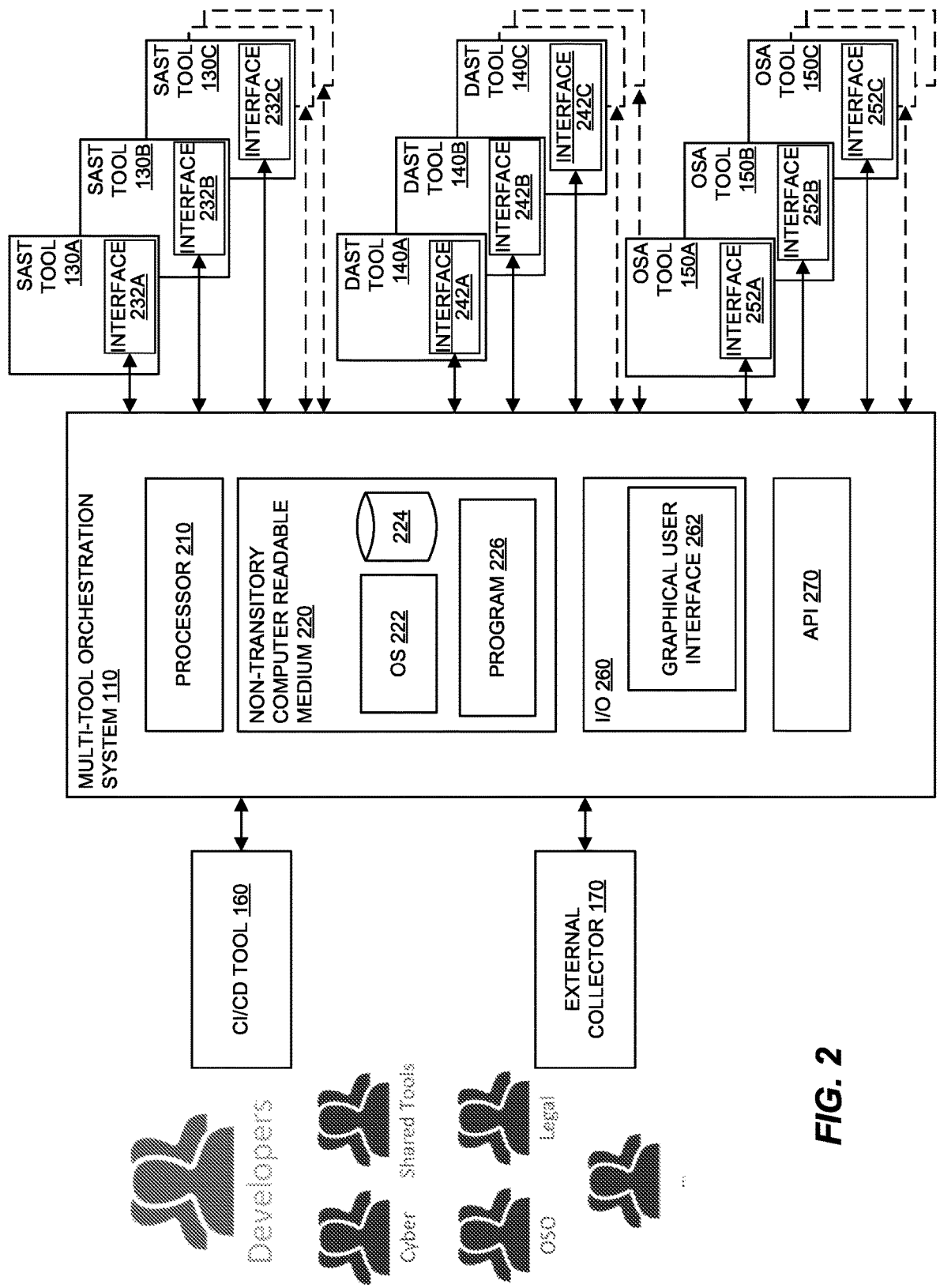
FIG. 2 is an example block diagram illustrating communications between a multi-tool orchestration system and multiple software security analysis tools according to one aspect of the disclosed technology.

Turning to FIG. 2, various users or interest groups, such as developers, lines of business, and executive stakeholders may use the orchestration system 110 to run multiple security backends on submitted code, including but not limited to, one or more SAST tools 130A-130C, one or more DAST tools 140A-140C, one or more OSA tools 150A-150C, among other possibilities.

Each tool may have a different interface or protocol. For example, SAST tools 130A-C, DAST tools 140A-C, and OSA tools 150A-C may have interfaces 232A-C, 242A-C and 252A-C, respectively. These tools may have different types of interfaces, including RESTful API, SOAP API, and a command line utility among other possibilities. Traditionally, a user needs to learn protocols of each tool. For instance, in a situation where a first tool has a RESTful API, a second tool has a SOAP API, and a third tool does not have an API but has a command line utility, the user needs to learn how to construct appropriate requests or parameters to execute each tool. With the orchestration system 110 of the example embodiments, the user is no longer involved with constructing requests or parameters required by the individual protocols of each tool.

The orchestration system 110 may serve as a single interface or a single end-point between the user and software security analysis tools 120. By serving as a single interface to access scan results of software security analysis tool 120, the orchestration system 110 may reduce complexity of integration and provide consistency when the user reviews scan results. By dealing with the orchestration system 110 alone, the user does not need to learn protocols of each software security analysis tool 120 and does not need to deal with separate interfaces such as APIs or command lines.

The orchestration system 110 may include one or more of the following: a processor 210, a non-transitory computer readable medium 220, an input/output ("I/O") device 260, and an application program interface (API) 270, among other possibilities. The I/O device 260 may include a graphical user interface 262.

The non-transitory computer readable medium 220 may store a plurality of identifiers. Each identifier may identify a software security analysis tool 120 orchestrated by the orchestration system 110. For example, the non-transitory computer readable medium 220 may store identifiers that identify each of SAST tools 130A-C, DAST tools 140A-C and OSA tools 150A-C. The non-transitory computer readable medium 220 may store information of historical scan activities performed by each software security analysis tool 120. The historical scan activities may be displayed in the graphical user interface 262 upon request. The non-transitory computer readable medium 220 may store status information of execution progress of each software security analysis tool 120. The execution progress of each software security analysis tool 120 may be displayed in the graphical user interface 262 upon request. The status information may include one of the following: completed, in progress and queued.

In some example embodiments, the orchestration system 110 does not rely on or expressly adopt any given taxonomy. For example, orchestration system 110 does not rely on common weakness enumeration (CWE) or vendor-established taxonomies. Instead, an example orchestration system 110 may have a unique internal taxonomy that reconciles scan results or findings generated by different software security analysis tools 120.

The orchestration system 110 may initiate scan activities on multiple software security analysis tools 120, and monitor scan activities performed by each tool from start to completion. As each software security analysis tool 120 completes its scan activity, the orchestration system 110 may receive its scan results, store the received scan results in the non-transitory computer readable medium 220, and wait for remaining software security analysis tools 120 to complete scans. The non-transitory computer readable medium 220 may store historical information associated with scan activity performed by each software security analysis tool 120, including but not limited to historical scan results.

The orchestration system 110 may aggregate or integrate scan results or findings provided by software security analysis tools 120 into a meaningful singular result, regardless of whether the software security analysis tools 120 are of the same or different categories. For example, the orchestration system 110 may orchestrate one or more SAST tools 130A-B and/or one or more DAST tools 140A-B, and aggregate their scan results into a single interface. The orchestration system 110 may bring together the scan results or findings, analyze them for common elements, and match them against an internally developed taxonomy. Each scan result or finding may be identified by a fingerprint. The orchestration system 110 may identify identical or similar findings by comparing their fingerprints. The algorithm may tolerate dissimilarities between scan results or findings, such as a change in line number of a particular finding.

The orchestration system 110 may consider historical scan activities. As the orchestration system 110 receives scan results from each software security analysis tool 120, the orchestration system 110 may update the aggregate scan result and provide an updated result as each scan is completed.

The orchestration system 110 may trigger multiple software security analysis tools 120 of the same category to start scan simultaneously or at predetermined timestamps. For example, the orchestration system 110 may instruct multiple SAST tools 130A-C to perform scans simultaneously or at predetermined timestamps. In one embodiment, for example, SAST tool 130A may be Checkmarx™, and SAST tool 130B may be Fortify™.

Also, the orchestration system 110 may trigger one or more software security analysis tools 120 of different categories to start scan simultaneously or at predetermined timestamps. For example, the orchestration system 110 may instruct multiple SAST tools 130A-B, and multiple OSA tools 150A-B to perform scan simultaneously or at predetermined timestamps. In some embodiments, for example, SAST tool 130A may be Checkmarx™, and SAST tool 130B may be Fortify™, while OSA tool 150A may be Whitesource™, and OSA tool 150B may be Blackduck™.

In one scenario, SAST tool 130A reports a scan result to the orchestration system 110, identifying an issue that may need to be resolved. To validate whether the issue has been resolved, the orchestration system 110 may not need to request the SAST tool 130A to perform the scan for a second time. Instead, the orchestration system 110 may wait for remaining tools to complete their scans. If one or more remaining tools report that the issue has been resolved, the orchestration system 110 may update the aggregate scan result.

The orchestration process may be automated. In one example, the orchestration system 110 may be plugged into one or more CI/CD tools 160 such that whenever code is checked in or a change is made to a particular software product, the orchestration system 110 may automatically initiate one or more SAST tools 130A-C, one or more DAST tools 140A-C or one or more OSA tools 150A-C to perform scan. Examples of the CI/CD tools 160 may include Jenkins™ and CircleCI™, among other possibilities.

In one example, the user may operate the orchestration system 110 through one or more external collectors 170. The external collectors 170 may communicate with the API 270 of the orchestration system 110. The external collectors 170 may include Hygieia™, an open source DevOps dashboard for visualizing a development pipeline.

In one example, the orchestration system 110 may rely on the graphical user interface 262 to interact with a user, such as receiving user inquiries, and providing information related to the software security analysis tools 120 and scan results to the user.

In one example, when the orchestration system 110 receives a scan request, for example, through the API 270, the orchestration system 110 may automatically trigger one or more software security analysis tools 120 of the same or different categories to start scans. The request may include a minimum level of information needed to selectively activate scan functions on the software security analysis tools 120. In some embodiments, the minimum level of information may be determined based on the selection of security analysis tools 120 accessible to orchestration system 110, as well as other product or enterprise considerations. The minimum level of information required of a scan request may thus be abstracted from various requirements and parameters of the various security analysis tools, so as to provide an efficient interface for user interaction.

In one example, the scan request received by the orchestration system 110 may include identification of code. The identification of code may include a directory indicating where the code is stored. Alternatively, the identification of code may include a zip code file. The scan request may identify the language in which the code is written, such as the primary language that the code is written in. The request may also include an identifier for which component within the system it belongs to. After receiving the scan request, the orchestration system 110 may send instructions to interfaces, such as APIs or command line utilities, of the various software security analysis tools 120. The various software security analysis tools 120 may be selectively determined based on the request and/or the code.

Some software security analysis tools 120 may require extra information beyond the scope of the scan request to start execution, such as a line count and secondary language of the code. Although such extra information is not present (or requested of a user) in the scan request received by the orchestration system 110, the orchestration system 110 may independently determine and provide such extra information to the software security analysis tools 120, without user intervention. As each software security analysis tool 120 is added to the orchestration system 110, the orchestration system 110 may store a requisite set of information to execute the software security analysis tool 120. Upon receiving a scan request, the orchestration system 110 may decide all necessary information that is needed to execute the software security analysis tool 120. For example, to scan a software project that contains specific code, a software security analysis tool 120 may require an identification of the code language to perform scan. The orchestration system 110 may independently, without user intervention, inspect the code, determine the code language, and provide the code language to the software security analysis tool 120.

Traditionally, when an organization wants to transition from one security tool to another, or swaps out one or more security tools, the organization may need to retool. Such efforts are saved by the orchestration system 110. With the orchestration system 110, backend tools may be added to or removed from the orchestration system 110 in a process transparent to the user or internal customer of the organization.

Figure 3:
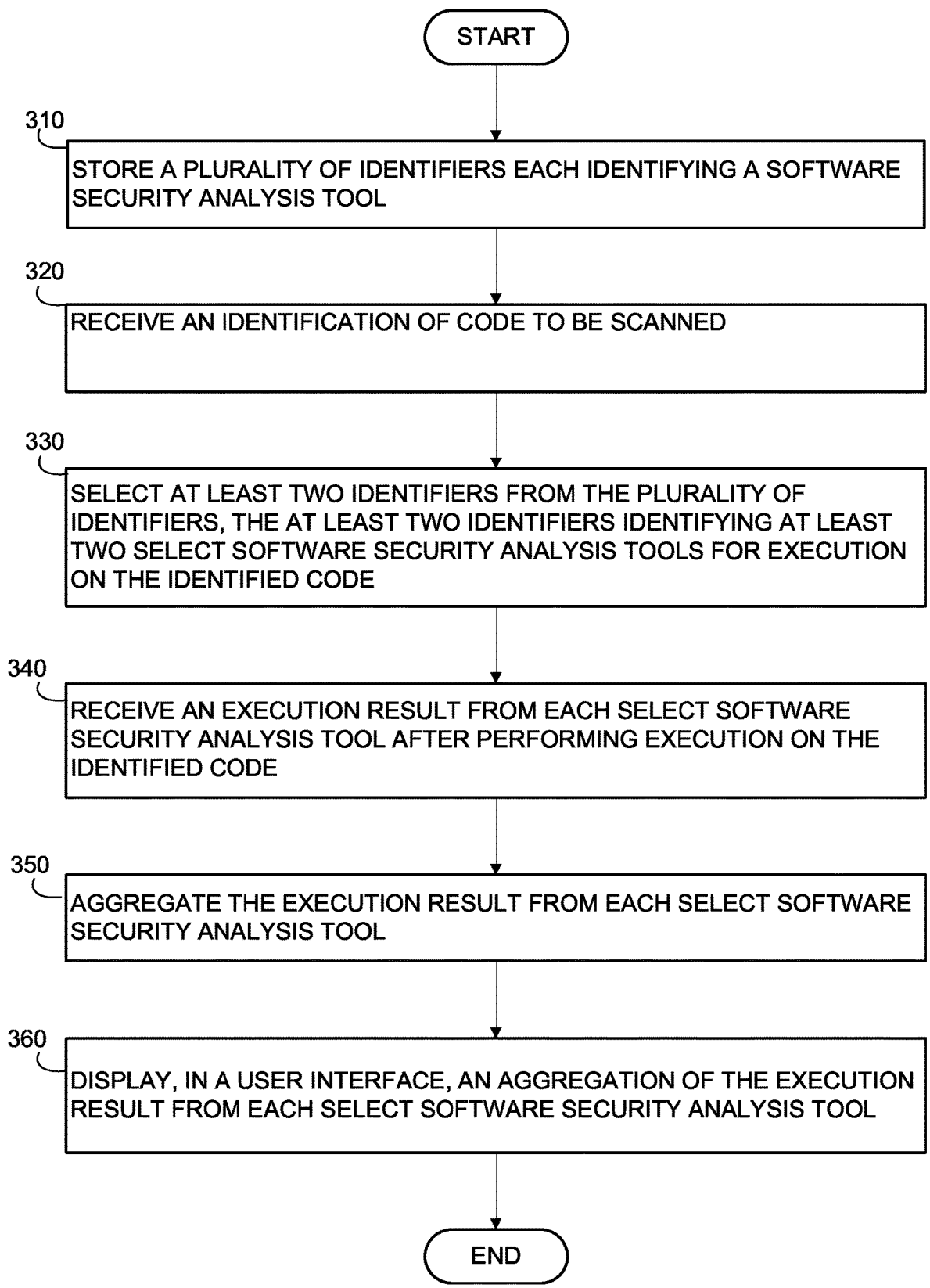
FIG. 3 is an example flow chart of a process performed by the orchestration system according to one aspect of the disclosed technology.

FIG. 3 illustrates an example flow chart of an orchestration process performed by the orchestration system 110. At 310, the non-transitory computer readable medium 220 may store a plurality of identifiers. Each identifier may identify a software security analysis tool 120. At 320, the processor 210 of the orchestration system 110 may receive an identification of code to be scanned. The identification of code may include a component name as registered in an application. Alternatively, or in addition, the identification of code may include a directory indicating where the code is stored in the system. At 330, the processor 210 may select at least two identifiers from the plurality of identifiers. The at least two identifiers may identify at least two select software security analysis tools 120 for execution on the identified code. The at least two select software security analysis tools may include at least two tools of different categories. Alternatively, the at least two select software security analysis tools may belong to the same category. The processor 210 may select the at least two identifiers from the plurality of identifiers based on configuration of the identified code. Alternatively, the processor 210 may select the at least two identifiers from the plurality of identifiers based on a user's selection provided via the graphical user interface 262.

At 340, the processor 210 may receive an execution result from each select software security analysis tool 120 after performing execution on the identified code. At 350, the processor 210 may aggregate the execution result from each select software security analysis tool 120.

At 350, the processor 210 may display, in the graphical user interface 262, an aggregation of the execution result from each select software security analysis tool 120. The processor 210 may display in a single view of the graphical user interface 262 the aggregation of the execution result from each select software security analysis tool 120. The graphical user interface 262 may display a selectable button to allow a user to configure each select software security analysis tool 120. The aggregation of the execution result from each select software security analysis tool displayed in the graphical user interface 262 may include a first score for a combined static analysis result, a second score for open source license analysis, and a third score for open source known vulnerabilities. The aggregation of the execution result from each select software security analysis tool 120 displayed in the graphical user interface 262 may include severity, category and name of the execution result.

Further, the processor 210 may monitor license status of each software security analysis tool 120 to determine whether a license renewal is required. The processor 210 may generate a license request when the license renewal is required. Some tools may be open source and free to use, whereas other tools may be purchased through a license. For instance, SAST tool 130A may have a limited usage license limiting access to a specified number of times, whereas SAST tool 130B may have an unlimited usage license. When the orchestration system 110 receives a scan request, the processor 210 may determine license situations of the tools. For example, if a project has over a million lines of code which merit additional licenses, the processor 210 may advise the user accordingly or proceed to acquire one or more licenses.

In one example, when the orchestration system 110 receives a scan request of a first software security analysis tool that requires a commercial license, the orchestration system 110 may advise the user to consider a second software security analysis tool with a free license that achieves similar scan purposes. If the commercial license is not preapproved, the orchestration system 110 may display and/or send a message to the user explaining why the first tool is not available.

The user may access the orchestration system 110 at any time to view license status of each software security analysis tool 120. For instance, for a software security analysis tool 120 that has a limited usage, the orchestration system 110 may store and display information indicating the current usage amount, such as 90% of capacity. Based on such information, the user may know if it is time to acquire additional licenses for that particular tool 120, or if it is time to review licenses that are already in use and see if some of them can be reclaimed. The orchestration system 110 allows the user to better monitor license status of software security analysis tools 120 at a system level as opposed to individual tool level. The user may easily determine the appropriate action based on the license status.

In one example, the processor 210 may compute one or more confidence scores for scan results produced by the software security analysis tools 120. The confidence scores may indicate accuracy of the scan results. In one example, the processor 210 may receive scan results from three SAST tools 130, where the first two tools identify a same issue, and the third tool does not. The processor 210 may determine a quality of the scan results based on what tools found the issue. The processor 210 may compare each confidence score to a predetermined threshold. When the computed confidence score is lower than the predetermined threshold, such as 80%, the scan result or finding may be deemed false positive or non-real. When the computed confidence score meets the predetermined threshold, the scan result or finding may be deemed real. In one example, the graphical user interface 262 of the orchestration system 110 may only show scan results or findings that are deemed real.

The orchestration system 110 may orchestrate multiple scans, combine those results in a way and generate confidence scores that allow the user to decide whether that result is a true positive, false positive, or what other combinations of those. By doing so, the orchestration system 110 may provide a more accurate and complete result than what an individual tool would produce. In some examples, a user may designate a scan result or a finding returned by a software security analysis tool 120 as "false positive". In one example, the processor 210 may identify a "false positive" scan result. The processor 210 may subsequently instruct at least one software security analysis tool 120 to perform additional scans to validate the "false positive" scan result.

The orchestration system 110 may use a fingerprint approach to determine correlation or similarity among scan results or findings generated by different software security analysis tools 120. The fingerprint approach may be associated with line position, contents, CWE and other identifying factors, to determine whether two scan results produced by two different software security analysis tools 120 are the same. The fingerprint approach remains robust regardless whether the code position, line or content changes in subsequent scans.

Figure 4:
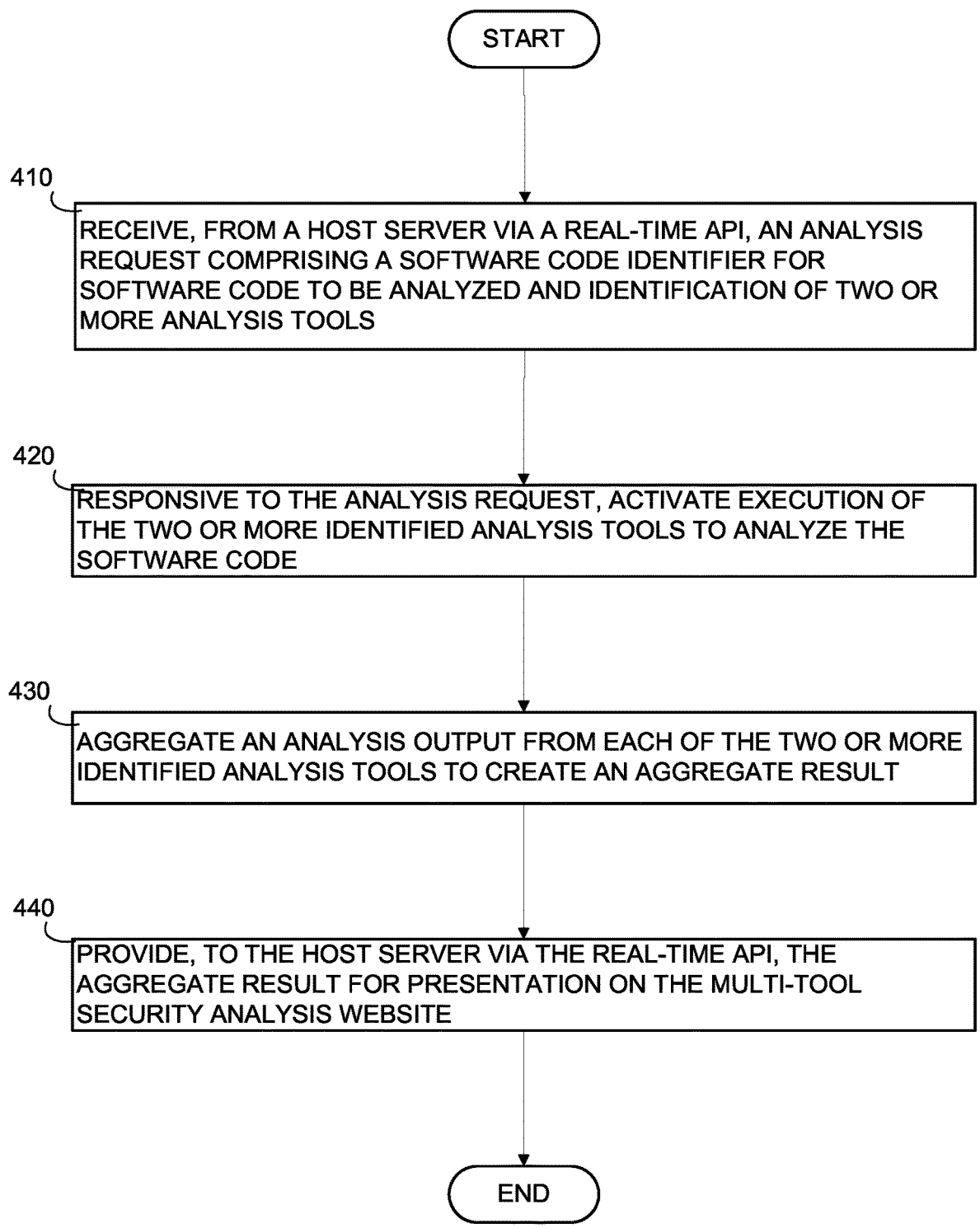
FIG. 4 is an example flow chart of another process performed by the orchestration system according to one aspect of the disclosed technology.

FIG. 4 illustrates another example flow chart of an orchestration process performed by the orchestration system 110. At 410, the processor 210 of the orchestration system 110 may receive, from the host server 190, via the API 270, an analysis request comprising a software code identifier for software code to be analyzed and identification of two or more analysis tools 120 comprising one or more SAST tools 130, one or more DAST tools 140, and one or more OSA tools 150. The API 270 may be a real-time API. The analysis tools 120 may be presented on a multi-tool security analysis website associated with the host server 180. The software code identifier may include a directory indicating a storage location of the software code. The software code identifier may include at least a portion of the software code.

At 420, responsive to the analysis request, the processor 210 may activate execution of the two or more identified analysis tools 120 to analyze the software code. At 430, the processor 210 may aggregate an analysis output from each of the two or more identified analysis tools 120 to create an aggregate result. The aggregate result may include an indication of a severity, a category, a name, and a confidence score for each of a plurality of identified vulnerabilities. The aggregate result may include a first score for a combined static analysis result, a second score for open source license analysis, and a third score for open source known vulnerabilities. At 440, the processor 210 may provide to the host server 180 via the real-time API 270 the aggregate result for presentation on the multi-tool security analysis website.

Additionally, the processor 210 may track a license status for each of the analysis tools 120 presented on the multi-tool security analysis website. The processor 210 may determine whether each of the two or more identified analysis tools 120 require a license renewal based on their license statuses. The processor 210 may determine that at least a first tool of the two or more identified analysis tools 120 requires a license renewal. The processor 210 may send a license renewal request to a tool licensor server to renew the license of at least the first tool.

The processor 210 may receive, from the host server 180 via the real-time API 270, user-inputted configuration settings corresponding to at least one of the two or more identified analysis tools 120. The processor 210 may configure the at least one of the two or more identified analysis tools 120 based on the user-inputted configuration settings.

Figure 5:
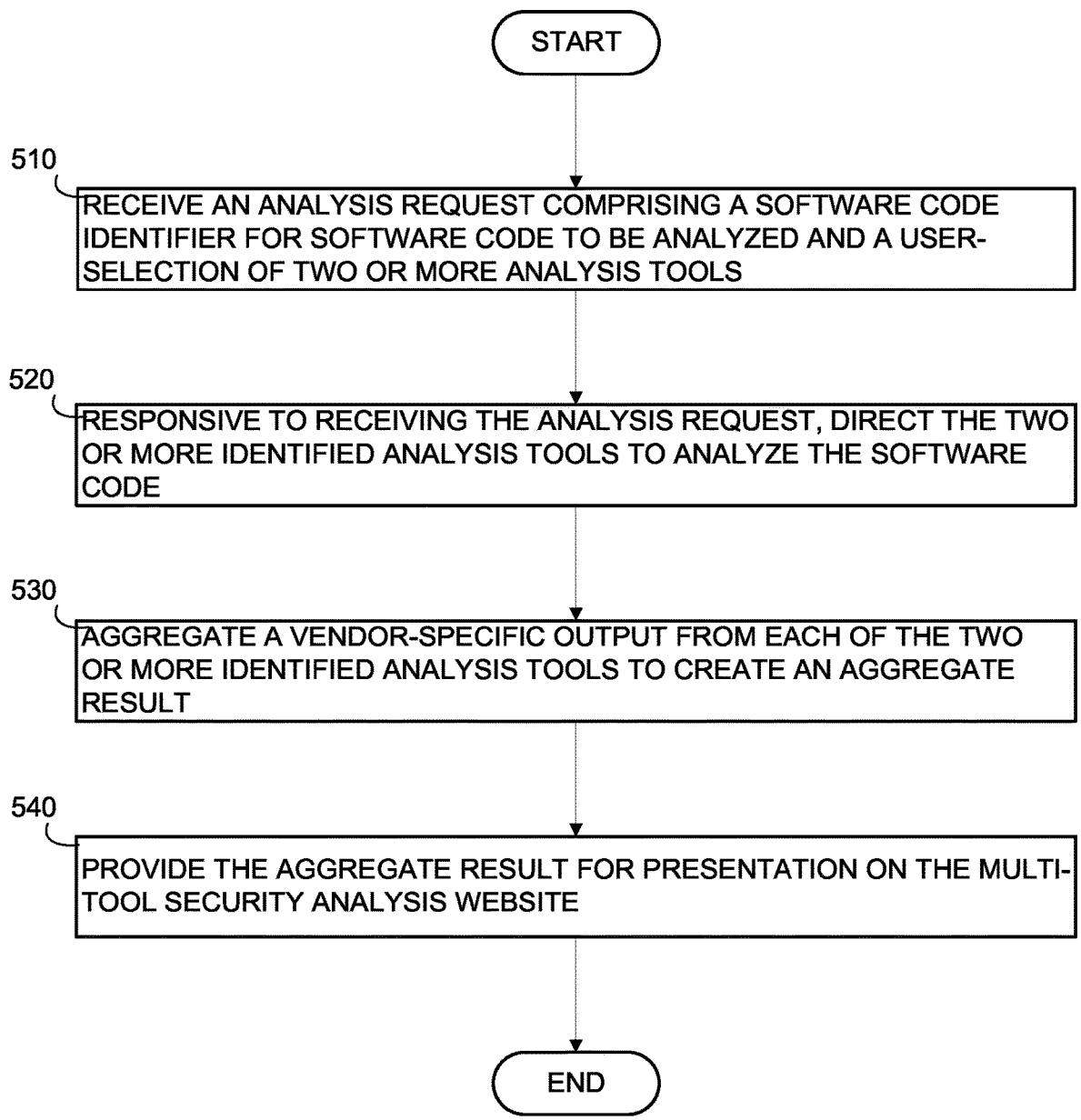
FIG. 5 is an example flow chart of yet another process performed by the orchestration system according to one aspect of the disclosed technology.

FIG. 5 illustrates another example flow chart of an orchestration process performed by the orchestration system 110. At 510, the processor 210 of the orchestration system 110 may receive an analysis request comprising a software code identifier for software code to be analyzed and a user-selection of two or more analysis tools 120 comprising one or more SAST tools 130, one or more DAST tools 140, and one or more OSA tools 150. The analysis tools 120 are presented on a multi-tool security analysis website. The website may be an internal page/site associated with an enterprise, or a publicly accessible website.

At 520, responsive to receiving the analysis request, the processor 210 may direct the two or more identified analysis tools 120 to analyze the software code. At 530, the processor 210 may aggregate a vendor-specific output from each of the two or more identified analysis tools 120 to create an aggregate result. At 540, the processor 210 may provide the aggregate result for presentation on the multi-tool security analysis website.

Turning back to FIG. 2, each orchestration system 110 may include one or more physical or logical devices (e.g., servers). For example, the orchestration system 110 may be a single device or server or may be configured as a distributed computer system including multiple servers, devices, or computers that interoperate to perform one or more of the processes and functionalities associated with the disclosed embodiments. In some embodiments, the orchestration system 110 may further include a peripheral interface, a transceiver, a mobile network interface in communication with the processor 210, a bus configured to facilitate communication between the various components of the orchestration system 110, and a power source configured to power one or more components of the orchestration system 110.

A peripheral interface may include hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™ ambient backscatter communications (ABC) protocols or similar technologies.

A mobile network interface may provide access to a cellular network, the Internet, a local area network, or another wide-area network. In some embodiments, a mobile network interface may include hardware, firmware, and/or software that allows the processor(s) 210 to communicate with other devices via wired or wireless networks, whether local or wide area, private or public, as known in the art. A power source may be configured to provide an appropriate alternating current (AC) or direct current (DC) to power components.

The processor 210 may include one or more of a microprocessor, microcontroller, digital signal processor, co-processor or the like or combinations thereof capable of executing stored instructions and operating upon stored data. The processor 210 may be one or more known processing devices, such as a microprocessor from the Pentium™ family manufactured by Intel™ or the Turion™ family manufactured by AMD™. The processor 210 may constitute a single core or multiple core processor that executes parallel processes simultaneously. For example, the processor 210 may be a single core processor that is configured with virtual processing technologies. In certain embodiments, the processor 210 may use logical processors to simultaneously execute and control multiple processes. The processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

The non-transitory computer readable medium 220 may contain an operating system ("OS") 222 and a program 224. The non-transitory computer readable medium 220 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the non-transitory computer readable medium 220. The non-transitory computer readable medium 220 may include one or more memory devices that store data and instructions used to perform one or more features of the disclosed embodiments. The non-transitory computer readable medium 220 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The non-transitory computer readable medium 220 may include software components that, when executed by the processor 210, perform one or more processes consistent with the disclosed embodiments. In some embodiments, the non-transitory computer readable medium 220 may include a database 224 to perform one or more of the processes and functionalities associated with the disclosed embodiments. The non-transitory computer readable medium 220 may include one or more programs 226 to perform one or more functions of the disclosed embodiments. Moreover, the processor 210 may execute one or more programs 226 located remotely from the orchestration system 110. For example, the orchestration system 110 may access one or more remote programs 226, that, when executed, perform functions related to disclosed embodiments.

The orchestration system 110 may also include one or more I/O devices 260 that may comprise one or more interfaces for receiving signals or input from devices and providing signals or output to one or more devices that allow data to be received and/or transmitted by the orchestration system 110. For example, the orchestration system 110 may include interface components, which may provide interfaces to one or more input devices, such as one or more keyboards, mouse devices, touch screens, track pads, trackballs, scroll wheels, digital cameras, microphones, sensors, and the like, that enable the orchestration system 110 to receive data from one or more users. The orchestration system 110 may include a display, a screen, a touchpad, or the like for displaying images, videos, data, or other information. The I/O devices 260 may include the graphical user interface 262.

In exemplary embodiments of the disclosed technology, the orchestration system 110 may include any number of hardware and/or software applications that are executed to facilitate any of the operations. The one or more I/O interfaces 260 may be utilized to receive or collect data and/or user instructions from a wide variety of input devices. Received data may be processed by one or more computer processors as desired in various implementations of the disclosed technology and/or stored in one or more memory devices.

Turning back to FIG. 1, the networks 180 may include a network of interconnected computing devices more commonly referred to as the internet. The network 180 may be of any suitable type, including individual connections via the internet such as cellular or WiFi networks. In some embodiments, the network 180 may connect terminals, services, and mobile devices using direct connections such as radio-frequency identification (RFID), near-field communication (NFC), Bluetooth™, low-energy Bluetooth™ (BLE), WiFi™, ZigBee™ ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security. The network 180 may comprise any type of computer networking arrangement used to exchange data. For example, the network 180 may be the Internet, a private data network, virtual private network using a public network, and/or other suitable connection(s) that enables components in system environment 100 to send and receive information between the components of system 100. The network 180 may also include a public switched telephone network ("PSTN") and/or a wireless network. The network 180 may also include local network that comprises any type of computer networking arrangement used to exchange data in a localized area, such as WiFi™, Bluetooth™ Ethernet, and other suitable network connections that enable components of system environment 100 to interact with one another.

According to some embodiments, the host server 190 may host websites, web portal or software application, data or software applications that may access and interact with the orchestration system 110.

Exemplary Use Cases

The following example use case describes examples of orchestration implementations. This is intended solely for explanatory purposes and not limitation.

Figure 6:
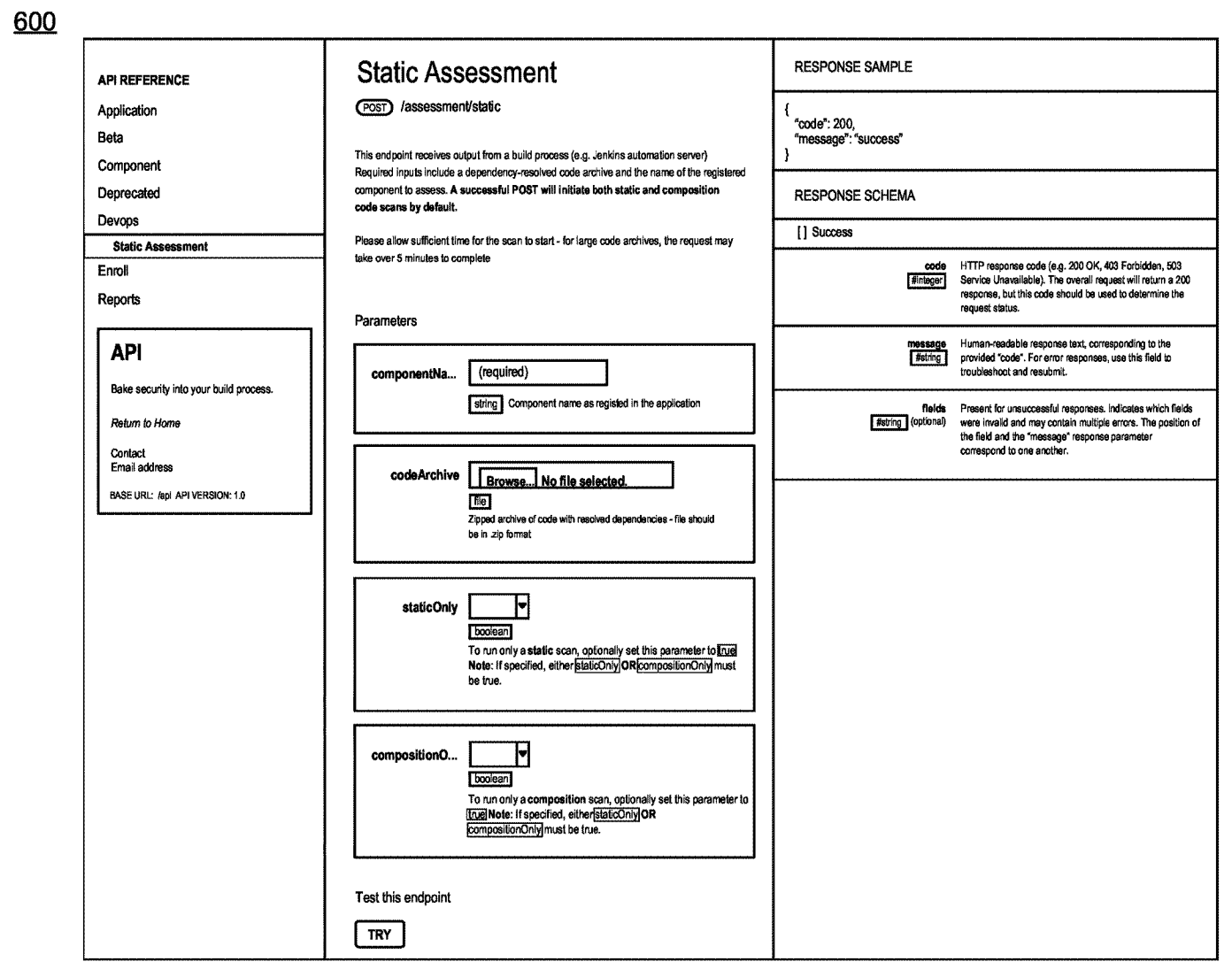

FIG. 6 illustrates a screenshot 600 for operating the orchestration system 110 to perform SAST scans and OSA scans of application code. As shown in FIG. 6, by sending a request to the pictured "/assessment/static" endpoint, back-end scans may be orchestrated for all (or a subset of) enabled SAST tools 130 such as Fortify on Demand™ and Checkmarx™, and all enabled (or a subset of) OSA tools 150 such as Whitesource™. The simplified interface shown in the screenshot 600 has two required inputs and two optional inputs (the remaining parameters and configurations etc. being handled automatically by orchestration system 110), significantly lower than most individual tool integrations. The orchestration system 110 handles the rest of the required integration with various tools 120 behind the scenes, the required and optional inputs having been abstracted out for ease of use of the user.

Figure 7:
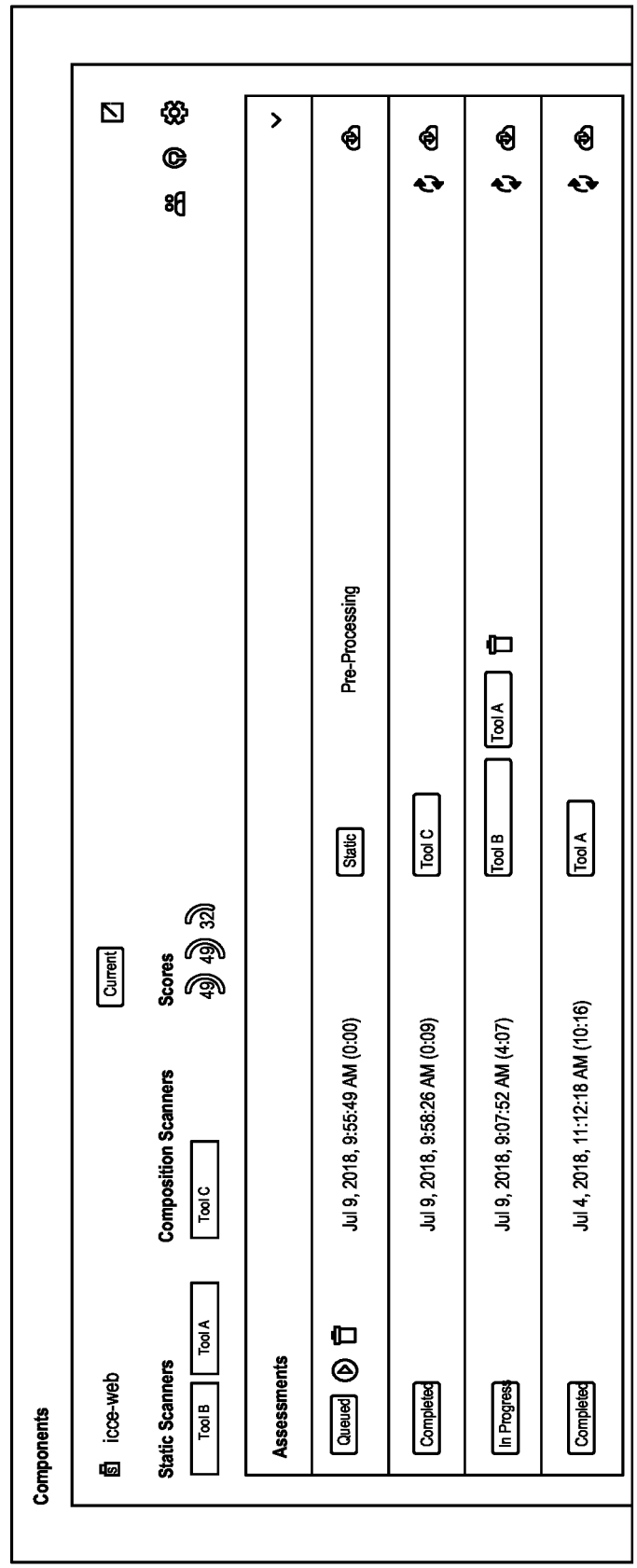
FIG. 7 is another example screenshot of the graphical user interface of the orchestration system according to one aspect of the disclosed technology.

FIG. 7 illustrates a screenshot 700 of the graphical user interface 262 of the orchestration system 110, according to an example implementation. FIG. 7 illustrates a few elements of the orchestration process. The screenshot 700 depicts a view in the orchestration system 110 for a given application or component showing its scan history. Events are shown sorted in an order from newest to oldest. The oldest event shows a "Completed" assessment where a single scan performed by tool A was run. Thereafter, the screenshot 700 also shows another assessment where two scans performed by tool A and tool B are in progress. In parallel to those scans, another assessment shows a scan performed by tool C with a "Completed" status. For example, tool A may refer to Checkmarx™, tool B may refer to Fortify on Demand™, and tool C may refer to WhiteSource™. Lastly, an additional request, listed as "Queued," is on hold until the scans that are currently in progress have completed.

The orchestration system 110 monitors scan statuses of all tools 120 from start to completion. Once all scans of an assessment have completed, the assessment is marked as "Completed." Upon assessment completion, individual scan results of each tool 120 may be combined into a unified finding view and presented by the orchestration system 110.

The screenshot 700 also shows the ability for admins to configure specific scanners. This may be automatically done as components are enrolled, but can be overridden by admins. As shown in FIG. 7, next to that configuration, scores are shown. This set of three scores are outcomes of most scan recent results. The first score represents a combined static analysis result. The second score represents a combined open source license analysis. The third score represents open source known vulnerabilities.

Figure 8:
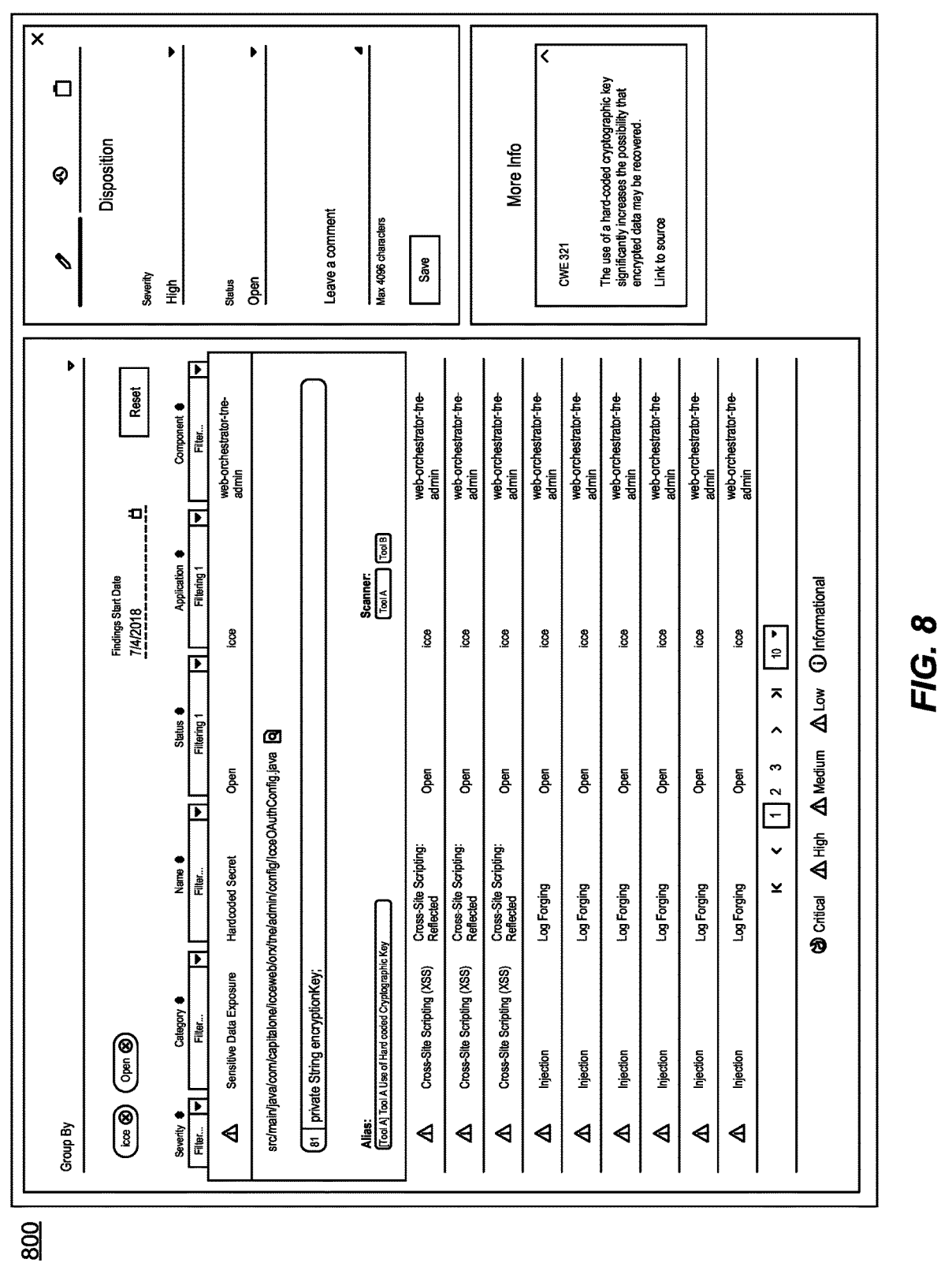

FIG. 8 illustrates a screenshot 800 of the example graphical user interface 262 of the orchestration system 110, according to an example implementation. The screenshot 800 shows scan results or findings after each scan has finished. These scan results or findings are an aggregate scan result of multiple software security analysis tools 120. As shown in the screenshot 800, the first scan result or finding (e.g., a sensitive data exposure—hardcoded secret) was found by two software security analysis tools: tool A and tool B. For examples, tool A may refer to Checkmarx™, and tool B may refer to Fortify on Demand™ (FOD). The results shown are filterable based on a category and name assigned to each result or finding. In some embodiments, the category and name may be based on a common internal taxonomy that may not directly correspond to a finding output by any one or more tools. For example, the orchestration system 110 may unify various common fields, such as severity, category, and name to common internal taxonomy, rather than relying on CWE or some other external way to link them. The screenshot 800 illustrates a disposition side-bar where users may dispose findings, where disposition is handled across tools and across assessments/scans.

Reducing False Positive Findings

Consistent with the disclosed embodiments, a system for assessing software risks includes a non-transitory computer readable medium and a processor. The non-transitory computer readable medium may store a plurality of confidence scores designating confidence levels of a plurality of software security analysis tools of different categories. The non-transitory computer readable medium may store findings generated by each software security analysis tool. The non-transitory computer readable medium may store a source truth dataset including criteria for validating characteristics of software security analysis findings. The processor may be configured to receive a first finding from a first software security analysis tool that performs a scan on a software project, such as application code, for example. The processor may identify a first characteristic from the first finding. The processor may select a criterion for validating the first characteristic from the non-transitory computer readable medium. The processor may determine a first validity factor by determining whether the selected criterion is met. The processor may determine a second validity factor by retrieving, from the non-transitory computer readable medium, a confidence score. The confidence score may be associated with the first software security analysis tool. The processor may determine a third validity factor by determining a number of findings stored in the non-transitory computer readable medium that overlap with the first finding. The processor may determine a validity score for the first finding based on at least one of a first validity factor, a second validity factor and a third validity factor. The processor may determine whether the first finding is false positive by comparing the validity score to a predetermined validity threshold. The processor may display the first finding on a graphical user interface when the first finding is true positive.

In one embodiment, the processor may be configured to update the source truth dataset stored in the non-transitory computer readable medium based on whether the first finding is false positive.

In one embodiment, the processor may be configured to exclude the first finding from being displayed on the graphical user interface when the first finding is false positive.

In one embodiment, the processor may be configured to receive, via the graphical user interface, a disposition of the first finding entered by a user. The processor may update the source truth dataset stored in the non-transitory computer readable medium based on the disposition.

In one embodiment, the processor may be configured to exclude the first finding from being displayed on the graphical user interface when the disposition indicates that the first finding is false positive.

In one embodiment, the source truth dataset may include information of disposition of findings entered by the user.

In one embodiment, the processor may be configured to update a scan rule of the first software security analysis tool to omit scanning the first characteristic when a plurality of findings having the first characteristic are false positive.

In an example embodiment, each software security analysis tool may belong to one of the following categories, including: a first category of at least one software security analysis tool for performing SAST, a second category of at least one software security analysis tool for performing Dynamic Application Security Testing (DAST), a third category of at least one software security analysis tool for performing Open Source Analysis (OSA), and a fourth category of at least one software security analysis tool for performing Interactive Application Security Testing (IAST). Other software security analysis tools or tool categories may also be implemented.

In one embodiment, a confidence score associated with a software security analysis tool of the first category may be lower than a confidence score associated with a software security analysis tool of the third category.

In one embodiment, a confidence score associated with a software security analysis tool of the second category is lower than a confidence score associated with a software security analysis tool of the third category.

In one embodiment, each category may be associated with a predetermined validity threshold.

In one embodiment, the predetermined validity thresholds associated with different categories may be different.

In one embodiment, the selected criterion may include a requirement of presence of a second finding with a second characteristic with respect to the application code.

In one embodiment, the processor may determine the first validity factor by determining whether the second finding with the second characteristic is present in any finding generated by any software security analysis tool that performs a scan on the application code.

In one embodiment, the processor may determine the first validity factor by determining whether the second finding with the second characteristic is present in any finding generated by the first software security analysis tool that performs the scan on the application code.

In one embodiment, the non-transitory computer readable medium may store characteristic confidence scores indicating confidence levels of each software security analysis tool to correctly identify each characteristic of findings.

In one embodiment, the processor may determine the validity score for the first finding based on a characteristic confidence score that indicates a confidence level of the first software security analysis tool to correctly identify the first characteristic.

In one embodiment, the third validity factor may indicate an increase of likelihood of validity when there exists a plurality of findings produced by other software security analysis tools that overlap with the first finding.

Another aspect of the disclosed technology relates to a system for validating software security analysis findings. The system includes a non-transitory computer readable medium and a processor. The non-transitory computer readable medium may store a source truth dataset including criteria for validating characteristics of software security analysis findings. The processor may be configured to receive a first finding from a first software security analysis tool that performs scan on application code. The processor may identify a characteristic from the first finding. The processor may select a criterion for validating the identified characteristic from the non-transitory computer readable medium. The processor may determine a validity score for the first finding based on whether the selected criterion is met. The processor may determine whether the first finding is false positive by comparing the validity score to a predetermined validity threshold. The processor may display the first finding on a graphical user interface when the first finding is true positive.

In one embodiment, the processor may be configured to determine a number of findings stored in the non-transitory computer readable medium that overlap with the first finding. The processor may determine whether the first finding is false positive based on the number of findings stored in the non-transitory computer readable medium that overlap with the first finding.

In one embodiment, the processor may be configured to determine a confidence score associated with the first software security analysis tool. The processor may determine whether the first finding is false positive based on the confidence score associated with the first software security analysis tool.

A further aspect of the disclosed technology relates to a system for validating software security analysis findings. The system includes a non-transitory computer readable medium and a processor. The non-transitory computer readable medium may store a plurality of confidence scores designating confidence levels of a plurality of software security analysis tools of different categories. The non-transitory computer readable medium may store a source truth dataset including criteria for validating characteristics of software security analysis findings. The processor may be configured to receive a first finding from a first software security analysis tool that performs a scan on a software project. The processor may identify a characteristic from the first finding. The processor may select a criterion for validating the identified characteristic from the non-transitory computer readable medium. The processor may determine a first validity factor by determining whether the selected criterion is met. The processor may determine a second validity factor by retrieving, from the non-transitory computer readable medium, the confidence score associated with the first software security analysis tool. The processor may determine a validity score for the first finding based on at least one of the first validity factor and the second validity factor. The processor may determine whether the first finding is false positive by comparing the validity score to a predetermined validity threshold. The processor may display the first finding on a graphical user interface when the first finding is true positive.

In one embodiment, the processor may be configured to determine a number of findings stored in the non-transitory computer readable medium that overlap with the first finding. The processor may determine whether the first finding is false positive based on the number of findings stored in the non-transitory computer readable medium that overlap with the first finding.

Consistent with the disclosed embodiments, methods for validating software security analysis findings are disclosed.

FIG. 1 shows an example environment 100 that may implement certain aspects of the present disclosure. The components and arrangements shown in FIG. 1 are not intended to limit the disclosed embodiments as the components used to implement the disclosed processes and features may vary. As shown in FIG. 1, in some implementations, the environment 100 may include one or more of the following: one or more validation systems 110, one or more software security analysis tools 120, one or more continuous integration, continuous delivery (CI/CD) tools 170, one or more external collectors 180, one or more networks 190, and one or more host servers 192.

The validation system 110 may validate findings generated by the software security analysis tools 120.

The software security analysis tools 120 may include one or more categories, such as a first category of one or more SAST tools 130, a second category of one or more OSA tools 140, a third category of one or more DAST tools 150, and a fourth category of one or more IAST tools 160, among other possibilities.

Each software security analysis tool 120 of the first, second, third and fourth categories may be a standalone solution, a network-based client-server solution, a web-based solution, or a cloud-based solution, among other possibilities. Each software security analysis tool 120 may be provided by a different licensor or vendor, and thus each may be independent of each other. The SAST tools 130 may include Checkmarx™ and Fortify™, among other possibilities. The OSA tools 140 may include Whitesource™ and Blackduck™, among other possibilities. The DAST tools 150 may include WebInspect™ and Contrast™, among other possibilities. The IAST tools 160 may include Veracode™ and WhiteHat™, among other possibilities.

The findings returned by each tool 120 may reveal software issues in software projects (e.g. application code) detected by each tool 120.

Turning to FIG. 2, the validation system 110 may validate findings generated by one or more SAST tools 130A-130C, one or more OSA tools 140A-140C, one or more DAST tools 150A-150C, and one or more IAST tools 160A-160C, among other possibilities.

The validation system 110 may include one or more of the following: a processor 210, a non-transitory computer readable medium 220, an input/output ("I/O") device 260, and an application program interface (API) 270, among other possibilities. The I/O device 260 may include a graphical user interface 262.

Sometimes scan results returned by the software security analysis tools 120 may contain false positive findings. The validation system 110 may perform validation and eliminate such findings. For example, the validation system 110 may compute a validity score for each finding produced by each tool 120. The validity score may indicate accuracy of the finding. The validity score may indicate how likely true or how valuable a finding is.

If the validity score fails to meet a predetermined validity threshold, the finding may be deemed false positive. For instance, on a scale from 0 to 100, if a validity score is 75, which is lower than a validity threshold of 80, then the finding may be deemed false positive. When the validity score meets the validity threshold, the finding may be deemed correct, valid, real or valuable, which may collectively be referred as true positive.

In one example, the validation system 110 may display the validity score for each finding on the graphical user interface 262, and let the user decide whether the finding is true positive or false positive. By doing so, the validation system 110 may provide a more accurate and complete result than what an individual tool 120 may produce. The user may assess a finding as false positive via the graphical user interface 262.

In another example, the graphical user interface 262 of the validation system 110 may only show findings that are deemed true positive.

In one example, the processor 210 may identify a finding produced by one tool 120 as false positive. The processor 210 may subsequently instruct one or more other software security analysis tools 120 to perform one or more additional scans to see if the same finding is yielded. As more tools 120 generate the same finding, it becomes more likely that the finding is true positive, not false positive.

The non-transitory computer readable medium 220 may store a source truth dataset 221 or known dataset. The source truth dataset 221 may identify criteria for validating characteristics of findings.

The source truth dataset 221 may initially include manually-dispositioned data that indicates criteria for validating findings. Such manually-dispositioned data may include information of disposition of findings entered by the user. Manually-dispositioned data may include information that indicates findings with particular characteristics that tend to be false positive. The validation system 110 may implement a machine learning algorithm that gradually grows the source truth dataset 221 as more scans are performed. For instance, as more findings with a new particular characteristic turn out to be false positive, the validation system 110 may add a criterion for validating the new characteristic into the source truth dataset 221.

The non-transitory computer readable medium 220 may store a plurality of confidence scores 222 designating confidence levels of the software security analysis tools 120. The confidence score 222 may indicate a quality of findings based on what tools 120 generate the findings. Static vulnerability findings produced by SAST tools 130 and dynamic vulnerability findings produced by DAST tools 150 are prone to be false positive. On the other hand, findings produced by OSA tools 140, such as open source license findings or open source vulnerability findings, tend to be more certain, and are less likely to be false positive. Accordingly, a confidence score of an OSA tool 140 may be higher than a confidence score of an SAST tool 130. Similarly, the confidence score of the OSA tool 140 may be higher than a confidence score of a DAST tool 150.

The non-transitory computer readable medium 220 may store a plurality of predetermined validity thresholds 223 for different category of tools 120. For instance, the medium 220 may store a first predetermined validity threshold for SAST tools 130, a second predetermined validity threshold for OSA tools 140, a third predetermined validity threshold for DAST tools 150, and a fourth predetermined validity threshold for IAST tools 160. The validity thresholds for different categories may be different. For instance, the validity threshold for OSA tools 140 may be lower than the validity threshold for SAST tools 130. Each validity threshold 223 is configurable and changeable over time. Each finding may be excluded or promoted by comparing its validity score to the validity threshold.

The non-transitory computer readable medium may store characteristic confidence scores indicating confidence levels of each software security analysis tool 120 to correctly identify each finding characteristic. The characteristic confidence score may indicate individual confidence of a particular tool 120 to correctly identify a finding characteristic. For instance, not all tools 120 are equally effective at correctly identifying cross-site scripting. A first tool 120 may be more effective at correctly identifying cross-site scripting, while a second tool 120 may not be able to detect cross-site scripting or may tend to generate a false finding of cross-site scripting. Accordingly, the characteristic confidence score of the first tool for identifying cross-site scripting may be higher than that of the second tool. In the example implementations, the effectiveness of any one tool with respect to any particular vulnerability of characteristic may be adjusted over time based on user inputs or assessments of historical findings.

The non-transitory computer readable medium 220 may store historical findings 224 generated by each software security analysis tool 120.

Figure 9:
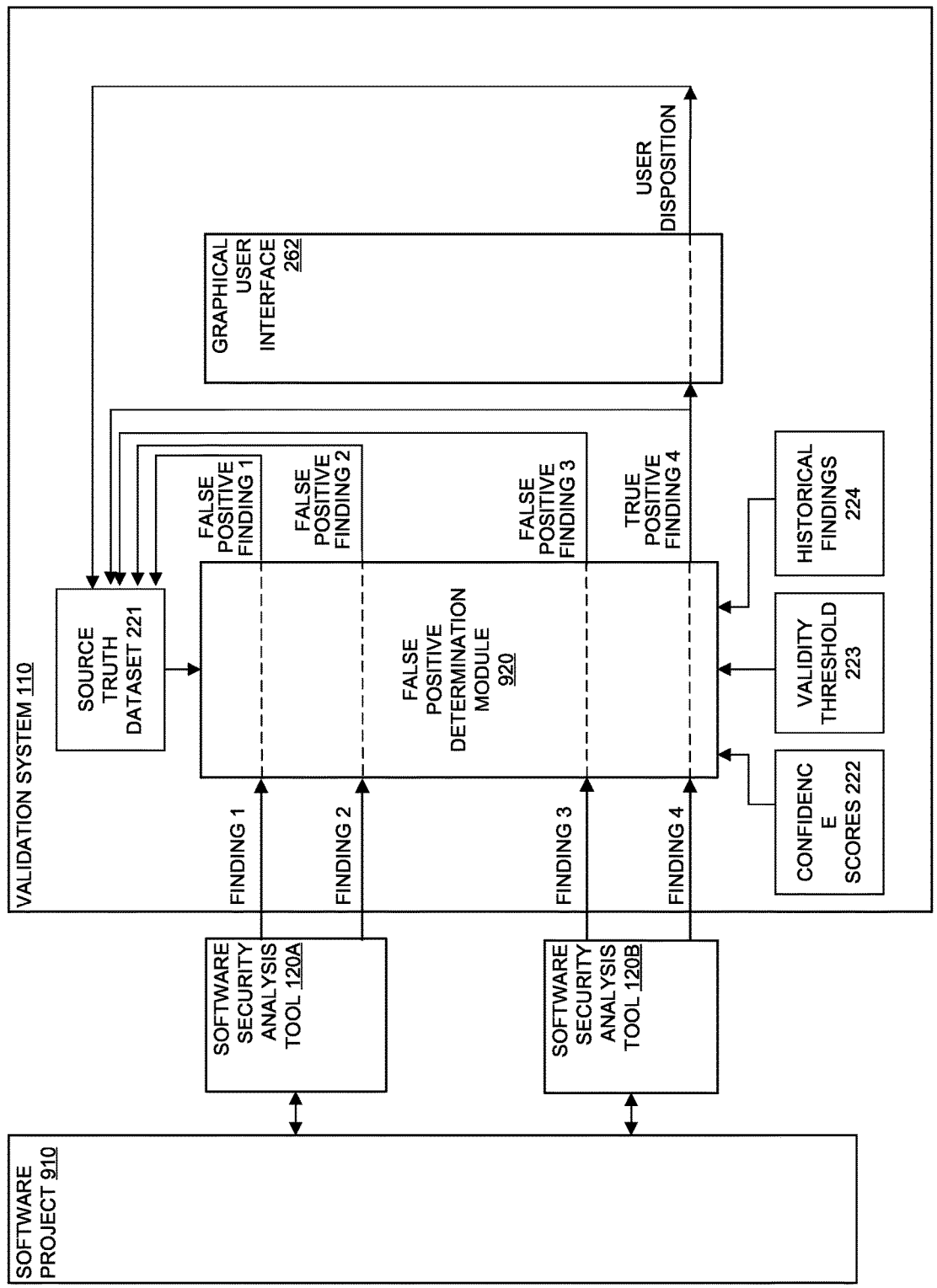
FIG. 9 is an example block diagram illustrating a process for validating findings performed by the validation system according to one aspect of the disclosed technology.

FIG. 9 illustrates a block diagram illustrating a validation process performed by the validation system 110. The validation system 110 may instruct multiple software security analysis tools 120A and 120B to scan a software project 910.

The first software security analysis tool 120A and the second software security analysis tool 120B may belong to at least one of the following categories: a first category for performing SAST, a second category for performing OSA, a third category for performing DAST, and a fourth category for performing IAST. Each tool 120A and 120B may belong to a different category. For instance, the first tool 120A may be a SAST tool, while the second tool 120B may be an OSA tool. The tools 120A and 120B may run during the same scan session or at different scan sessions.

In one embodiment, the tools 120A and 120B may be from different vendors. Each tool 120A, 120B may generate a finding at a vendor-provided format. For instance, the first tool 120A may generate findings in a first vendor-provided format, and the second tool 120B may generate findings in a second vendor-provided format. The first and second vendor-provided formats may be identical to or different from each other. In one example, findings generated by the first tool 120A may be in the format of XML, while findings generated by the second tool 120B may be in the format of JSON.

The software project 910 (which may include a plurality of application code) may include several software issues that are detectable by one or more software security analysis tools. For instance, some software issues may be detectable by the first tool 120A, while other software issues may be detectable by the second tool 120B. Each tool may generate a finding corresponding to each detectable software issue. The tools 120A and 120B may report their findings to the validation system 110. For instance, the tool 120A may report FINDING 1 and FINDING 2 to the validation system 110, while the tool 120B may report FINDING 3 and FINDING 4 to the validation system 110.

The tools 120A and 120B may report their findings at different timestamps or different scan sessions. For instance, the first tool 120A may report at a first timestamp, and the second tool 120B may report at a second timestamp. The second timestamp may occur after the first timestamp.

The validation system 110 may validate each finding by using a false positive determination module 920. The false positive determination module 920 may be implemented by a machine-learning algorithm executable by the processor 210.

The module 920 may perform basic false positive reduction. For instance, the module 920 may receive findings from three tools. If a finding is found by only one tool, but not by the other two tools, the module 920 may determine that the finding is more likely to be false positive.

The module 920 may perform sophisticated false positive reduction. The module 920 may compute a validity score for each finding. The validity score may be computed based on one or more of various validity factors.

A first validity factor may depend on the source truth dataset 221. The module 920 may identify a characteristic from each finding. The module 920 may select from the source truth dataset 221 a criterion for validating the identified characteristic. The module 920 may determine the first validity factor by determining whether the selected criterion is met. For example, with respect to FINDING 1, the module 920 may identify its characteristic, and selects a criterion from the source truth dataset 221 with respect to that characteristic. The module 920 may then determine whether the criterion is met. If the criterion is met, the first validity factor may indicate that FINDING 1 is more likely true positive. On the other hand, if the criterion is not met, the first validity factor may indicate that FINDING 1 is more likely false positive.

A criterion for validating a first finding having a first characteristic may require presence of a second finding with a second characteristic. For instance, cross-site request forgery is an attack that is often difficult to validate. Cross-site request forgery typically becomes risky or at least imposes a greater risk when cross-site scripting is present. Many tools 120 that generate a finding indicating cross-site request forgery, alone, without cross-site scripting, often turn out to be false positive. In one example, the criterion for validating a finding of cross-site request forgery may require presence of a finding of cross-site scripting. If the criterion is met, the finding of cross-site request forgery may likely be true positive. If the criterion is not met, the finding of cross-site request forgery may likely be false positive. In one example, the criterion may require that the finding of cross-site scripting needs be generated by a tool 120 that tends to be good at finding it, or a tool 120 with a high characteristic confidence score in finding cross-site scripting. The tool 120 may or may not be necessarily the same as the tool 120 that finds cross-site request forgery. In one example, the criterion may require that the finding of cross-site scripting needs be generated by the same tool 120 that finds cross-site request forgery.

In one example, the criterion for validating FINDING 1 may require presence of an additional finding of a specific characteristic with respect to the software project 910. The criterion may specify that this additional finding needs to be generated by the same tool 120A that generates FINDING 1. Alternatively, the criterion may specify that this additional finding can be generated by any tool, but with a high characteristic confidence score. The module 920 may assess whether each criterion is met.

A second validity factor may be a confidence score 222 associated with the tool 120 that generates the finding. For instance, when validating FINDING 1 generated by the tool 120A, the module 920 may retrieve, from the non-transitory computer readable medium 220, a confidence score 222 associated with the tool 120A. If the confidence score 222 is high, the second validity factor may indicate FINDING 1 is more likely true positive. On the other hand, if the confidence score 222 is low, the second validity factor may indicate FINDING 1 is more likely false positive. Similarly, when validating FINDING 3 or FINDING 4 generated by the tool 120B, the module 920 may retrieve a confidence score associated with the tool 120B.

A third validity factor may be based on how many tools 120 have identified the same finding when performing a scan on the software project 910. For instance, the module 920 may determine how many findings stored in the non-transitory computer readable medium 220 overlap with or duplicate the same finding. The third validity factor may indicate an increase of likelihood of validity when there exist more findings produced by other software security analysis tools that overlap with the first finding. For instance, with respect to FINDING 1, the module 920 may look up historical findings 224 stored in the medium 220 to determine if FINDING 1 or any finding identical to FINDING 1 has been previously detected by any tool 120 that performs scan on the software project9. The module 920 may determine how many tools 120 have previously identified FINDING 1 or any finding identical to FINDING 1. If three tools perform scan on the software project 910, only one tool identifies FINDING 1, then the third validity factor may indicate that FINDING 1 is more likely false positive. On the other hand, if all three tools identify FINDING 1, then the third validity factor may indicate that FINDING 1 is more likely true positive.

The module 920 may determine a validity score for each finding. The validity score may indicate how likely the finding is false positive. If the finding tends to be true positive, its validity score may be high, such as 90%. If the finding tends to be false positive, its validity score might be low, such as 10%. The module 920 may calculate the validity score for each finding based on at least one of a first validity factor, a second validity factor and a third validity factor. For instance, to compute a validity score for FINDING 1, the module 920 may rely on one or more of the following information: (1) a first validity factor based on whether a criterion associated with the finding characteristic is met, (2) a second validity factor indicating a confidence score associated with the tool 120A, and (3) a third validity factor indicating how many tools have identified FINDING 1 in the software project 910 or how many findings stored in the non-transitory computer readable medium 220 overlap with or duplicate FINDING 1.

In one embodiment, the module 920 may produce the validity score based on one validity factor alone. For instance, the validity score may be calculated based on the first validity factor alone.

In another embodiment, the validity score may depend on any two of the three validity factors. For instance, the validity score may be calculated based on the first validity factor and the second validity factor. In another instance, the validity score may be calculated based on the first validity factor and the third validity factor.

In a further embodiment, the validity score may depend on all three validity factors, or any additional factor.

The module 920 may determine whether each finding is false positive by comparing its validity score to a predetermined validity threshold 223. For example, the module 920 may determine whether FINDING 1 is false positive if its validity score is lower than the validity threshold 223 of the tool 120A. Similarly, FINDING 2 may be false positive if its validity score is lower than the validity score of the tool 120A. On the other hand, if a validity score exceeds a validity threshold, then the finding may be deemed true positive. For instance, FINDING 4 may be true positive if its validity score exceeds the validity score of the tool 120B.

The module 920 may display findings that are true positive on the graphical user interface 262. The module 920 may suppress output of false positive findings or exclude false positive findings from being displayed on the graphical user interface 262.

As the module 920 continuously processes scan results or findings generated by tools 120, the module 920 may further update the source truth dataset 221. For instance, as shown in FIG. 9, FINDINGS 1, 2 and 3 are deemed false positive by the module 920, and FINDING 4 is deemed true positive. Their information may be fed back to the source truth dataset 221. FINDINGS 1, 2, and 3 may share a similar characteristic criterion that is not recorded in the source truth dataset 221. By adding such information to the source truth dataset 221, the source truth dataset 221 may be used to detect future false positive findings with such characteristics or detect future false positive findings that fail to meet the criterion for such characteristics. As a result, a model trained on the source truth dataset 221 over time becomes increasingly accurate at identifying false positive findings for any category of tools 120.

Once the module 920 determines that a finding is true positive, such as FINDING 4, the graphical user interface 262 may display the finding. The user may review and dispose the finding via the graphical user interface 262. In one instance, the user may enter a disposition through the graphical user interface 262 indicating that the finding is invalid. The disposition may be fed to the source truth dataset 221 to further update the source truth dataset 221 for retraining a model. If the user's disposition indicates that a finding is false positive, then that finding may be excluded from being displayed on the graphical user interface 262.

In one embodiment, false positive findings may be displayed on the graphical user interface 262. Validity scores may also be shown on the graphical user interface 262. The user may determine how to dispose or assess each false positive finding. For instance, the user may confirm that the finding is indeed false positive or may change the finding to true positive. User's disposition may be fed to the source truth dataset 221 to further train the source truth dataset 221.

As patterns of false positive findings emerge, types of checks may be omitted based on known characteristics of an application. The validation system 110 may modify scanning rules based on characteristics of such findings to reduce future generation of false positive findings. The validation system 110 may be configured to update a scan rule of each tool 120 to omit scanning a certain characteristic when multiple findings having the same characteristic are deemed false positive.

Figure 10:
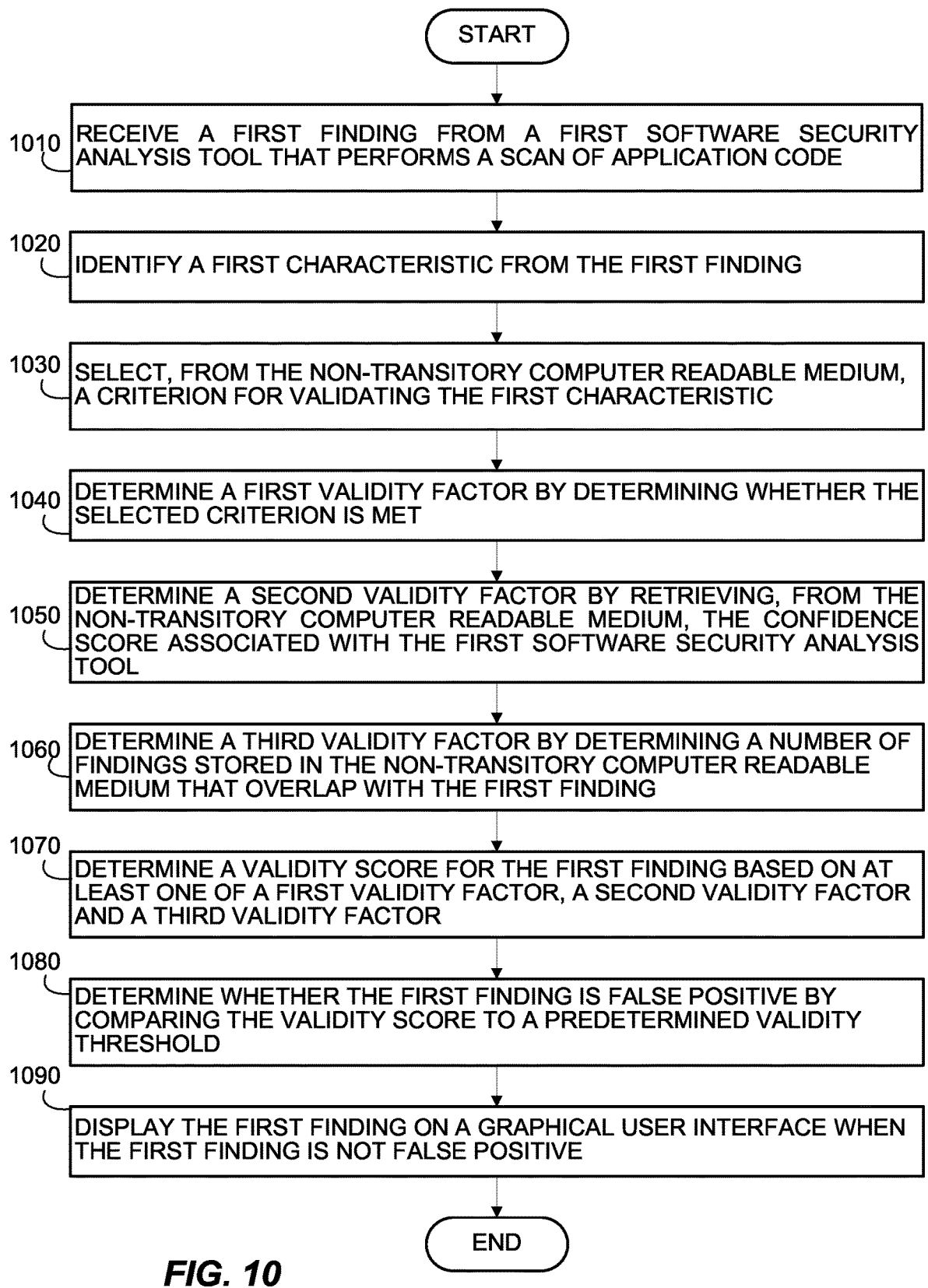
FIG. 10 is a first example flow chart of a validation process performed by the validation system according to one aspect of the disclosed technology.

FIG. 10 is an example flow chart of a validation process performed by the validation system 110. At 1010, the processor 210 may receive a first finding, such as FINDING 1, from a first software security analysis tool 120A that performs scan on a software project 910. At 1020, the processor 210 may identify a first characteristic from the first finding. At 1030, the processor 210 may select, from the non-transitory computer readable medium 220, a criterion for validating the first characteristic. At 1040, the processor 210 may determine a first validity factor by determining whether the selected criterion is met. At 1050, the processor 210 may determine a second validity factor by retrieving, from the non-transitory computer readable medium 220, the confidence score 222 associated with the first software security analysis tool 120A. At 1060, the processor 210 may determine a third validity factor by determining a number of findings stored in the non-transitory computer readable medium 220 that overlap with the first finding. At 1070, the processor 210 may determine a validity score for the first finding based on at least one of a first validity factor, a second validity factor and a third validity factor. At 1080, the processor 210 may determine whether the first finding is false positive by comparing the validity score to a predetermined validity threshold. At 1090, the processor 210 may display the first finding on the graphical user interface 262 when the first finding is true positive.

Figure 11:
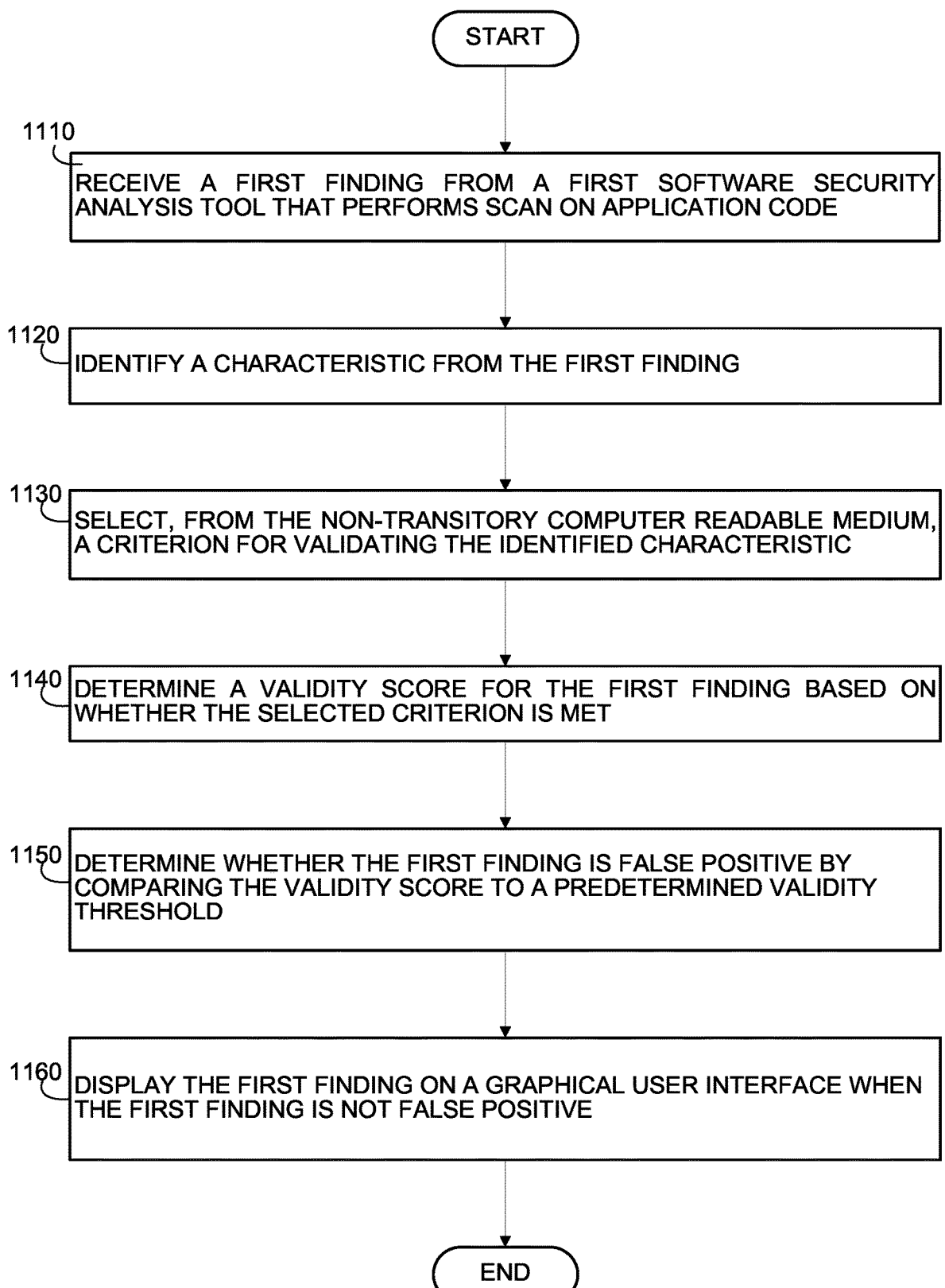
FIG. 11 is a second example flow chart of a validation process performed by the validation system according to one aspect of the disclosed technology.

FIG. 11 illustrates another example flow chart of a validation process performed by the validation system 110. At 1110, the processor 210 may receive a first finding from a first software security analysis tool 120A that performs a scan of application code, such as application code of a software project 910. At 1120, the processor 210 may identify a characteristic from the first finding. At 1130, the processor 210 may select, from the non-transitory computer readable medium 220, a criterion for validating the identified characteristic. At 1140, the processor 210 may determine a validity score for the first finding based on whether the selected criterion is met. At 1150, the processor 210 may determine whether the first finding is false positive by comparing the validity score to a predetermined validity threshold. At 1160, the processor 210 may display the first finding on the graphical user interface 262 when the first finding is true positive.

In one embodiment, the processor 210 may determine the number findings stored in the non-transitory computer readable medium 220 that overlap with the first finding. The processor 210 may determine whether the first finding is false positive based on the number of findings stored in the non-transitory computer readable medium 220 that overlap with the first finding.

In one embodiment, the processor 210 may select a confidence score 222 associated with the first software security analysis tool 120A from the non-transitory computer readable medium 220. The processor 210 may determine whether the first finding is false positive based on the confidence score associated with the first software security analysis tool 120A.

Figure 12:
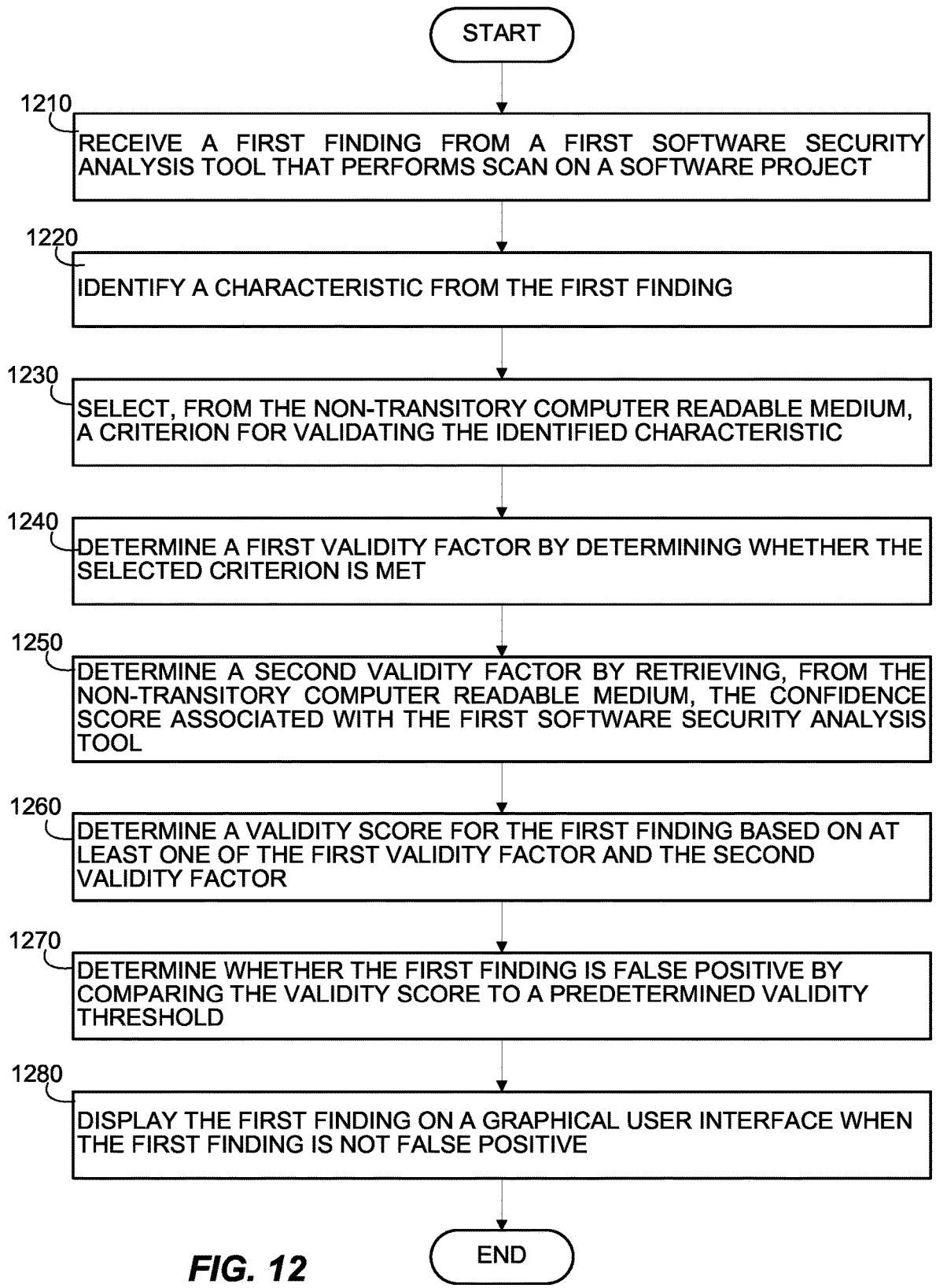
FIG. 12 is a third example flow chart of a validation process performed by the validation system according to one aspect of the disclosed technology.

FIG. 12 illustrates another example flow chart of a validation process performed by the validation system 110. At 1210, the processor 210 may receive a first finding from a first software security analysis tool 120A that performs a scan on application code, such as application code of a software project 910. At 1220, the processor 210 may identify a characteristic from the first finding. At 1230, the processor 210 may select, from the non-transitory computer readable medium 220, a criterion for validating the identified characteristic. At 1240, the processor 210 may determine a first validity factor by determining whether the selected criterion is met. At 1250, the processor 210 may determine a second validity factor by retrieving, from the non-transitory computer readable medium 220, the confidence score associated with the first software security analysis tool 120A. At 1260, the processor 210 may determine a validity score for the first finding based on at least one of the first validity factor and the second validity factor. At 1270, the processor 210 may determine whether the first finding is false positive by comparing the validity score to a predetermined validity threshold. At 1280, the processor 210 may display the first finding on a graphical user interface 262 when the first finding is true positive.

In one embodiment, the processor 210 may determine a number of findings stored in the non-transitory computer readable medium 220 that overlap with the first finding. The processor 210 may determine whether the first finding is false positive based on the number of findings stored in the non-transitory computer readable medium 220 that overlap with the first finding.

As shown in FIG. 2, various users or interest groups, such as application owners, developers, lines of business, and executive stakeholders may use the validation system 110.

In one example, the validation system 110 may orchestrate the software security analysis tools 120. The validation system 110 may interface with and collect information from various software security analysis tools 120 behind scenes. Acting as an abstraction layer on top of underlying interfaces for software security analysis tools 120, the validation system 110 may orchestrate the software security analysis tools 120 by selectively activating their scan functions to scan software projects, monitoring or tracking their scan activities throughout scan processes, and reviewing findings once scans are completed. The validation system 110 may serve as a single interface or a single end-point between the user and software security analysis tools 120. By serving as a single interface to access scan results of software security analysis tool 120, the validation system 110 may reduce complexity of integration and provide consistency when the user reviews scan results.

The validation system 110 may trigger multiple software security analysis tools 120 of the same category to start scan simultaneously or at predetermined timestamps. For example, the validation system 110 may instruct multiple SAST tools 130A-C to perform scan simultaneously or at predetermined timestamps. SAST tool 130A may be Checkmarx™, and SAST tool 130B may be Fortify™.

Also, the validation system 110 may trigger one or more software security analysis tools 120 of different categories to start scan simultaneously or at predetermined timestamps. For example, the validation system 110 may instruct multiple SAST tools 130A-B, and multiple OSA tools 140A-B to perform scan simultaneously or at predetermined timestamps. SAST tool 130A may be Checkmarx™, and SAST tool 130B may be Fortify™. OSA tool 140A may be Whitesource™, and OSA tool 150B may be Blackduck™.

The validation system 110 may trigger the same software security analysis tool 120, such as SAST tool 130A, to perform scan over scan at different timestamps or different scan sessions. SAST tool 130A may be Checkmarx™.

In one scenario, SAST tool 130A reports a finding that identifies a software issue that may need to be resolved to the validation system 110. To validate whether the issue has been resolved, the validation system 110 may not need to request the same SAST tool 130A to perform a scan for a second time. Instead, the validation system 110 may wait for remaining tools to complete their scans. Based on findings reported by the remaining tools, the validation system 110 may determine that the software issue has been resolved, the validation system 110 may update the aggregate scan result.

In one example, as shown in FIG. 2, the validation system 110 may be plugged into one or more CI/CD tools 170 such that whenever code is checked in or a change is made to a particular software product, the validation system 110 may automatically initiate one or more SAST tools 130A-C, one or more OSA tools 140A-C, one or more DAST tools 150A-C, or one or more IAST tools 160A-C to perform scan. Examples of the CI/CD tools 170 may include Jenkins™ and CircleCI™, among other possibilities.

In one example, the user may operate the validation system 110 through one or more external collectors 180. The external collectors 180 may communicate with the API 270 of the validation system 110. An example of the external collectors 180 may include Hygieia™, an open source DevOps dashboard for visualizing a development pipeline.

In one example, the validation system 110 may rely on the graphical user interface 262 to interact with a user, such as receiving user inquiries, and providing information related to the software security analysis tools 120 and findings to the user.

In one example, when the validation system 110 receives a scan request, for example, through the API 270, the validation system 110 may automatically trigger one or more software security analysis tools 120 of the same or different categories to start scan. The request may include a minimum level of information needed to selectively activate scan functions on the software security analysis tools 120. In some embodiments, the minimum level of information may be determined based on the selection of security analysis tools 120 accessible to the validation system 110, as well as other product or enterprise considerations. The minimum level of information required of a scan request may thus be abstracted from various requirements and parameters of the various security analysis tools, so as to provide an efficient interface for user interaction.

In one example, the scan request received by the validation system 110 may include identification of code of a software project. The identification of code may include a directory indicating where the code is stored. Alternatively, the identification of code may include a zip code file. The scan request may identify the language in which the code is written, such as the primary language that the code is written in. The request may also include an identifier for which component within the system it belongs to. After receiving the scan request, the validation system 110 may send instructions to interfaces, such as APIs or command line utilities, of the various software security analysis tools 120. The various software security analysis tools 120 may be selectively determined based on the request and/or the code. Some software security analysis tools 120 may require extra information beyond the scope of the scan request to start execution, such as a line count and secondary language of the code. Although such extra information is not present (or requested of a user) in the scan request received by the validation system 110, the validation system 110 may independently determine and provide such extra information to the software security analysis tools 120, without user intervention.

Traditionally, when an organization wants to transition from one security tool to another, or swaps out one or more security tools, the organization may need to retool. Such efforts are saved by the validation system 110. With the validation system 110, backend tools may be added to or removed from the validation system 110 in a process transparent to the user or internal customer of the organization.

Each tool 120 may have a different interface or protocol. For example, SAST tools 130A-C, OSA tools 140A-C, DAST tools 150A-C, and IAST tools 160A-C may have interfaces 232A-C, 242A-C, 252A-C and 262A-C, respectively. These tools may have different types of interfaces, including RESTful API, SOAP API, and a command line utility among other possibilities. Traditionally, the user needs to learn protocols of each tool. For instance, in a situation where a first tool has a RESTful API, a second tool has a SOAP API, and a third tool does not have an API but has a command line utility, the user needs to learn how to construct appropriate requests or parameters to execute each tool. With the validation system 110 of the example embodiments, the user is no longer involved with constructing requests or parameters required by the individual protocols of each tool. By dealing with the validation system 110 alone, the user does not need to learn protocols of each software security analysis tool 120 and does not need to deal with separate interfaces such as APIs or command lines.

The validation system 110 may initiate scan activities on multiple software security analysis tools 120, and monitor scan activities performed by each tool from start to completion. As each software security analysis tool 120 completes its scan activity, the validation system 110 may receive its findings, store the received findings in the non-transitory computer readable medium 220, and wait for remaining software security analysis tools 120 to complete scans. The non-transitory computer readable medium 220 may store historical information associated with scan activity performed by each software security analysis tool 120, including but not limited to historical developments of findings.

Each software security analysis tool 120 may have a vendor-established taxonomy. Findings reported by each software security analysis tool 120 may be in a vendor-provided format. The vendor-provided format may be XML, JSON, or other structured format.

In some example embodiments, the validation system 110 may not rely on or expressly adopt any given taxonomy. For example, the validation system 110 may not rely on CWE or vendor-established taxonomies. Instead, an example validation system 110 may have a unique internal standardized taxonomy that reconciles findings generated by different software security analysis tools 120. The standardized taxonomy may be managed or defined by a dynamic classification system of names and categories. The classification system may be dynamically maintained such that any new name or category revealed by any new finding may be dynamically added to the classification system.

As a result, regardless of their vendor-provided formats, the validation system 110 may normalize each finding to a standardized taxonomy, for instance, by performing mappings to corresponding names and categories in the classification system. For instance, the validation system 110 may normalize findings generated by the first tool 120A in the format of XML to the standardized taxonomy. The validation system 110 may normalize findings generated by the second tool 120B in the format of JSON to the standardized taxonomy.

The validation system 110 may determine a fingerprint that represents each normalized finding. Each fingerprint may be determined based on at least one of the following: CWE, framework alignment, code detail, and name, among other possibilities. The code detail may include line number and code content.

The non-transitory computer readable medium 220 may store historical findings 224 generated by each software security analysis tool 120. For instance, the non-transitory computer readable medium 220 may store normalized findings. Each normalized finding may be identifiable by the fingerprint. The non-transitory computer readable medium 220 may store information of historical updates of each normalized finding for display in the graphical user interface 262 upon request.

The validation system 110 may deduplicate findings and aggregate findings that are generated by the software security analysis tools 120. The validation system 110 may perform de-duplication of the findings provided by different tools 120. For instance, if findings returned by same or different tools 120 reveal the same software issue in the same software project, then the validation system 110 may eliminate duplicate findings. If findings returned by same or different tools 120 represent developments or updates over time on the same software issue in the same software project, the validation system 110 may track historical updates on the same software issue and make such information readily available to the user upon request.

The validation system 110 may rely on fingerprints to determine correlation or similarity among findings generated by different software security analysis tools 120.

For example, for each normalized finding, the validation system 110 may determine a fingerprint that identifies the normalized finding. The validation system 110 may collect or organize one or more of the following meta information or metadata surrounding each finding to form its fingerprint: associated CWE information, framework alignment, code details, and any identifying factor, among other possibilities. Framework alignment may include Web Application Security Consortium (WASC), and Open Web Application Security Project (OWASP) Top 10, among other possibilities. Code details may include line numbers and contents, among other possibilities. The fingerprint approach remains robust regardless whether the code position, line or content changes in subsequent scans.

The validation system 110 may use the fingerprint to determine whether a finding is unique. For this purpose, the validation system 110 may implement an algorithm that identifies partial or full matches of fingerprints. For instance, the validation system 110 may use a threshold of similarity to determine partial matches of fingerprints. The algorithm may tolerate differences in code line numbers or code contents. The algorithm may de-duplicate findings generated by different software security analysis tools 120. The algorithm may also de-duplicate findings generated by the same software security analysis tools 120, scan over scan, as attributes change.

To determine if there is any match or partial match among findings, the validation system 110 may compare the fingerprints. The validation system 110 may store distinct findings in the non-transitory computer readable medium 220. If two fingerprints at least partially match each other, their respective findings may be identical or related to each other. If two findings are identical, the validation system 110 may eliminate one finding to avoid duplication of findings. If two findings are related to each other, they may represent historical developments of the same software issue, such that one finding represents an update relative to the other finding.

For any new finding received by the validation system 110, after normalization, the validation system 110 may determine whether the same finding has already existed in the medium 220 by comparing the new fingerprint that identifies the new finding with fingerprints that identify existing findings already stored in the medium 220.

If the new fingerprint for the new finding fails to at least match any fingerprint for existing findings stored in the medium 220, the validation system may add the new finding to the medium 220. If the new fingerprint at least partially matches a fingerprint for an existing finding, the validation system 110 may determine if the new finding contains any update with respect to the existing finding. If no update, the validation system 110 may discard the new finding. If there is an update, the validation system 110 may update the medium 220 to include the update. Updates may include a line number change, or line content change, among other possibilities. The validation system 110 may track such historical developments or updates of same software issues.

Each validation system 110 may include one or more physical or logical devices (e.g., servers). For example, the validation system 110 may be a single device or server or may be configured as a distributed computer system including multiple servers, devices, or computers that interoperate to perform one or more of the processes and functionalities associated with the disclosed embodiments. In some embodiments, the validation system 110 may further include a peripheral interface, a transceiver, a mobile network interface in communication with the processor 210, a bus configured to facilitate communication between the various components of the validation system 110, and a power source configured to power one or more components of the validation system 110.

A peripheral interface may include hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, and ambient backscatter communications (ABC) protocols or similar technologies.

A mobile network interface may provide access to a cellular network, the Internet, a local area network, or another wide-area network. In some embodiments, a mobile network interface may include hardware, firmware, and/or software that allows the processor(s) 210 to communicate with other devices via wired or wireless networks, whether local or wide area, private or public, as known in the art. A power source may be configured to provide an appropriate alternating current (AC) or direct current (DC) to power components.

The processor 210 may include one or more of a microprocessor, microcontroller, digital signal processor, co-processor or the like or combinations thereof capable of executing stored instructions and operating upon stored data. The processor 210 may be one or more known processing devices, such as a microprocessor from the Pentium™ family manufactured by Intel™ or the Turion™ family manufactured by AMD™. The processor 210 may constitute a single core or multiple core processor that executes parallel processes simultaneously. For example, the processor 210 may be a single core processor that is configured with virtual processing technologies. In certain embodiments, the processor 210 may use logical processors to simultaneously execute and control multiple processes. The processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

The non-transitory computer readable medium 220 may contain an operating system ("OS") 225, a database 226 and a program 227. The non-transitory computer readable medium 220 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the non-transitory computer readable medium 220. The non-transitory computer readable medium 220 may include one or more memory devices that store data and instructions used to perform one or more features of the disclosed embodiments. The non-transitory computer readable medium 220 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The non-transitory computer readable medium 220 may include software components that, when executed by the processor 210, perform one or more processes consistent with the disclosed embodiments. In some embodiments, the non-transitory computer readable medium 220 may include the database 226 to perform one or more of the processes and functionalities associated with the disclosed embodiments. The non-transitory computer readable medium 220 may include one or more programs 227 to perform one or more functions of the disclosed embodiments. Moreover, the processor 210 may execute one or more programs 227 located remotely from the validation system 110. For example, the validation system 110 may access one or more remote programs 227, that, when executed, perform functions related to disclosed embodiments.

The validation system 110 may also include one or more I/O devices 260 that may comprise one or more interfaces for receiving signals or input from devices and providing signals or output to one or more devices that allow data to be received and/or transmitted by the validation system 110. For example, the validation system 110 may include interface components, which may provide interfaces to one or more input devices, such as one or more keyboards, mouse devices, touch screens, track pads, trackballs, scroll wheels, digital cameras, microphones, sensors, and the like, that enable the validation system 110 to receive data from one or more users. The validation system 110 may include a display, a screen, a touchpad, or the like for displaying images, videos, data, or other information. The I/O devices 260 may include the graphical user interface 262.

In exemplary embodiments of the disclosed technology, the validation system 110 may include any number of hardware and/or software applications that are executed to facilitate any of the operations. The one or more I/O interfaces 260 may be utilized to receive or collect data and/or user instructions from a wide variety of input devices. Received data may be processed by one or more computer processors as desired in various implementations of the disclosed technology and/or stored in one or more memory devices.

Turning back to FIG. 1, the networks 190 may include a network of interconnected computing devices more commonly referred to as the internet. The network 190 may be of any suitable type, including individual connections via the internet such as cellular or WiFi networks. In some embodiments, the network 190 may connect terminals, services, and mobile devices using direct connections such as radio-frequency identification (RFID), near-field communication (NFC), Bluetooth™, low-energy Bluetooth™ (BLE), WiFi™, ZigBee™ ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security. The network 190 may comprise any type of computer networking arrangement used to exchange data. For example, the network 190 may be the Internet, a private data network, virtual private network using a public network, and/or other suitable connection(s) that enables components in system environment 100 to send and receive information between the components of system 100. The network 190 may also include a public switched telephone network ("PSTN") and/or a wireless network. The network 190 may also include local network that comprises any type of computer networking arrangement used to exchange data in a localized area, such as WiFi, Bluetooth™ Ethernet, and other suitable network connections that enable components of system environment 100 to interact with one another.

According to some embodiments, the host server 192 may host websites, web portal or software application, data or software applications that may access and interact with the validation system 110. A website may be an internal page/site associated with an enterprise, or a publicly accessible website.

Exemplary Use Cases

The following example use case describes examples of implementations of the validation system 110. This is intended solely for explanatory purposes and not limitation.

FIG. 6 illustrates a screenshot 600 for operating the validation system 110 to perform SAST scans and OSA scans of application code. As shown in FIG. 6, by sending a request to the pictured "/assessment/static" endpoint, back-end scans may be orchestrated for all (or a subset of) enabled SAST tools 130 such as Fortify on Demand™ and Checkmarx™, and all enabled OSA tools 140 such as Whitesource™. The simplified interface shown in the screenshot 600 has two required inputs and two optional inputs (the remaining parameters and configurations etc. being handled automatically by the validation system 110), significantly lower than most individual tool integrations. The validation system 110 handles the rest of the required integration with various tools 120 behind the scenes, the required and optional inputs having been abstracted out for ease of use of the user.

FIG. 7 illustrates a screenshot 700 of the graphical user interface 262 of the validation system 110, according to an example implementation. The screenshot 700 depicts a view in the validation system 110 for a given software project or application showing its scan history. As shown, events may be shown sorted in an order from newest to oldest. The oldest event shows a "Completed" assessment where a single scan performed by tool A was run. Thereafter, the screenshot 700 also shows another assessment where two scans performed by tool A and tool B are in progress. In parallel to those scans, another assessment shows a scan performed by tool C with a "Completed" status. For example, tool A may be Checkmarx™, tool B may be Fortify on Demand™, and tool C may be WhiteSource™. Lastly, an additional request, listed as "Queued," is on hold until the scans that are currently in progress have completed.

The validation system 110 may monitor scan statuses of all tools 120 from start to completion. Once all scans of an assessment have completed, the assessment is marked as "Completed." Upon assessment completion, individual scan results of each tool 120 may be combined into a unified finding view and presented by the validation system 110.

The screenshot 700 also shows the ability for admins to configure specific scanners. This may be automatically done as components are enrolled, but can be overridden by admins. As shown in FIG. 7, next to that configuration, category risk scores are shown. This set of three scores are outcomes of most recent scan results. The first category risk score is a static vulnerability score that represents a combined static analysis result. The second category risk score is an open source license score that represents a combined open source license analysis. The third category risk score is an open source vulnerability score that represents open source known vulnerabilities.

FIG. 8 illustrates a screenshot 800 of the example graphical user interface 262 of the validation system 110, according to an example implementation. The screenshot 900 shows findings after each scan has finished. These findings are an aggregate scan result of multiple software security analysis tools 120. As shown in the screenshot 800, the first finding (e.g., a sensitive data exposure—hardcoded secret) was found by both two software security analysis tools: tool A and tool B. For examples, tool A may refer to Checkmarx™, and tool B may refer to Fortify on Demand™ (FOD). The shown results are filterable based on a category and name assigned to each result or finding. In some embodiments, the category and name may be based on a common internal taxonomy that may not directly correspond to a finding output by any one or more tools. After each tool yields its finding, the validation system 110 may through its de-duplication process determine that findings provided by each tool in fact refer to the same issue. Instead of creating separate records for the same issue, the validation system 110 may consolidate the findings by different tools as a single finding, as shown in the example of the first finding in FIG. 8.

The validation system 110 may unify various common fields, such as severity, category, and name to common internal taxonomy, rather than relying on CWE or some other external way to link them. The screenshot 800 illustrates a disposition side-bar where users may dispose findings, where disposition is handled across tools and across assessments/scans.

Determining Software Risk Scores

Consistent with the disclosed embodiments, a system for assessing software risks includes a non-transitory computer readable medium and a processor. The non-transitory computer readable medium stores category risk scores based on software security analysis findings generated by software security analysis tools of different categories. The processor is configured to receive at least one first finding from a first category of software security analysis tools that perform scans of application code. The processor computes a first category risk score based on the at least one first finding. The processor receives at least one second finding from a second category of software security analysis tools that perform scans of the application code. The processor computes a second category risk score based on the at least one second finding. The processor determines an overall risk score for the application code by computing a weighted average based on the first category risk score and the second category risk score. The processor displays the overall risk score on a graphical user interface.

In one embodiment, the first software security analysis tool and the second software security analysis tool belong to at least one of the following categories: a first category for performing SAST, and a second category for performing OSA, a third category for performing DAST, and a fourth category for performing IAST. Other software security analysis tools or tool categories may also be implemented.

In one embodiment, the first software security analysis tool and the second software security analysis tool belong to different categories.

In one embodiment, the first category risk score and the second category risk score each distinctly represent one of the following: static vulnerability score, open source vulnerability score, open source license score, dynamic vulnerability score and interactive vulnerability score.

In one embodiment, the processor is configured to receive at least one third finding from the second category of software security analysis tools. The processor computes a third category risk score based on the at least one third finding. The processor determines the overall risk score for the application code by computing the weighted average based on the first category risk score, the second category risk score and the third category risk score.

In one embodiment, the processor is configured to update the overall risk score for the application code over time based at least on one of the following: frequency of scan performed by each category of software security analysis tools, age of findings, and frequency of findings review.

In one embodiment, each finding is associated with a risk level of a plurality of different risk levels. Each risk level is associated with a unique deduction score for computing the category risk score. Findings of the same risk level have the same deduction score.

In one embodiment, at least one risk level has a maximum deduction threshold, such that once the maximum deduction threshold is met, further findings of the same risk level are disregarded for computing the category risk score.

In one embodiment, the processor is configured to receive at least one fourth finding from the first category of software security analysis tools. The processor determines whether to update the first category risk score based on the fourth finding. The processor updates the overall risk score when the first category risk score is updated.

In one embodiment, the fourth finding and the first finding are generated by different software security analysis tools of the first category.

In one embodiment, the fourth finding and the first finding are generated by the same software security analysis tool of the first category.

In one embodiment, the fourth finding and the first finding are generated in different scan sessions.

In one embodiment, the fourth finding and the first finding are generated during the same scan session.

In one embodiment, the processor determines to maintain the first category risk score without update when the fourth finding duplicates the first finding.

In one embodiment, the processor determines to maintain the first category risk score without update when the fourth finding and the first finding are of the same risk level. The maximum deduction threshold for the risk level has been met.

In one embodiment, each software security analysis tool is a standalone solution, a network-based client-server solution, a web-based solution, or a cloud-based solution.

Another aspect of the disclosed technology relates to a system for assessing software risks. The system includes a non-transitory computer readable medium and a processor. The non-transitory computer readable medium stores category risk scores based on findings generated by software security analysis tools of different categories. The processor is configured to receive at least one first finding from at least one SAST tool that performs a scan of application code. The processor computes a static vulnerability score based on the at least one first finding. The processor receives at least one second finding and at least one third finding from at least one OSA tool that performs a scan of the application code. The processor computes an open source vulnerability score based on the at least one second finding. The processor computes an open source license score based on the at least one third finding. The processor determines an overall risk score for the application code by computing a weighted average based on the static vulnerability score, the open source vulnerability score, and the open source license score. The processor displays the overall risk score for the application code on a graphical user interface.

In one embodiment, the processor is configured to update the overall risk score for the application code over time based at least on one of the following: frequency of scan performed by each category of software security analysis tools, age of findings, and frequency of findings review.

A further aspect of the disclosed technology relates to a system for assessing software risks. The system includes a non-transitory computer readable medium and a processor. The non-transitory computer readable medium stores category risk scores based on findings generated by software security analysis tools of different categories. The processor is configured to receive at least one first finding from at least one SAST tool that performs a scan of application code. The processor computes a static vulnerability score based on the at least one first finding. The processor receives at least one second finding and at least one third finding from at least one OSA tool that performs a scan of the application code. The processor computes an open source vulnerability score based on the at least one second finding. The processor computes an open source license score based on the at least one third finding. The processor receives at least one fourth finding from at least one DAST tool that performs a scan of the application code. The processor computes a dynamic vulnerability score based on the at least one fourth finding. The processor determines an overall risk score for the application code by computing a weighted average based on the static vulnerability score, the open source vulnerability score, the open source license score, and the dynamic vulnerability score. The processor displays the overall risk score for the application code on a graphical user interface.

In one embodiment, wherein the processor is configured to update the overall risk score for the application code over time based at least on one of the following: frequency of scan performed by each category of software security analysis tools, age of findings, and frequency of findings review.

Consistent with the disclosed embodiments, methods for determining risk scores based on findings generated by multiple software security analysis tools are disclosed.

FIG. 1 shows an example environment 100 that may implement certain aspects of the present disclosure. The components and arrangements shown in FIG. 1 are not intended to limit the disclosed embodiments as the components used to implement the disclosed processes and features may vary. As shown in FIG. 1, in some implementations, the environment 100 may include one or more of the following: one or more risk assessment systems 110, one or more software security analysis tools 120, one or more continuous integration, continuous delivery (CI/CD) tools 170, one or more external collectors 180, one or more networks 190, and one or more host servers 192.

The software security analysis tools 120 may include one or more categories, such as a first category of one or more SAST tools 130, a second category of one or more OSA tools 140, a third category of one or more DAST tools 150, and a fourth category of one or more IAST tools 160 among other possibilities.

Each software security analysis tool 120 of the first, second, third and fourth categories may be a standalone solution, a network-based client-server solution, a web-based solution, or a cloud-based solution, among other possibilities. Each software security analysis tool 120 may be provided by a different licensor or vendor, and thus each may be independent of each other. The SAST tools 130 may include Checkmarx™ and Fortify™, among other possibilities. The OSA tools 140 may include WhiteSource™ and Blackduck™, among other possibilities. The DAST tools 150 may include WebInspect™ and Contrast™, among other possibilities. The IAST tools 160 may include Veracode™ and WhiteHat™, among other possibilities.

For application code of each software project, the risk assessment system 110 may calculate category risk scores for each category of tools 120 that perform a scan of the application code. In particular, for application code of each software project, the risk assessment system 110 may determine a category risk score based on findings generated by the same category of tools 120. For example, the risk assessment system 110 may determine a static vulnerability score based on findings generated by one or more SAST tools 130, an open source vulnerability score and an open source license score based on findings generated by one or more OSA tools 140, a dynamic vulnerability score based on findings generated by one or more DAST tools 150, and an interactive vulnerability score based on findings generated by one or more IAST tools 160. If only one tool 120 of a given category is used to perform a scan of application code, that the category risk score for that specific category is based on findings of that tool alone. If multiple tools 120 of a given category are used to perform a scan of the application code, then the category risk score for that specific category is based on findings of all tools of that specific category.

Each category risk score may be a numeric score. Each category risk score may be normalized to a 100-point scale, among other possibilities. Each category risk score may take into account multiple scans performed by tools of the same category. Each category risk score may take into account multiple scans performed during the same scan session or at different scan sessions.

The risk assessment system 110 may compute an overall risk score across multiple categories of scans. The overall risk score may represent a total risk assessment by taking into consideration of each category risk score, such that software owner may have an increased understanding of software security posture. The overall risk score may be a numeric score. The overall risk score may be on a 100-point scale. The risk assessment system 110 may compute the overall risk score by computing a weighted average of various category risk scores. For instance, the overall risk score may be determined by computing a weighted average of at least two of the following category risk scores: static vulnerability score, open source vulnerability score, open source license score, dynamic vulnerability score, and interactive vulnerability score. Weights or weighting factors assigned to category risk scores are configurable. In one embodiment, each category risk score may be assigned with the same weight. In another embodiment, category risk scores may be given different weights based on risk appetite. For instance, for a bank software project, open source license score may be given a higher weight than static vulnerability score, as the open source license findings may represent a greater risk than static vulnerability findings. In one embodiment, the risk assessment system 110 may compute the overall risk score based on three category risk scores, including static vulnerability score with a 25% weight, open source vulnerability score with a 25% weight, and open source license score with a 50% weight.

To help software owners or developers gain a better understanding of security state of software projects over time, the risk assessment system 110 may adjust risk scores over time to account for additional risks subsequent to scan. The risk assessment system 110 may perform adjustments of category risk scores over time and/or overall risk score based on one or more of the following: frequency of scan performed by each category of software security analysis tools 120, age of specific findings, and frequency of findings review. The overall risk score may be recomputed and adjusted accordingly as category risk scores are adjusted. The overall risk score may not only indicate risks based on findings, but also reflect use of the tools 120.

For instance, if scans have not been performed frequently on application code of a software project, or no review has been performed on the software project recently, the risk assessment system 110 may not have information recent vulnerabilities, resulting in increased security risks. As a result, the risk assessment system 110 may adjust scores to indicate such increased security risks. For instance, if no scan has been performed on application code of the software project by any tools 120 for a month, the risk assessment system 110 may reduce the overall risk score by 10 points from a score of 80 to a score of 70.

Based on the overall risk score and the category risk scores, software owner or developer may determine any necessary action to address risks. For example, if the overall risk score is below a release threshold, the developer may decide not to release the software project. For instance, the overall risk score may be 75, and the release threshold may be 80. Since the overall risk score is below the release threshold, the developer may consider that it is too risky to release the software project.

Turning to FIG. 2, the risk assessment system 110 may compute risk scores across multiple categories of tools, including but not limited to, one or more SAST tools 130A-130C, one or more OSA tools 140A-140C, one or more DAST tools 150A-150C, and one or more IAST tools 160A-160C, among other possibilities.

The risk assessment system 110 may include one or more of the following: a processor 210, a non-transitory computer readable medium 220, an input/output ("I/O") device 260, and an application program interface (API) 270, among other possibilities. The I/O device 260 may include a graphical user interface 262.

The non-transitory computer readable medium 220 may store category risk scores that are determined based on findings generated by each category of tools 120. The non-transitory computer readable medium 220 may store the overall risk score for application code of each software project.

Figure 13:
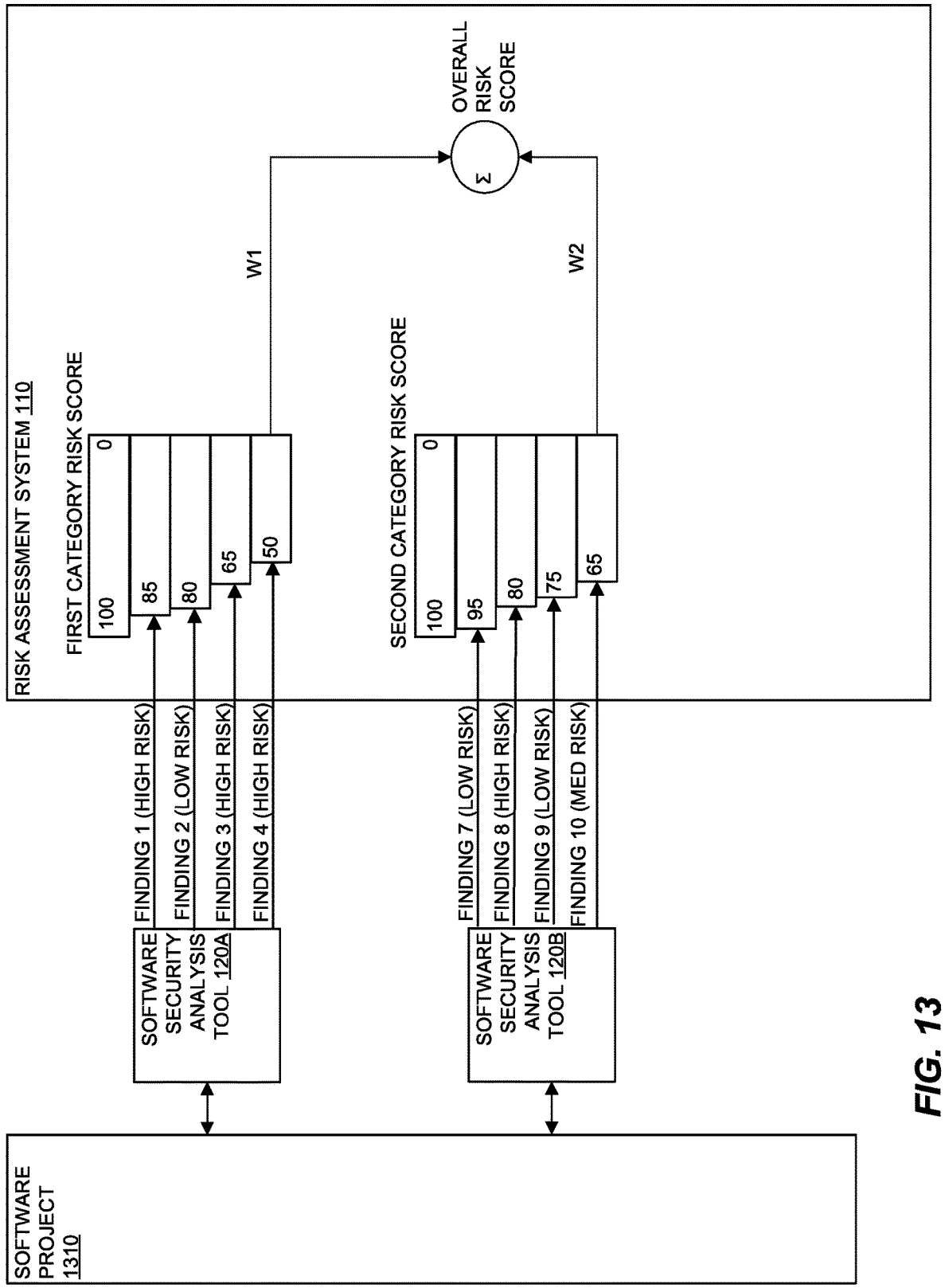
FIG. 13 is a first example block diagram illustrating a scoring process performed by the risk assessment system according to one aspect of the disclosed technology.

FIG. 13 illustrates a block diagram illustrating a scoring process performed by the risk assessment system 110. The risk assessment system 110 may instruct multiple software security analysis tools 120A and 120B to scan application code of a software project 1310. The software project 1310 may include a plurality of application code.

The first software security analysis tool 120A and the second software security analysis tool 120B may belong to at least one of the following categories: a first category for performing SAST, a second category for performing OSA, a third category for performing DAST, and a fourth category for performing IAST. Each tool 120A and 120B may belong to a different category. For instance, the first tool 120A may be a SAST tool, while the second tool 120B may be an OSA tool. The tools 120A and 120B may run during the same scan session or at different scan sessions.

In one embodiment, the tools 120A and 120B may be from different vendors. Each tool 120A, 120B may generate a finding at a vendor-provided format. For instance, the first tool 120A may generate findings in a first vendor-provided format, and the second tool 120B may generate findings in a second vendor-provided format. The first and second vendor-provided formats may be identical to or different from each other. In one example, findings generated by the first tool 120A may be in the format of XML, while findings generated by the second tool 120B may be in the format of JSON.

Application code of the software project 1310 may include several software issues that are detectable by one or more software security analysis tools. For instance, some software issues may be detectable by the first tool 120A, while other software issues may be detectable by the second tool 120B. Each tool may generate a finding corresponding to each detectable software issue. The tools 120A and 120B may report their findings to the risk assessment system 110. For instance, the tool 120A may report findings 1-4 to the risk assessment system 110, while the tool 120B may report findings 7-10 to the risk assessment system 110.

The tools 120A and 120B may report their findings at different timestamps or different scan sessions. For instance, the first tool 120A may report at a first timestamp, and the second tool 120B may report at a second timestamp. The second timestamp may occur after the first timestamp.

As shown in FIG. 13, the risk assessment system 110 may determine a first category risk score based on findings generated by the first tool 120A, and a second category risk score based on findings generated by the second tool 120B.

The risk assessment system 110 may assign a risk level to each finding. Risk levels may include low-risk level, medium-risk level and high-risk level, among other possibilities. Each risk level may be associated with predetermined deduction points to be used for calculating or reducing the category risk score. Different risk levels may be associated with different deduction points. For instance, low-risk findings, medium-risk findings and high-risk findings may be associated with 5, 10 and 15 deduction points, respectively. Each category risk score may start with its maximum value, such as 100 points. As the risk assessment system 110 receives each finding, the risk assessment system 110 may subtract the category risk score by the deduction point associated with the finding.

As shown in FIG. 13, with respect to findings generated by the first tool 120A, findings 1, 3 and 4 are high-risk findings, each associated with 15 deduction points, whereas finding 2 is a low risk finding associated with 5 deduction points. As the risk assessment system 110 receives each finding, the risk assessment system 110 deducts the first category risk score which starts with a default score, such as 100 points, by the deduction points associated with each finding.

With respect to findings generated by the second tool 120B, findings 7 and 9 are low risk findings, each associated with 5 deduction points. Finding 8 is high risk and associated with 15 deduction points. Finding 10 is medium risk and associated with 10 deduction points. As the risk assessment system 110 receives each finding, the risk assessment system 110 deducts the second category risk score which starts with the default score, such as 100 points, by the deduction points associated with each finding.

In one embodiment, the tools 120A and 120B belong to different categories of SAST, OSA, DAST and IAST tools. The risk classification of findings for each category may be different. For instance, one category may have three risk levels such as low, medium, and high risks, while another category may have five risk levels. Deduction points used in each risk classification of findings of different categories may be different. For instance, one category may have 5, 10 and 15 deduction points assigned to low-risk level, medium-risk level and high-risk level, while another category may have 2, 4, 6, 8 and 10 deduction points assigned to five distinct risk levels.

The risk assessment system 110 may assign a first weighting factor W1 to the first category risk score, and a second weighting factor W2 to the second category risk score. The risk assessment system 110 may compute an overall risk score by computing a weighted average of the first category risk score and the second category risk score.

Figure 14:
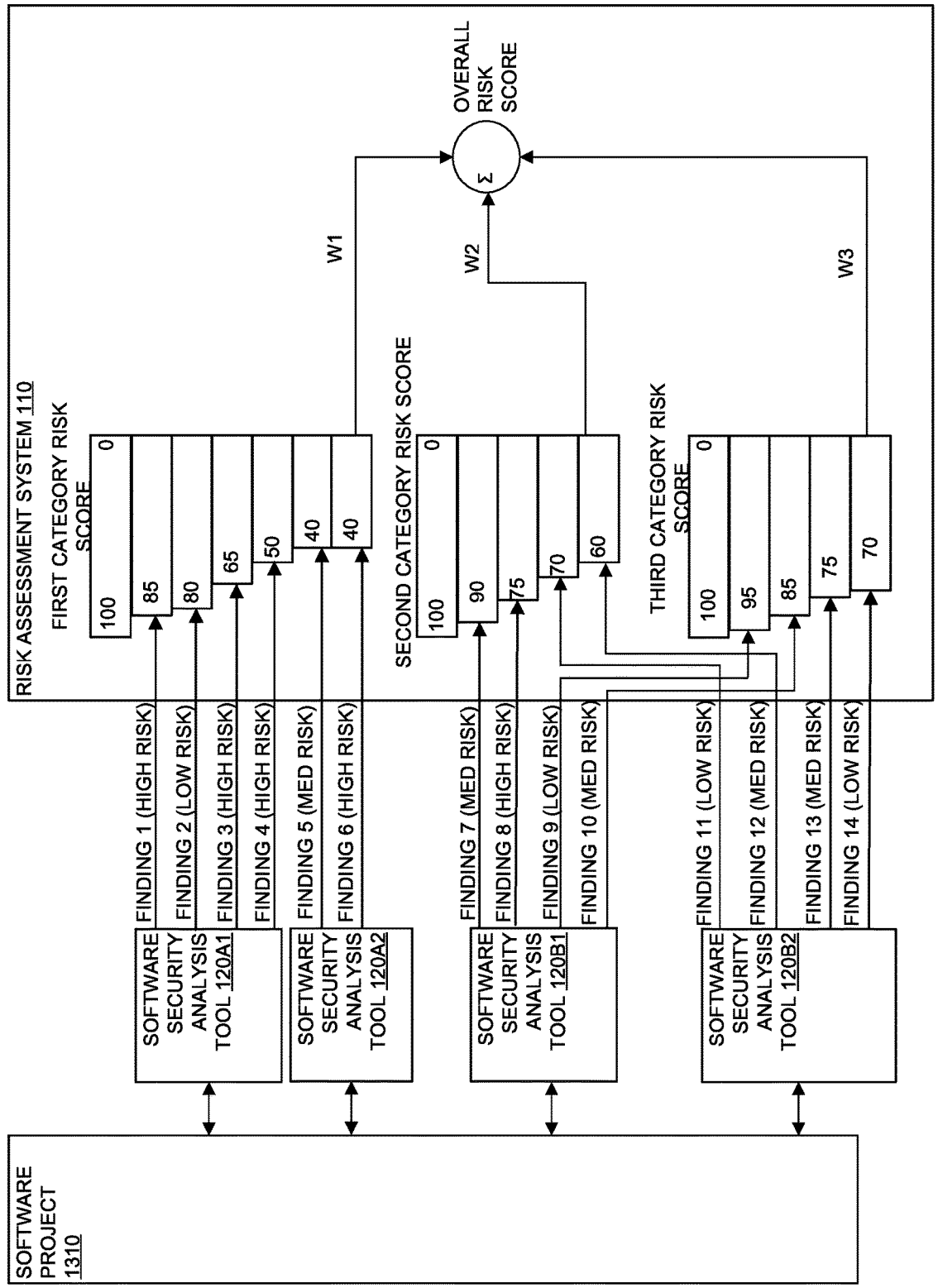
FIG. 14 is a second example block diagram illustrating a scoring process performed by the risk assessment system according to one aspect of the disclosed technology.

FIG. 14 illustrates a block diagram illustrating another scoring process performed by the risk assessment system 110. The risk assessment system 110 may compute a first category risk score based on findings provided by software security analysis tools 120A1 and 120A2. The tools 120A1 and 120A2 may be tools belonging to the same category. In one embodiment, both tools 120A1 and 120A2 may be SAST tools. For example, the tool 120A1 may be Checkmarx™, and the tool 120A2 may be Fortify™. The first category risk score may represent a static vulnerability score that indicates a combined static analysis result.

To compute the first category risk score, as the risk assessment system 110 receives each finding, the risk assessment system 110 deducts the first category risk score, which has a default value, such as 100 points, by the deduction points associated with each finding. The risk assessment system 110 may use the same risk level classification for assigning risk levels to findings generated by tools 120A1 and 120A2.

A risk level may be associated with a maximum deduction threshold, which may be configured by the risk assessment system 110. Once the maximum deduction threshold is reached, further finding of the same risk level may be discounted for purposes of computing scores. For instance, high-risk level may be associated with a maximum deduction threshold of 45 points. Once findings of high risks have collectively reached the maximum deduction threshold, any further high-risk finding will be discounted for purposes of computing the score. As shown in FIG. 14, findings 1, 3, 4 and 6 are all high-risk findings. Once findings 1, 3 and 4 have collectively reached the maximum deduction threshold of 45 points, any further finding, such as finding 6, is discounted for computing the score. Similarly, low-risk level and medium-risk levels each may be associated with a maximum deduction threshold. The maximum deduction threshold for each risk level may be different.

The first category risk score may be continuously updated by the risk assessment system 110 as more tools which are in the same category as tools 120A1 and 120A2 generate findings. Further, the risk assessment system 110 may update the first category risk score as each tool 120A1 and 120A2 performs subsequent scans on application code of the software project 1310.

Also illustrated in FIG. 14, the risk assessment system 110 may compute a second category risk score based on findings provided by software security analysis tools 120B1 and 120B2, and may compute a third category risk score also based on findings provided by software security analysis tools 120B1 and 120B2. The tools 120B1 and 120B2 may be tools of the same category. In one embodiment, the tools 120B1 and 120B2 may be OSA tools. For instance, the tool 120B1 may be WhiteSource™, and the tool 120B2 may be Blackduck™ The second category risk score may represent an open source vulnerability score that indicates a combined analysis of open source known vulnerabilities. The third category risk score may represent an open source license score that indicates a combined open source license analysis. The open source vulnerability score may indicate risks based on the library or code of the software project, whereas the open source license score may indicate risks introduced by licensing. The open source license score is computed by considering licensing risks, such as whether the software project needs to be open sourced by virtue of the license.

The risk assessment system 110 may compute the second category risk score based on findings 7-10, and compute the third category risk score based on findings 11-14.

Similar to the first category risk score, the second category risk score and the third category risk score may be continuously updated by the risk assessment system 110 as more tools which are in the same category as tools 120B1 and 120B2 generate findings. Further, the risk assessment system 110 may update the second category risk score and the third category risk score as each tool 120B1 and 120B2 performs subsequent scans on application code of the software project 1310.

The risk assessment system 110 may assign a first weighting factor W1 to the first category risk score, a second weighting factor W2 to the second category risk score, and a third weighting factor W3 to the third category risk score. The risk assessment system 110 may compute an overall risk score by computing a weighted average of the first category risk score, the second category risk score, and the third category risk score.

Figure 15:
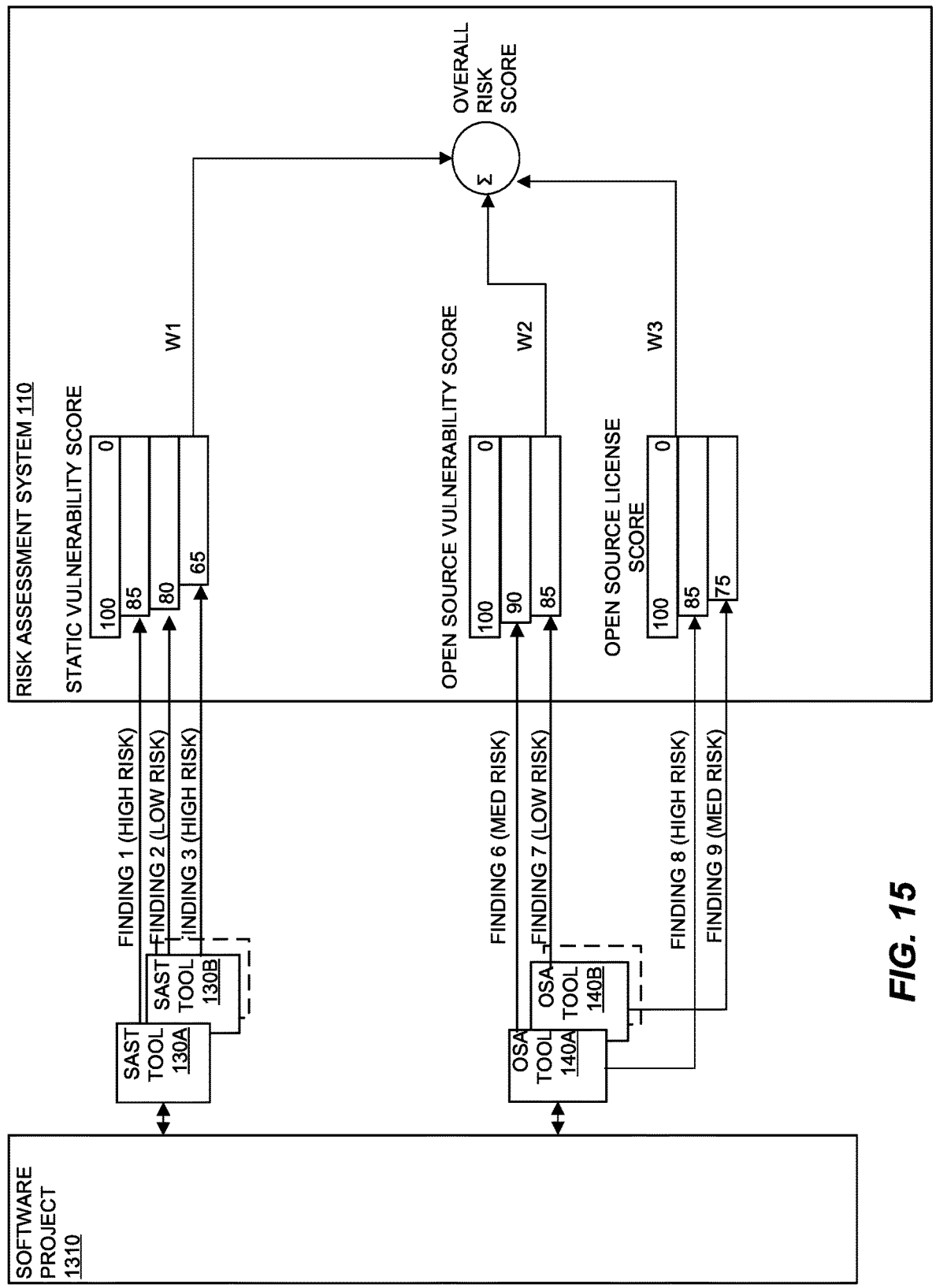
FIG. 15 is a third example block diagram illustrating a scoring process performed by the risk assessment system according to one aspect of the disclosed technology.

Turning to FIG. 15, in one embodiment, the risk assessment system 110 may compute a static vulnerability score based on findings generated by all SAST tools, including SAST tools 130A-B, that perform scans on application code of the software project 1310. The risk assessment system 110 may compute an open source vulnerability score based on findings generated by all OSA tools, including OSA tools 140A-B, that perform scans on application code of the software project 1310. Further, the risk assessment system 110 may compute an open source license score based on findings generated by all OSA tools, including OSA tools 140A-B. The risk assessment system 110 may assign weighting factors W1, W2 and W3 to the static vulnerability score, the open source vulnerability score, and the open source license score, respectively. The risk assessment system 110 may compute an overall risk score by computing a weighted average of the static vulnerability score, the open source vulnerability score, and the open source license score.

Figure 16:
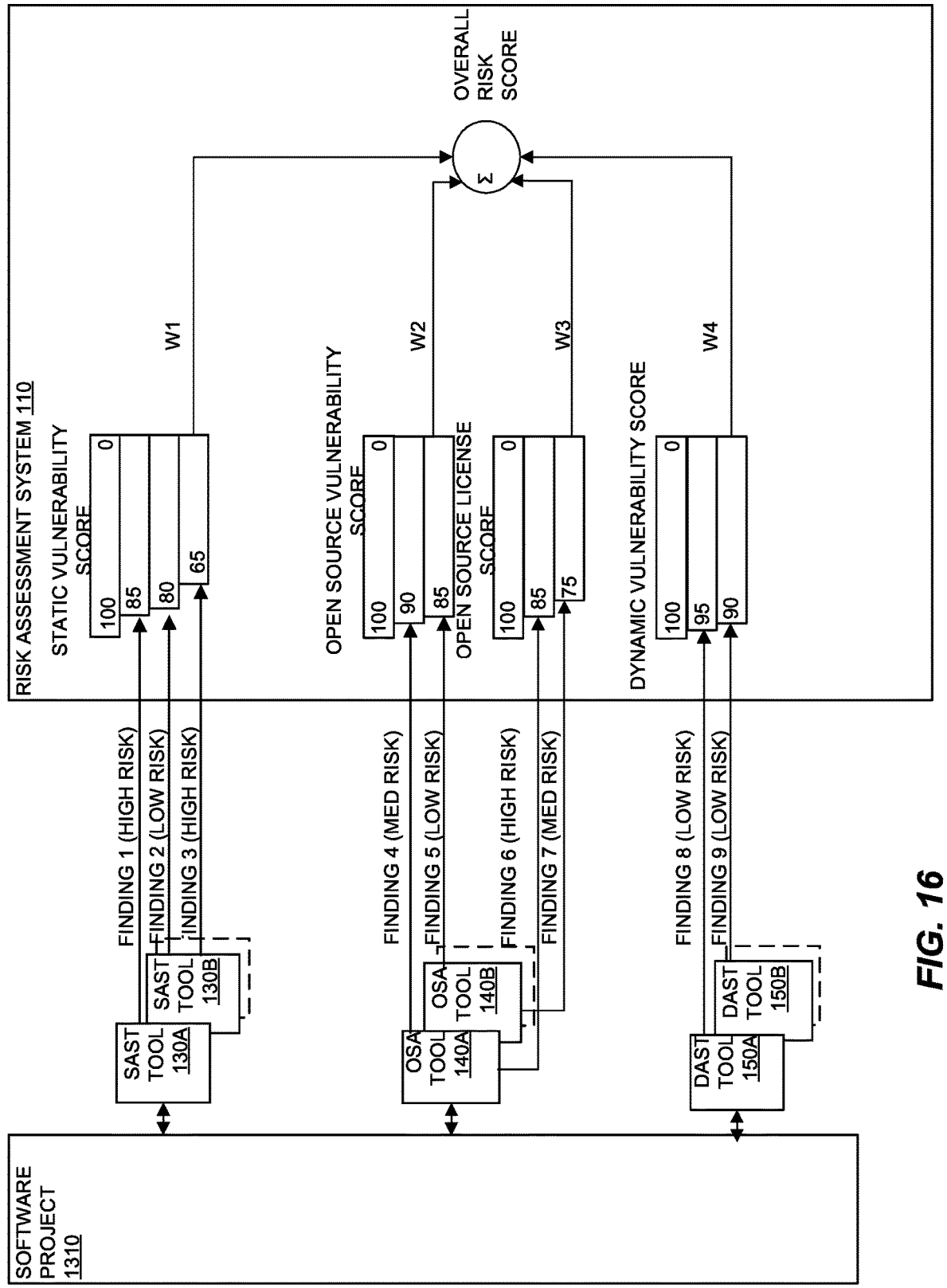
FIG. 16 is a fourth example block diagram illustrating a scoring process performed by the risk assessment system according to one aspect of the disclosed technology.

FIG. 16 illustrates an example of computing an overall risk score based on findings generated by SAST tools, OSA tools and DAST tools. Similar to FIG. 15, the risk assessment system 110 may compute a static vulnerability score based on findings generated by all SAST tools, compute an open source vulnerability score based on findings generated by all OSA tools, and compute an open source license score based on findings generated by all OSA tools. In addition, the risk assessment system 110 may compute a dynamic vulnerability score based on findings generated by all DAST tools, including DAST tools 150A-B. The dynamic vulnerability score may represent a combined dynamic analysis result. The risk assessment system 110 may assign weighting factors W1, W2, W3 and W4 to the static vulnerability score, the open source vulnerability score, the open source license score, and the dynamic vulnerability score, respectively. The risk assessment system 110 may compute an overall risk score by computing a weighted average of the static vulnerability score, the open source vulnerability score, the open source license score, and the dynamic vulnerability score.

Figure 17:
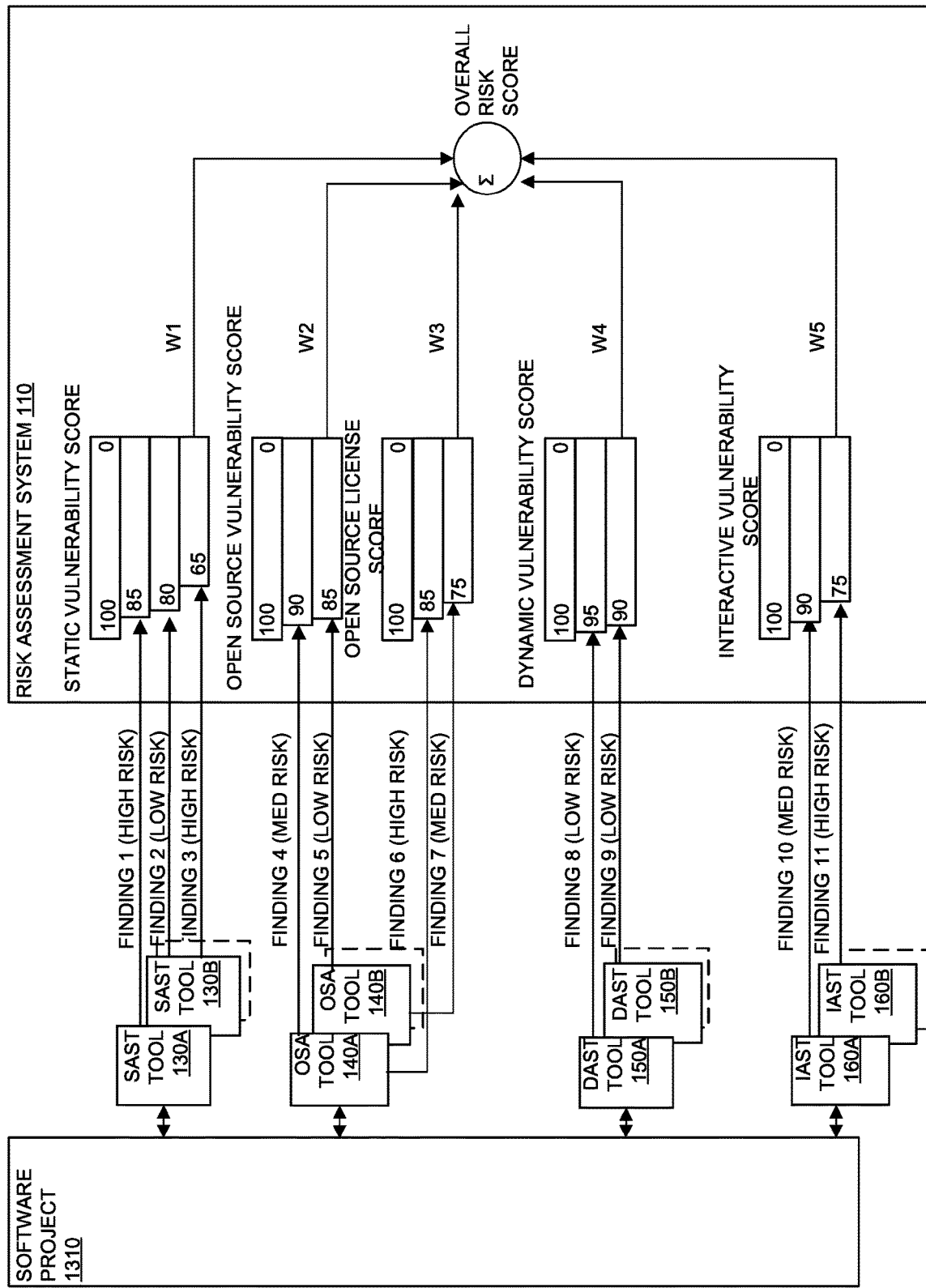
FIG. 17 is a fifth example block diagram illustrating a scoring process performed by the risk assessment system according to one aspect of the disclosed technology.

FIG. 17 illustrates an example of computing an overall risk score based on findings generated by SAST tools, OSA tools, DAST tools and IAST tools. Similar to FIG. 16, the risk assessment system 110 may compute a static vulnerability score based on findings generated by all SAST tools, compute an open source vulnerability score based on findings generated by all OSA tools, compute an open source license score based on findings generated by all OSA tools, and compute a dynamic vulnerability score based on findings generated by all DAST tools. In addition, the risk assessment system 110 may compute an interactive vulnerability score based on findings generated by all IAST tools, including IAST tools 160A-B. The interactive vulnerability score may represent a combined interactive analysis result. The risk assessment system 110 may assign weighting factors W1, W2, W3, W4 and W5 to the static vulnerability score, the open source vulnerability score, the open source license score, the dynamic vulnerability score, and the interactive vulnerability score respectively. The risk assessment system 110 may compute an overall risk score by computing a weighted average of the static vulnerability score, the open source vulnerability score, the open source license score, the dynamic vulnerability score, and the interactive vulnerability score.

All scores including the static vulnerability score, the open source vulnerability score, the open source license score, the dynamic vulnerability score, the interactive vulnerability score, and the overall score may be continuously updated as new tools perform scans on application code of the software project 1310 to generate more findings, or existing tools perform subsequent scans on application code of the software project 1310 in later scan sessions.

Figure 18:
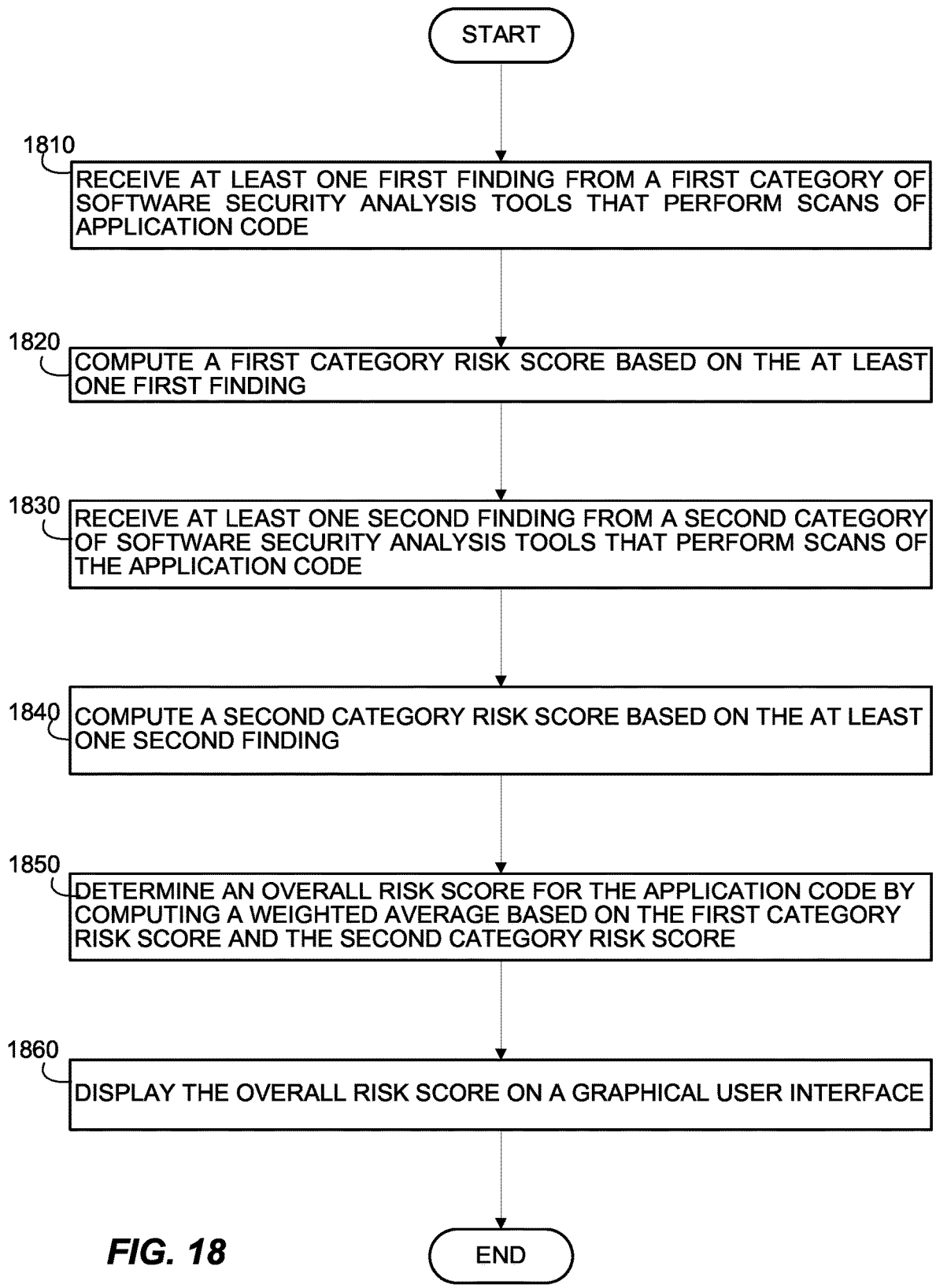
FIG. 18 is a first example flow chart of a scoring process performed by the risk assessment system according to one aspect of the disclosed technology.

FIG. 18 is an example flow chart of a scoring process performed by the risk assessment system 110. At 1810, the processor 210 may receive at least one first finding from a first category of software security analysis tools 120 that perform scans on application code of a software project 1310. At 1820, the processor 210 may compute a first category risk score based on the at least one first finding. At 1830, the processor 210 may receive at least one second finding from a second category of software security analysis tools 120 that perform scans on application code of the software project. The first software security analysis tool and the second software security analysis tool belong to at least one of the following categories: a first category for performing SAST, and a second category for performing OSA, a third category for performing DAST, and a fourth category for performing IAST. The first software security analysis tool and the second software security analysis tool may belong to different categories.

At 1840, the processor 210 may compute a second category risk score based on the at least one second finding. The first category risk score and the second category risk score each distinctly represent one of the following: static vulnerability score, open source vulnerability score, open source license score, dynamic vulnerability score and interactive vulnerability score.

At 1850, the processor 210 may determine an overall risk score for the application code of the software project by computing a weighted average based on the first category risk score and the second category risk score. At 1860, the processor 210 may display the overall risk score on the graphical user interface 262.

In one embodiment, the processor 210 may be configured to receive at least one third finding from the second category of software security analysis tools. The processor 210 may compute a third category risk score based on the at least one third finding. The processor 210 may determine the overall risk score for the application code of the software project by computing the weighted average based on the first category risk score, the second category risk score and the third category risk score.

In one embodiment, the processor 210 may be configured to update the overall risk score for the application code of the software project over time based at least on one of the following: frequency of scan performed by each category of software security analysis tools, age of findings, and frequency of findings review.

In one embodiment, each finding may be associated with a risk level of a plurality of different risk levels. Each risk level may be associated with deduction points for computing the category risk score. Findings of the same risk level may have the same deduction points.

In one embodiment, at least one risk level may have a maximum deduction threshold, such that once the maximum deduction threshold is met, further findings of the same risk level are disregarded for computing the category risk score.

In one embodiment, the processor 210 may be configured to receive at least one fourth finding from the first category of software security analysis tools. The processor 210 may determine whether to update the first category risk score based on the fourth finding. The processor 210 may update the overall risk score when the first category risk score is updated.

In one embodiment, the fourth finding and the first finding may be generated by different software security analysis tools of the first category. For instance, the first category may be SAST tools. The fourth finding may be generated by Checkmarx™, whereas the first finding may be generated by Fortify™.

In one embodiment, the fourth finding and the first finding may be generated by the same software security analysis tool of the first category. For instance, both findings may be generated by Checkmarx™. These findings may be generated in different scan sessions or during the same scan session.

In one embodiment, the processor 210 may determine to maintain the first category risk score without update when the fourth finding duplicates the first finding.

In one embodiment, the processor 210 may determine to maintain the first category risk score without update when the fourth finding and the first finding are of the same risk level, and the maximum deduction threshold for that risk level has been met.

Figure 19:
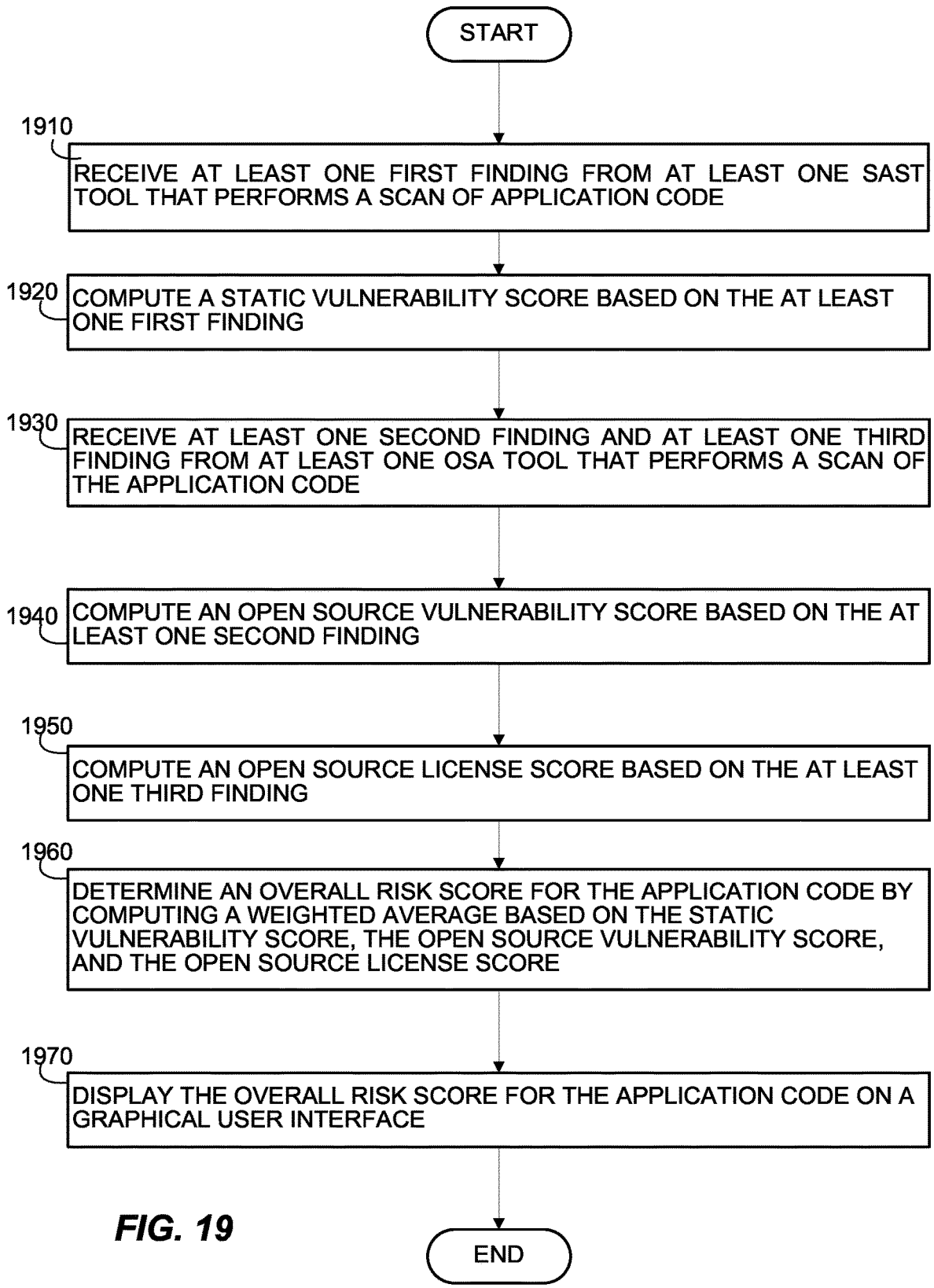
FIG. 19 is a second example flow chart of a scoring process performed by the risk assessment system according to one aspect of the disclosed technology.

FIG. 19 illustrates another example flow chart of a scoring process performed by the risk assessment system 110. At 1910, the processor 210 may receive at least one first finding from at least one SAST tool 130 that performs a scan of application code of a software project 1310. At 1920, the processor 210 may compute a static vulnerability score based on the at least one first finding. At 1930, the processor 210 may receive at least one second finding and at least one third finding from at least one OSA tool 140 that performs a scan of application code of the software project 1310. At 1940, the processor 210 may compute an open source vulnerability score based on the at least one second finding. At 1950, the processor 210 may compute an open source license score based on the at least one third finding. At 1960, the processor 210 may determine an overall risk score for the application code of the software project 1310 by computing a weighted average based on the static vulnerability score, the open source vulnerability score, and the open source license score. At 1970, the processor 210 may display the overall risk score for the application code of the software project on the graphical user interface 262.

Figure 20:
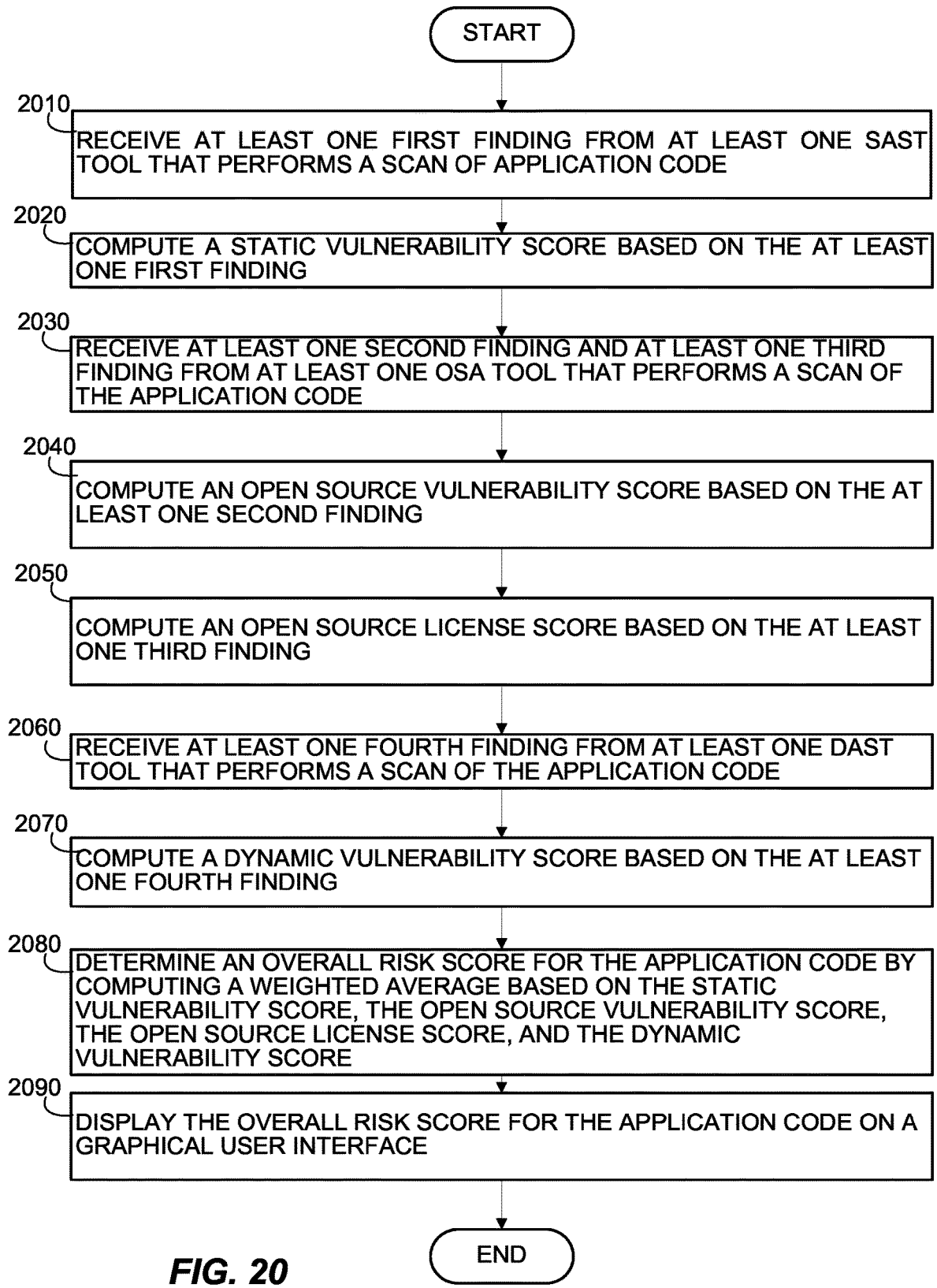
FIG. 20 is a third example flow chart of a scoring process performed by the risk assessment system according to one aspect of the disclosed technology.

FIG. 20 illustrates another example flow chart of a scoring process performed by the risk assessment system 110. At 2010, the processor 210 may receive at least one first finding from at least one SAST tool 120 that performs a scan of application code of a software project. At 2020, the processor 210 may compute a static vulnerability score based on the at least one first finding. At 2030, the processor 210 may receive at least one second finding and at least one third finding from at least one OSA tool 140 that performs a scan of application code of the software project. At 2040, the processor 210 may compute an open source vulnerability score based on the at least one second finding. At 2050, the processor 210 may compute an open source license score based on the at least one third finding. At 2060, the processor 210 may receive at least one fourth finding from at least one DAST tool 150 that performs a scan of application code of the software project. At 2070, the processor 210 may compute a dynamic vulnerability score based on the at least one fourth finding. At 2080, the processor 210 may determine an overall risk score for the application code of the software project 1310 by computing a weighted average based on the static vulnerability score, the open source vulnerability score, the open source license score, and the dynamic vulnerability score. At 2090, the processor 210 may display the overall risk score for the application code of the software project on the graphical user interface 262.

As shown in FIG. 2, various users or interest groups, such as application owners, developers, lines of business, and executive stakeholders may use the risk assessment system 110.

In one example, the risk assessment system 110 may orchestrate the software security analysis tools 120. The risk assessment system 110 may interface with and collect information from various software security analysis tools 120 behind scenes. Acting as an abstraction layer on top of underlying interfaces for software security analysis tools 120, the risk assessment system 110 may orchestrate the software security analysis tools 120 by selectively activating their scan functions to scan application code of software projects, monitoring or tracking their scan activities throughout scan processes, and reviewing findings once scans are completed. The risk assessment system 110 may serve as a single interface or a single end-point between the user and software security analysis tools 120. By serving as a single interface to access scan results of software security analysis tool 120, the risk assessment system 110 may reduce complexity of integration and provide consistency when the user reviews scan results.

The risk assessment system 110 may trigger multiple software security analysis tools 120 of the same category to start scan simultaneously or at predetermined timestamps. For example, the risk assessment system 110 may instruct multiple SAST tools 130A-C to perform scan simultaneously or at predetermined timestamps. SAST tool 130A may be Checkmarx™ and SAST tool 130B may be Fortify™.

Also, the risk assessment system 110 may trigger one or more software security analysis tools 120 of different categories to start scan simultaneously or at predetermined timestamps. For example, the risk assessment system 110 may instruct multiple SAST tools 130A-B, and multiple OSA tools 140A-B to perform scan simultaneously or at predetermined timestamps. SAST tool 130A may be Checkmarx™, and SAST tool 130B may be Fortify™. OSA tool 140A may be WhiteSource™, and OSA tool 150B may be Blackduck™.

The risk assessment system 110 may trigger the same software security analysis tool 120, such as SAST tool 130A, to perform scan over scan at different timestamps or different scan sessions. SAST tool 130A may be Checkmarx™.

In one scenario, SAST tool 130A reports a finding that identifies a software issue that may need to be resolved to the risk assessment system 110. To validate whether the issue has been resolved, the risk assessment system 110 may not need to request the same SAST tool 130A to perform scan for a second time. Instead, the risk assessment system 110 may wait for remaining tools to complete their scans. Based on findings reported by the remaining tools, the risk assessment system 110 may determine that the software issue has been resolved, the risk assessment system 110 may update the aggregate scan result.

In one example, as shown in FIG. 2, the risk assessment system 110 may be plugged into one or more CI/CD tools 170 such that whenever code is checked in or a change is made to a particular software product, the risk assessment system 110 may automatically initiate one or more SAST tools 130A-C, one or more OSA tools 140A-C, one or more DAST tools 150A-C, or one or more IAST tools 160A-C to perform scan. Examples of the CI/CD tools 170 may include Jenkins™ and CircleCIT™, among other possibilities.

In one example, the user may operate the risk assessment system 110 through one or more external collectors 180. The external collectors 180 may communicate with the API 270 of the risk assessment system 110. An example of the external collectors 180 may include Hygieia™, an open source DevOps dashboard for visualizing a development pipeline.

In one example, the risk assessment system 110 may rely on the graphical user interface 262 to interact with a user, such as receiving user inquiries, and providing information related to the software security analysis tools 120 and findings to the user.

In one example, when the risk assessment system 110 receives a scan request, for example, through the API 270, the risk assessment system 110 may automatically trigger one or more software security analysis tools 120 of the same or different categories to start scan. The request may include a minimum level of information needed to selectively activate scan functions on the software security analysis tools 120. In some embodiments, the minimum level of information may be determined based on the selection of security analysis tools 120 accessible to the risk assessment system 110, as well as other product or enterprise considerations. The minimum level of information required of a scan request may thus be abstracted from various requirements and parameters of the various security analysis tools, so as to provide an efficient interface for user interaction.

In one example, the scan request received by the risk assessment system 110 may include identification of code of a software project. The identification of code may include a directory indicating where the code is stored. Alternatively, the identification of code may include a zip code file. The scan request may identify the language in which the code is written, such as the primary language that the code is written in. The request may also include an identifier for which component within the system it belongs to. After receiving the scan request, the risk assessment system 110 may send instructions to interfaces, such as APIs or command line utilities, of the various software security analysis tools 120. The various software security analysis tools 120 may be selectively determined based on the request and/or the code. Some software security analysis tools 120 may require extra information beyond the scope of the scan request to start execution, such as a line count and secondary language of the code. Although such extra information is not present (or requested of a user) in the scan request received by the risk assessment system 110, the risk assessment system 110 may independently determine and provide such extra information to the software security analysis tools 120, without user intervention.

Traditionally, when an organization wants to transition from one security tool to another, or swaps out one or more security tools, the organization may need to retool. Such efforts are saved by the risk assessment system 110. With the risk assessment system 110, backend tools may be added to or removed from the risk assessment system 110 in a process transparent to the user or internal customer of the organization.

Each tool 120 may have a different interface or protocol. For example, SAST tools 130A-C, OSA tools 140A-C, DAST tools 150A-C, and IAST tools 160A-C may have interfaces 232A-C, 242A-C, 252A-C and 262A-C, respectively. These tools may have different types of interfaces, including RESTful API, SOAP API, and a command line utility among other possibilities. Traditionally, the user needs to learn protocols of each tool. For instance, in a situation where a first tool has a RESTful API, a second tool has a SOAP API, and a third tool does not have an API but has a command line utility, the user needs to learn how to construct appropriate requests or parameters to execute each tool. With the risk assessment system 110 of the example embodiments, the user is no longer involved with constructing requests or parameters required by the individual protocols of each tool. By dealing with the risk assessment system 110 alone, the user does not need to learn protocols of each software security analysis tool 120 and does not need to deal with separate interfaces such as APIs or command lines.

The risk assessment system 110 may initiate scan activities on multiple software security analysis tools 120, and monitor scan activities performed by each tool from start to completion. As each software security analysis tool 120 completes its scan activity, the risk assessment system 110 may receive its findings, store the received findings in the non-transitory computer readable medium 220, and wait for remaining software security analysis tools 120 to complete scans. The non-transitory computer readable medium 220 may store historical information associated with scan activity performed by each software security analysis tool 120, including but not limited to historical developments of findings.

Each software security analysis tool 120 may have a vendor-established taxonomy. Findings reported by each software security analysis tool 120 may be in a vendor-provided format. The vendor-provided format may be XML, JSON, or other structured format.

In some example embodiments, the risk assessment system 110 may not rely on or expressly adopt any given taxonomy. For example, the risk assessment system 110 may not rely on CWE or vendor-established taxonomies. Instead, an example risk assessment system 110 may have a unique internal standardized taxonomy that reconciles findings generated by different software security analysis tools 120. The standardized taxonomy may be managed or defined by a dynamic classification system of names and categories. As a result, regardless of their vendor-provided formats, the risk assessment system 110 may normalize each finding to a standardized taxonomy, for instance, by performing mappings to corresponding names and categories in the classification system. The classification system may be dynamically maintained such that any new name or category revealed by any new finding may be dynamically added to the classification system.

For each finding, the risk assessment system 110 may normalize the finding to the standardized taxonomy. For instance, the risk assessment system 110 may normalize findings generated by the first tool 120A in the format of XML to the standardized taxonomy. The risk assessment system 110 may normalize findings generated by the second tool 120B in the format of JSON to the standardized taxonomy.

The risk assessment system 110 may determine a fingerprint that represents each normalized finding. Each fingerprint may be determined based on at least one of the following: CWE, framework alignment, code detail, and name, among other possibilities. The code detail may include line number and code content.

The non-transitory computer readable medium 220 may store historical findings 224 generated by each software security analysis tool 120. For instance, the non-transitory computer readable medium 220 may store normalized findings. Each normalized finding may be identifiable by the fingerprint. The non-transitory computer readable medium 220 may store information of historical updates of each normalized finding for display in the graphical user interface 262 upon request.

The risk assessment system 110 may deduplicate findings and aggregate findings that are generated by the software security analysis tools 120. The risk assessment system 110 may perform de-duplication of the findings provided by different tools 120. For instance, if findings returned by same or different tools 120 reveal the same software issue in the same software project, then the risk assessment system 110 may eliminate duplicate findings. If findings returned by same or different tools 120 represent developments or updates over time on the same software issue in the same software project, the risk assessment system 110 may track historical updates on the same software issue and make such information readily available to the user upon request.

The risk assessment system 110 may rely on fingerprints to determine correlation or similarity among findings generated by different software security analysis tools 120. The fingerprint approach may be associated with line position, contents, CWE and other identifying factors, to determine whether two findings produced by two different software security analysis tools 120 are the same. The fingerprint approach remains robust regardless whether the code position, line or content changes in subsequent scans.

For example, for each normalized finding, the risk assessment system 110 may determine a fingerprint that identifies the normalized finding. The risk assessment system 110 may collect or organize one or more of the following meta information or metadata surrounding each finding to form its fingerprint: associated CWE information, framework alignment, code details, and any identifying factor, among other possibilities. Framework alignment may include Web Application Security Consortium (WASC), and Open Web Application Security Project (OWASP) Top 10, among other possibilities. Code details may include line numbers and contents, among other possibilities.

The risk assessment system 110 may use the fingerprint to determine whether a finding is unique. For this purpose, the risk assessment system 110 may implement an algorithm that identifies partial or full matches of fingerprints. For instance, the risk assessment system 110 may use a threshold of similarity to determine partial matches of fingerprints. The algorithm may tolerate differences in code line numbers or code contents. The algorithm may de-duplicate findings generated by different software security analysis tools 120. The algorithm may also de-duplicate findings generated by the same software security analysis tools 120, scan over scan, as attributes change.

To determine whether two findings are identical or relevant to each other, the risk assessment system 110 may compare their respective fingerprints. If two fingerprints at least partially match each other, their respective findings may be identical or related to each other. If two findings are identical, the risk assessment system 110 may eliminate one finding to avoid duplication of findings. If two findings are related to each other, they may represent historical developments of the same software issue, such that one finding represents an update relative to the other finding. Updates may include a line number change, or line content change, among other possibilities. The risk assessment system 110 may track such historical developments or updates of same software issues.

To determine if there is any match or partial match among findings, the risk assessment system 110 may compare the fingerprints. The risk assessment system 110 may store distinct findings in the non-transitory computer readable medium 220. For any new finding received by the risk assessment system 110, after normalization, the risk assessment system 110 may determine whether the same finding has already existed in the medium 220 by comparing the new fingerprint that identifies the new finding with fingerprints that identify existing findings already stored in the medium 220.

If the new fingerprint for the new finding fails to at least match any fingerprint for existing findings stored in the medium 220, the risk assessment system may add the new finding to the medium 220. If the new fingerprint at least partially matches a fingerprint for an existing finding, the risk assessment system 110 may determine if the new finding contains any update with respect to the existing finding. If no update, the risk assessment system 110 may discard the new finding. If there is an update, the risk assessment system 110 may update the medium 220 to include the update.

Each risk assessment system 110 may include one or more physical or logical devices (e.g., servers). For example, the risk assessment system 110 may be a single device or server or may be configured as a distributed computer system including multiple servers, devices, or computers that interoperate to perform one or more of the processes and functionalities associated with the disclosed embodiments. In some embodiments, the risk assessment system 110 may further include a peripheral interface, a transceiver, a mobile network interface in communication with the processor 210, a bus configured to facilitate communication between the various components of the risk assessment system 110, and a power source configured to power one or more components of the risk assessment system 110.

A peripheral interface may include hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, and ambient backscatter communications (ABC) protocols or similar technologies.

A mobile network interface may provide access to a cellular network, the Internet, a local area network, or another wide-area network. In some embodiments, a mobile network interface may include hardware, firmware, and/or software that allows the processor(s) 210 to communicate with other devices via wired or wireless networks, whether local or wide area, private or public, as known in the art. A power source may be configured to provide an appropriate alternating current (AC) or direct current (DC) to power components.

The processor 210 may include one or more of a microprocessor, microcontroller, digital signal processor, co-processor or the like or combinations thereof capable of executing stored instructions and operating upon stored data. The processor 210 may be one or more known processing devices, such as a microprocessor from the Pentium™ family manufactured by Intel™ or the Turion™ family manufactured by AMD™. The processor 210 may constitute a single core or multiple core processor that executes parallel processes simultaneously. For example, the processor 210 may be a single core processor that is configured with virtual processing technologies. In certain embodiments, the processor 210 may use logical processors to simultaneously execute and control multiple processes. The processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

The non-transitory computer readable medium 220 may contain an operating system ("OS") 222 and a program 224. The non-transitory computer readable medium 220 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the non-transitory computer readable medium 220. The non-transitory computer readable medium 220 may include one or more memory devices that store data and instructions used to perform one or more features of the disclosed embodiments. The non-transitory computer readable medium 220 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The non-transitory computer readable medium 220 may include software components that, when executed by the processor 210, perform one or more processes consistent with the disclosed embodiments. In some embodiments, the non-transitory computer readable medium 220 may include a database 224 to perform one or more of the processes and functionalities associated with the disclosed embodiments. The non-transitory computer readable medium 220 may include one or more programs 226 to perform one or more functions of the disclosed embodiments. Moreover, the processor 210 may execute one or more programs 226 located remotely from the risk assessment system 110. For example, the risk assessment system 110 may access one or more remote programs 226, that, when executed, perform functions related to disclosed embodiments.

The risk assessment system 110 may also include one or more I/O devices 260 that may comprise one or more interfaces for receiving signals or input from devices and providing signals or output to one or more devices that allow data to be received and/or transmitted by the risk assessment system 110. For example, the risk assessment system 110 may include interface components, which may provide interfaces to one or more input devices, such as one or more keyboards, mouse devices, touch screens, track pads, trackballs, scroll wheels, digital cameras, microphones, sensors, and the like, that enable the risk assessment system 110 to receive data from one or more users. The risk assessment system 110 may include a display, a screen, a touchpad, or the like for displaying images, videos, data, or other information. The I/O devices 260 may include the graphical user interface 262.

In exemplary embodiments of the disclosed technology, the risk assessment system 110 may include any number of hardware and/or software applications that are executed to facilitate any of the operations. The one or more I/O interfaces 260 may be utilized to receive or collect data and/or user instructions from a wide variety of input devices. Received data may be processed by one or more computer processors as desired in various implementations of the disclosed technology and/or stored in one or more memory devices.

Turning back to FIG. 1, the networks 190 may include a network of interconnected computing devices more commonly referred to as the internet. The network 190 may be of any suitable type, including individual connections via the internet such as cellular or WiFi networks. In some embodiments, the network 180 may connect terminals, services, and mobile devices using direct connections such as radio-frequency identification (RFID), near-field communication (NFC), Bluetooth™, low-energy Bluetooth™ (BLE), WiFi™, ZigBee™ ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security. The network 190 may comprise any type of computer networking arrangement used to exchange data. For example, the network 190 may be the Internet, a private data network, virtual private network using a public network, and/or other suitable connection(s) that enables components in system environment 100 to send and receive information between the components of system 100. The network 190 may also include a public switched telephone network ("PSTN") and/or a wireless network. The network 190 may also include local network that comprises any type of computer networking arrangement used to exchange data in a localized area, such as WiFi, Bluetooth™ Ethernet, and other suitable network connections that enable components of system environment 100 to interact with one another.

According to some embodiments, the host server 192 may host websites, web portal or software application, data or software applications that may access and interact with the risk assessment system 110. A website may be an internal page/site associated with an enterprise, or a publicly accessible website.

Exemplary Use Cases

The following example use case describes examples of implementations of the risk assessment system 110. This is intended solely for explanatory purposes and not limitation.

FIG. 6 illustrates a screenshot 600 for operating the risk assessment system 110 to perform SAST scans and OSA scans of application code. As shown in FIG. 6, by sending a request to the pictured "/assessment/static" endpoint, backend scans may be orchestrated for all (or a subset of) enabled SAST tools 130 such as Fortify on Demand™ and Checkmarx™ and all enabled OSA tools 140 such as WhiteSource™. The simplified interface shown in the screenshot 600 has two required inputs and two optional inputs (the remaining parameters and configurations etc. being handled automatically by the risk assessment system 110), significantly lower than most individual tool integrations. The risk assessment system 110 handles the rest of the required integration with various tools 120 behind the scenes, the required and optional inputs having been abstracted out for ease of use of the user.

FIG. 7 illustrates a screenshot 700 of the graphical user interface 262 of the risk assessment system 110, according to an example implementation. FIG. 7 illustrates a few elements of the orchestration process. The screenshot 700 depicts a view in the risk assessment system 110 for a given software project or application showing its scan history. As shown, events may be shown sorted in an order from newest to oldest. The oldest event shows a "Completed" assessment where a single scan performed by tool A was run. Thereafter, the screenshot 700 also shows another assessment where two scans performed by tool A and tool B are in progress. In parallel to those scans, another assessment shows a scan performed by tool C with a "Completed" status. For example, tool A may be Checkmarx™, tool B may be Fortify on Demand™, and tool C may be WhiteSource™. Lastly, an additional request, listed as "Queued," is on hold until the scans that are currently in progress have completed.

The risk assessment system 110 monitors scan statuses of all tools 120 from start to completion. Once all scans of an assessment have completed, the assessment is marked as "Completed." Upon assessment completion, individual scan results of each tool 120 may be combined into a unified finding view and presented by the risk assessment system 110.

The screenshot 700 also shows the ability for admins to configure specific scanners. This may be automatically done as components are enrolled, but can be overridden by admins. As shown in FIG. 7, next to that configuration, category risk scores are shown. This set of three scores are outcomes of most recent scan results. The first category risk score is a static vulnerability score that represents a combined static analysis result. The second category risk score is an open source license score that represents a combined open source license analysis. The third category risk score is an open source vulnerability score that represents open source known vulnerabilities.

FIG. 8 illustrates a screenshot 1300 of the example graphical user interface 262 of the risk assessment system 110, according to an example implementation. The screenshot 800 shows findings after each scan has finished. These findings are an aggregate scan result of multiple software security analysis tools 120. As shown in the screenshot 800, the first finding (e.g., a sensitive data exposure—hardcoded secret) was found by both two software security analysis tools: tool A and tool B. For examples, tool A may refer to Checkmarx™, and tool B may refer to Fortify on Demand™ (FOD). The shown results are filterable based on a category and name assigned to each result or finding. In some embodiments, the category and name may be based on a common internal taxonomy that may not directly correspond to a finding output by any one or more tools. After each tool yield its finding, the risk assessment system 110 may through its de-duplication process determine that findings provided by each tool in fact refer to the same issue. Instead of creating separate records for the same issue, the risk assessment system 110 may consolidate the findings by different tools as a single finding, as shown in the example of the first finding in FIG. 8.

The risk assessment system 110 may unify various common fields, such as severity, category, and name to common internal taxonomy, rather than relying on CWE or some other external way to link them. The screenshot 800 illustrates a disposition side-bar where users may dispose findings, where disposition is handled across tools and across assessments/scans.

De-Duplication of Findings

Consistent with the disclosed embodiments, a system for performing de-duplication of findings includes a non-transitory computer readable medium, a graphical user interface and a processor. The non-transitory computer readable medium stores normalized software security analysis findings of application code performed by at least one software security analysis tool. Each normalized finding is identifiable by a fingerprint. The graphical user interface is configured to display information related to each normalized finding. The processor receives a first finding in a first vendor-provided format from a first software security analysis tool that performs a scan of application code. The processor normalizes the first finding to a standardized taxonomy. The processor determines a first fingerprint that identifies the normalized first finding. The non-transitory computer readable medium stores the normalized first finding identifiable by the first fingerprint and associated with a first timestamp. The processor receives a second finding in a second vendor-provided format from a second software security analysis tool that performs a scan of the application code. The processor normalizes the second finding to the standardized taxonomy. The processor determines a second fingerprint that identifies the normalized second finding. The processor determines whether the second fingerprint at least partially matches each fingerprint stored in the non-transitory computer readable medium. The processor determines any need to update the normalized first finding by comparing the normalized second finding with the normalized first finding after determining that the second fingerprint at least partially matches the first fingerprint.

In one embodiment, the first software security analysis tool and the second software security analysis tool belong to at least one of the following categories: a first category for performing SAST, and a second category for performing DAST.

In one embodiment, the first software security analysis tool and the second software security analysis tool belong to the same category.

In one embodiment, the first software security analysis tool and the second software security analysis tool belong to different categories.

In one embodiment, each fingerprint includes at least one of the following: name, category, and severity of a finding.

In one embodiment, the code detail includes line number and code content.

In one embodiment, the first software security analysis tool and the second software security analysis tool are from different vendors.

In one embodiment, the first software security analysis tool is identical to the second software security analysis tool.

In one embodiment, the first software security analysis tool is different from the second software security analysis tool.

In one embodiment, the first vendor-provided format is identical to the second vendor-provided format.

In one embodiment, the first vendor-provided format is different from the second vendor-provided format.

In one embodiment, the processor may determine that the second fingerprint at least partially matches the first fingerprint. After the processor determines that the normalized second finding differs from the normalized first finding, the processor stores an update to the normalized first finding in the non-transitory computer readable medium. The update to the normalized first finding is associated with the second timestamp. The graphical user interface may be configured to display the normalized first finding and the first timestamp. The graphical user interface may also be configured to display the update to the normalized first finding and the second timestamp.

In one embodiment, the processor determines that the second fingerprint fails to at least partially match each fingerprint stored in the non-transitory computer readable medium. The processor adds the normalized second finding for storage in the non-transitory computer readable medium. The normalized second finding is identifiable by the second fingerprint.

In one embodiment, each software security analysis tool is a standalone solution, a network-based client-server solution, a web-based solution, or a cloud-based solution.

In one embodiment, the non-transitory computer readable medium stores information of historical updates of each normalized finding for display in the graphical user interface upon request.

Another aspect of the disclosed technology relates to a system for performing de-duplication of findings, where the system includes a non-transitory computer readable medium, a graphical user interface and a processor. The non-transitory computer readable medium stores normalized software security analysis findings of application code performed by at least one software security analysis tool. Each normalized finding is identifiable by a fingerprint. The graphical user interface is configured to display information related to each normalized finding. The processor is configured to receive a first finding in a first vendor-provided format from a first SAST tool that performs a scan of application code. The processor normalizes the first finding to a standardized taxonomy. The processor determines a first fingerprint that identifies the normalized first finding. The non-transitory computer readable medium stores the normalized first finding. The normalized first finding is identifiable by the first fingerprint and associated with a first timestamp. The processor receives a second finding in a second vendor-provided format from a second SAST tool that performs a scan of application code. The second SAST tool is different from the first SAST tool. The processor normalizes the second finding to the standardized taxonomy. The processor determines a second fingerprint that identifies the normalized second finding. The processor determines whether the second fingerprint at least partially matches each fingerprint stored in the non-transitory computer readable medium. The processor determines that the second fingerprint at least partially matches the first fingerprint. The processor determines that the normalized second finding differs from the normalized first finding. Thereafter, the non-transitory computer readable medium stores an update to the normalized first finding based on the normalized second finding. The update to the normalized first finding is associated with a second timestamp. The graphical user interface is configured to display the normalized first finding and the first timestamp. The graphical user interface is also configured to display the update to the normalized first finding and the second timestamp.

In one embodiment, each fingerprint includes at least one of the following: name, category, and severity of a finding.

In one embodiment, the first vendor-provided format is different from the second vendor-provided format.

A further aspect of the disclosed technology relates to a system for performing de-duplication of findings. The system includes a non-transitory computer readable medium, a graphical user interface and a processor. The non-transitory computer readable medium stores normalized software security analysis findings of application code performed by at least one software security analysis tool. Each normalized finding is identifiable by a fingerprint. The graphical user interface is configured to display information related to each normalized finding. The processor is configured to receive a first finding in a first vendor-provided format from a SAST tool that performs a scan of application code. The processor normalizes the first finding to a standardized taxonomy. The processor determines a first fingerprint that identifies the normalized first finding. The non-transitory computer readable medium stores the normalized first finding. The normalized first finding is identifiable by the first fingerprint and associated with a first timestamp. The processor receives a second finding in a second vendor-provided format from a DAST tool that performs a scan of the application code. The processor normalizes the second finding to the standardized taxonomy. The processor determines a second fingerprint that identifies the normalized second finding. The processor determines whether the second fingerprint at least partially matches each fingerprint stored in the non-transitory computer readable medium. The processor determines that the second fingerprint at least partially matches the first fingerprint. The processor determines that the normalized second finding differs from the normalized first finding. An update to the normalized first finding based on the normalized second finding is sent to the non-transitory computer readable medium for storage. The update to the normalized first finding is associated with a second timestamp. The graphical user interface is configured to display the normalized first finding and the first timestamp. The graphical user interface is also configured to display the update to the normalized first finding and the second timestamp.

In one embodiment, each fingerprint includes at least one of the following: name, category, and severity of a finding. Consistent with the disclosed embodiments, methods for performing de-duplication on findings generated by multiple software security analysis tools are disclosed.

FIG. 1 shows an example environment 100 that may implement certain aspects of the present disclosure. The components and arrangements shown in FIG. 1 are not intended to limit the disclosed embodiments as the components used to implement the disclosed processes and features may vary. As shown in FIG. 1, in some implementations the environment 100 may include one or more of the following: one or more deduplication systems 110, one or more software security analysis tools 120, one or more continuous integration, continuous delivery (CI/CD) tools 160, one or more external collectors 170, one or more networks 180, and one or more host servers 190.

The software security analysis tools 120 may include one or more categories, such as a first category of one or more SAST tools 130, a second category of one or more DAST tools 140, and a third category of one or more open source analysis (OSA) tools 150, among other possibilities.

Each software security analysis tool 120 of the first, second and third categories may be a standalone solution, a network-based client-server solution, a web-based solution, or a cloud-based solution, among other possibilities. Each software security analysis tool 120 may be provided by a different licensor or vendor, and thus each may be independent of each other. The SAST tools 130 may include Checkmarx™ and Fortify™, among other possibilities. The DAST tools 140 may include WebInspect™ and Contrast™, among other possibilities. The OSA tools 150 may include Whitesource™ and Blackduck™, among other possibilities.

The deduplication system 110 may perform de-duplication of the findings provided by different tools 120. For instance, if findings returned by same or different tools 120 reveal the same software issue in the same software project or same application code, then the deduplication system 110 may eliminate duplicate findings. If findings returned by same or different tools 120 represent developments or updates overtime on the same software issue in the same software project or same application code, the deduplication system 110 may track historical updates on the same software issue and make such information readily available to a user upon request.

Turning to FIG. 2, various users or interest groups, such as developers, lines of business, and executive stakeholders may use the deduplication system 110 to deduplicate findings generated by one or more SAST tools 130A-130C, one or more DAST tools 140A-140C, one or more OSA tools 150A-150C, among other possibilities.

Each software security analysis tool 120 may have a vendor-established taxonomy. Findings reported by each software security analysis tool 120 may be in a vendor-provided format. The vendor-provided format may be XML, JSON, or other structured format.

In some example embodiments, the deduplication system 110 may not rely on or expressly adopt any given taxonomy. For example, deduplication system 110 may not rely on common weakness enumeration (CWE) or vendor-established taxonomies. Instead, an example deduplication system 110 may have a unique internal standardized taxonomy that reconciles findings generated by different software security analysis tools 120. The standardized taxonomy may be managed or defined by a dynamic classification system of names and categories. As a result, regardless of their vendor-provided formats, the deduplication system 110 may normalize each finding to a standardized taxonomy, for instance, by performing mappings to corresponding names and categories in the classification system. The classification system may be dynamically maintained such that any new name or category revealed by any new finding may be dynamically added to the classification system.

The deduplication system 110 may use a fingerprint approach to determine correlation or similarity among findings generated by different software security analysis tools 120. The fingerprint approach may be associated with line position, contents, CWE and other identifying factors, to determine whether two findings produced by two different software security analysis tools 120 are the same. The fingerprint approach remains robust regardless whether the code position, line or content changes in subsequent scans.

For example, for each normalized finding, the deduplication system 110 may determine a fingerprint that identifies the normalized finding. The deduplication system 110 may collect or organize one or more of the following meta information or metadata surrounding each finding to form its fingerprint: associated CWE information, framework alignment, code details, and any identifying factor, among other possibilities. Framework alignment may include Web Application Security Consortium (WASC), and Open Web Application Security Project (OWASP) Top 10, among other possibilities. Code details may include line numbers and contents, among other possibilities.

The deduplication system 110 may use the fingerprint to determine whether a finding is unique. For this purpose, the deduplication system 110 may implement a machine learning algorithm that identifies partial or full matches of fingerprints. For instance, the deduplication system 110 may use a threshold of similarity to determine partial matches of fingerprints. For instance, two fingerprints may partially match each other when the only difference between them is their line numbers, while remaining portions of the fingerprints are identical. While training the algorithm, the algorithm may be set with weights and percentages to determine a match. The weights and percentages may vary for different types or categories of tools 120 and may also change over time. For example, partial match on fingerprints of findings generated by SAST tools 130 may likely be much more limited than partial match on fingerprints of findings generated by DAST tools 140, because SAST tools 130 tend to consistently return the same findings run over run, whereas DAST tools 140 are less consistent and may allow for more leeway.

The algorithm may tolerate differences in code line numbers or code contents. The algorithm may de-duplicate findings generated by different software security analysis tools 120. The algorithm may also de-duplicate findings generated by the same software security analysis tools 120, scan over scan, as attributes change.

To determine whether two findings are identical or relevant to each other, the deduplication system 110 may compare their respective fingerprints. If two fingerprints at least partially match each other, their respective findings may be identical or related to each other. If two findings are identical, the deduplication system 110 may eliminate one finding to avoid duplication of findings. If two findings are related to each other, they may represent historical developments of the same software issue, such that one finding represents an update relative to the other finding. Updates may include a line number change, or line content change, among other possibilities. The deduplication system 110 may track such historical developments or updates of same software issues.

The deduplication system 110 may include one or more of the following: a processor 210, a non-transitory computer readable medium 220, an input/output ("I/O") device 260, and an application program interface (API) 270, among other possibilities. The I/O device 260 may include a graphical user interface 262.

The non-transitory computer readable medium 220 may store normalized findings. Each normalized finding may be identifiable by a fingerprint. The non-transitory computer readable medium 220 may store information of historical updates of each normalized finding for display in the graphical user interface 262 upon request.

Different software security analysis tools 120 may yield a different set of findings. Some findings may duplicate each other, whereas other findings may be unique. The deduplication system 110 may de-duplicate and aggregate findings provided by software security analysis tools 120 into a meaningful singular result, regardless of whether the software security analysis tools 120 are of the same or different categories. For example, the deduplication system 110 may receive findings from SAST tools 130A-B and DAST tools 140A-B, and de-duplicate the findings.

The deduplication system 110 may trace historical scan activities. As the deduplication system 110 receives findings from each software security analysis tool 120, the deduplication system 110 may continuously perform de-duplication and aggregation of findings as each scan is completed.

Figure 21:
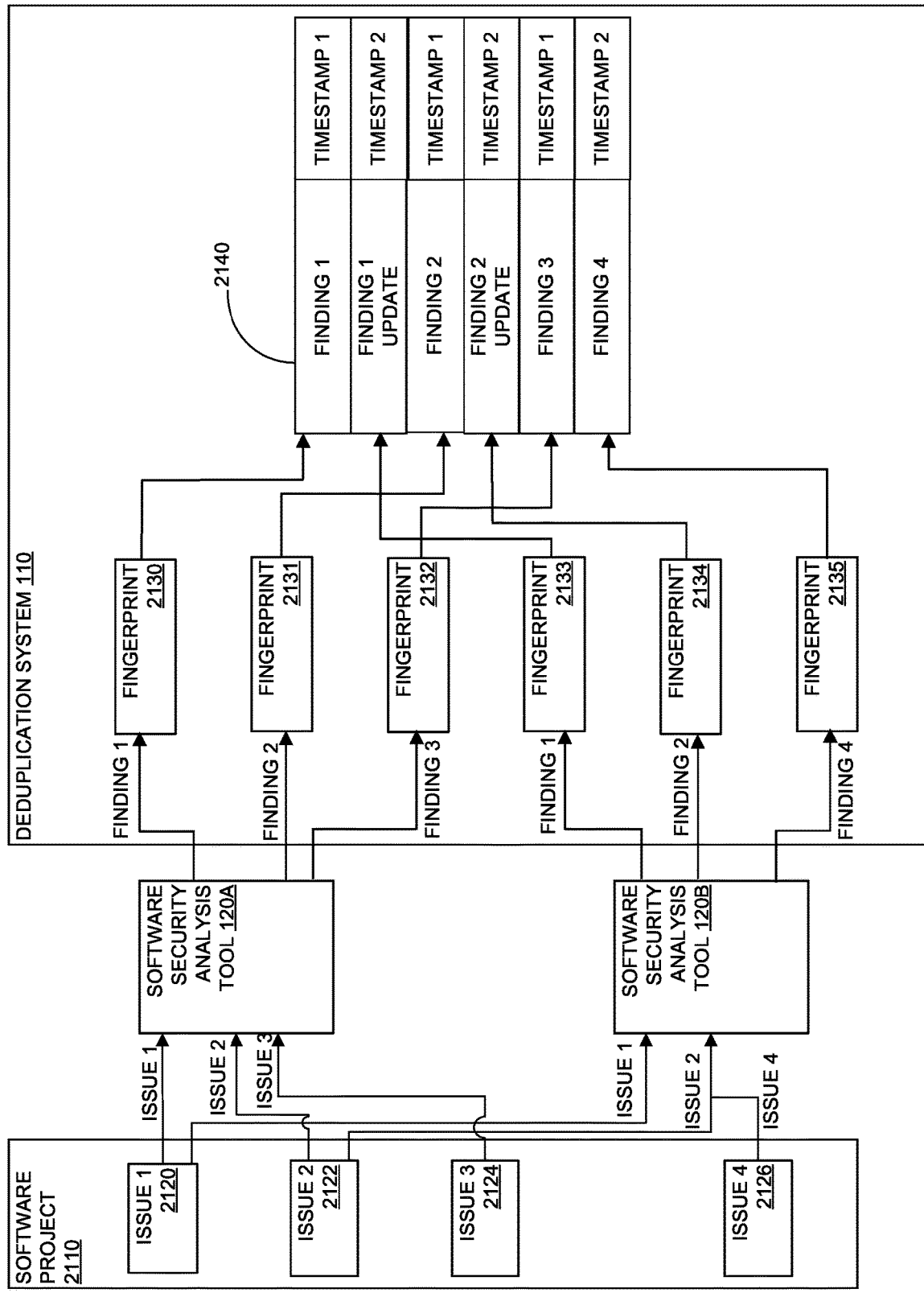
FIG. 21 is an example block diagram illustrating a duduplication process of findings performed by the deduplication system according to one aspect of the disclosed technology.

FIG. 21 illustrates a block diagram illustrating a de-duplication process performed by the deduplication system 110. The deduplication system 110 may receive findings generated by multiple software security analysis tools 120A and 120B that perform scans of application code of a software project 2110. The software project 2110 may include a plurality of application code.

The first software security analysis tool 120A and the second software security analysis tool 120B may belong to at least one of the following categories: a first category for performing SAST, and a second category for performing DAST.

In one embodiment, the tools 120A and 120B may belong to the same category. For instance, both tools may be SAST tools, or both tools may be DAST tools.

In one embodiment, the tools 120A and 120B may represent subsequent runs of the same tool. For instance, both tools 120A and 120B may be Checkmarx™, but run at different times. The deduplication system 110 may track developments or updates of findings between subsequent runs of the same tool.

The deduplication system 110 may also receive findings between subsequent runs of different tools. In one embodiment, although the tools 120A and 120B may belong to the same category, they are in fact different from each other. For instance, while both tools may be SAST tools, the tool 120A may be Checkmarx™, and the tool 120B may be Fortify™. In another embodiment, each tool may be from a different category. For instance, one of the tools 120A and 120B may be a SAST tool, while the other may be a DAST tool.

In one embodiment, the tools 120A and 120B may be from different vendors.

Each tool 120A, 120B may generate a finding at a vendor-provided format. For instance, the first tool 120A may generate findings in a first vendor-provided format, and the second tool 120B may generate findings in a second vendor-provided format. The first and second vendor-provided formats may be identical to or different from each other. In one example, findings generated by the first tool 120A may be in the format of XML, while findings generated by the second tool 120B may be in the format of JSON.

Application code of the software project 2110 may include several software issues that are detectable by one or more software security analysis tools. For instance, software issues 1, 2 and 3 may be detectable by the first tool 120A, while software issues 1, 2, and 4 may be detectable by the second tool 120B. Each tool may generate a finding corresponding to each detectable software issue. For example, the first tool 120A may generate findings identifying issues 1, 2 and 3. The second tool 120B may generate findings identifying issues 1, 2 and 4. The tools 120A and 120B may report their findings to the deduplication system 110.

The tools 120A and 120B may report their findings at different timestamps. For instance, the first tool 120A may report at a first timestamp, and the second tool 120B may report at a second timestamp. The second timestamp may occur after the first timestamp.

For each finding, the deduplication system 110 may normalize the finding to the standardized taxonomy. For instance, the deduplication system 110 may normalize findings generated by the first tool 120A in the format of XML to the standardized taxonomy. The deduplication system 110 may normalize findings generated by the second tool 120B in the format of JSON to the standardized taxonomy.

The deduplication system 110 may determine a fingerprint 2130-2135 that represents each normalized finding. Each fingerprint 2130-2135 be determined based on at least one of the following: CWE, framework alignment, code detail, name, category, and severity of a finding, among other possibilities. In one example, each fingerprint may include at least one of the following: name, category, and severity of a finding. However, the exact combination of fields and their names may be vendor specific. For example, Fortify™ may return a meaningful name as well as category in its results, whereas Checkmarx™ may only return a meaningful name. The code detail may include line number and code content.

To determine if there is any match or partial match among findings, the deduplication system 110 may compare the fingerprints 2130-2135. The deduplication system 110 may store distinct findings in the non-transitory computer readable medium 220, such as in the form of a table 2140. For any new finding received by the deduplication system 110, after normalization, the deduplication system 110 may determine whether the same finding has already existed in the table 2140 by comparing the new fingerprint that identifies the new finding with fingerprints that identify existing findings already stored in the table 2140.

If the new fingerprint for the new finding fails to at least match any fingerprint for existing findings stored in the table 2140, the deduplication system may add the new finding to the table 2140. For instance, when the deduplication system 110 first receives findings 1, 2, 3 identifying issues 1, 2, and 3 at the first timestamp from the first tool 120A, the deduplication system 110 may add these findings, such as "FINDING 1", "FINDING 2" and "FINDING 3," associated with the first timestamp such as "TIMESTAMP 1", to the table 2140.

If the new fingerprint at least partially matches a fingerprint for an existing finding, the deduplication system 110 may determine if the new finding contains any update with respect to the existing finding. If no update, the deduplication system 110 may discard the new finding.

If there is an update, the deduplication system 110 may update the table 2140 to include the update. For instance, after the deduplication system 110 receives findings at the second timestamp from the second tool 120B, the deduplication system 110 may determine fingerprints identifying these findings after normalization. The deduplication system 110 may determine that fingerprint 2133 that identifies a finding at least partially matches the fingerprint 2130 which identifies an existing finding, "FINDING 1", as stored in the table 2140. In fact, both findings refer to the same issue in application code of the software project 2110, namely, issue 1. The deduplication system 110 may determine if the finding reported by the second tool 120B contains any update with respect to the existing finding, "FINDING 1", stored in the table 2140. Updates may include a line number change, or line content change, among other possibilities. Any update may be stored in the table 2140, such as "FINDING 1 UPDATE," associated with the second timestamp, such as "TIMESTAMP 2." For instance, "FINDING 1" may indicate a software issue on line 15, and "FINDING 1 UPDATE" may indicate the same software issue is now moved to line 16.

Similarly, the deduplication system 110 may determine that fingerprint 2134 at least partially matches the fingerprint 2131 which identifies an existing finding, "FINDING 2", as stored in the table 2140. Both refer to the same issue in application code of the software project 2110, namely, issue 2. The deduplication system 110 may determine if the finding reported by the second tool 120B contains any update with respect to the existing finding, "FINDING 2", stored in the table 2140. Any update may be stored in the table 2140, such as "FINDING 2 UPDATE," associated with the second timestamp "TIMESTAMP 2."

With respect to fingerprint 2135 identifying finding 4, the deduplication system 110 may determine that fingerprint 2135 fails to at least partially match any fingerprint for existing findings stored in the table 2140, the deduplication system 110 may add the new finding for storage in the table 2140 as "FINDING 4", associated with the second timestamp "TIMESTAMP 2". For instance, "FINDING 4" may indicate a new software issue on line 20.

Figure 22:
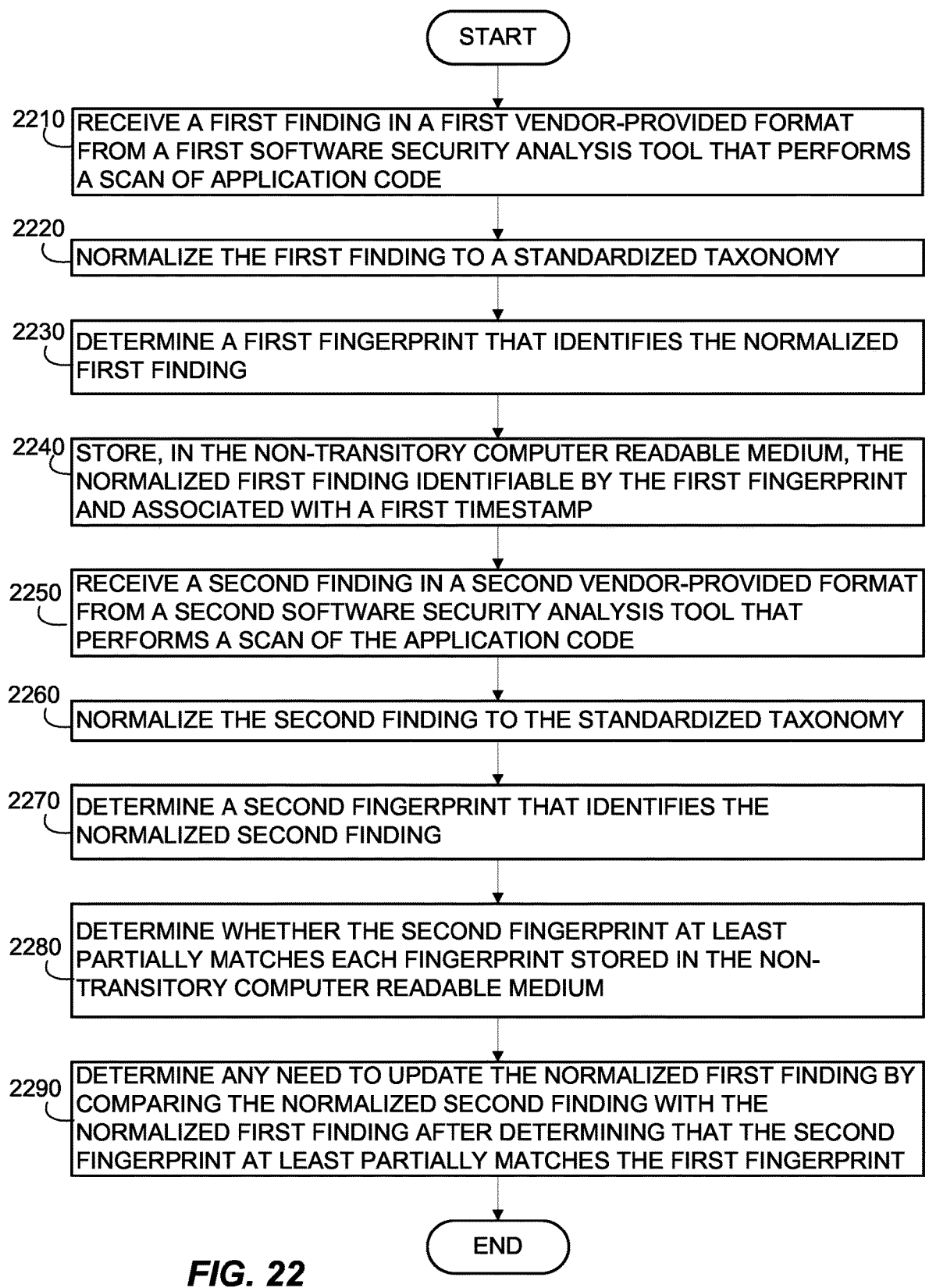
FIG. 22 is an example flow chart of a process performed by the deduplication system according to one aspect of the disclosed technology.

FIG. 22 illustrates an example flow chart of a de-duplication process performed by the deduplication system 110. At 2210, the processor 210 may receive a first finding in a first vendor-provided format from the first software security analysis tool 120A. The first software security analysis tool 120A performs a scan of application code of the software project 2110. The processor 210 may receive the first finding from the first software security analysis tool 120A at a first timestamp. At 2220, the processor 210 may normalize the first finding to a standardized taxonomy. At 2230, the processor 210 may determine a first fingerprint that identifies the normalized first finding. At 2240, the processor 210 may add the normalized first finding for storage the non-transitory computer readable medium 220. The normalized first finding may be identifiable by the first fingerprint, and may be associated with the first timestamp.

At 2250, the processor 210 may receive a second finding in a second vendor-provided format from the second software security analysis tool 120B. The second software security analysis tool 120 may also perform a scan of application code of the software project 2110. The processor 210 may receive the second finding from the second software security analysis tool 120A at a second timestamp. At 2260, the processor 210 may normalize the second finding to the standardized taxonomy. At 2270, the processor 210 may determine a second fingerprint that identifies the normalized second finding. At 2280, the processor 210 may determine whether the second fingerprint at least partially matches each fingerprint stored in the non-transitory computer readable medium 220. At 2290, the processor 210 may determine that the second fingerprint at least partially matches the first fingerprint. Thereafter, the processor 210 may determine any need to update the normalized first finding by comparing the normalized second finding with the normalized first finding.

In one embodiment, the processor 210 may determine that the second fingerprint at least partially matches the first fingerprint. The processor 210 may store an update to the normalized first finding in the non-transitory computer readable medium 220 after determining that the normalized second finding differs from the normalized first finding. The update to the normalized first finding may be associated with a second timestamp. The graphical user interface 262 may be configured to display the normalized first finding and the first timestamp. The graphical user interface 262 may also be configured to display the update to the normalized first finding and the second timestamp.

In another embodiment, the processor 210 may determine that the second fingerprint fails to at least partially match each fingerprint stored in the non-transitory computer readable medium 220. The processor 210 may add the normalized second finding for storage in the non-transitory computer readable medium 220. The normalized second finding may be identifiable by the second fingerprint.

Figure 23:
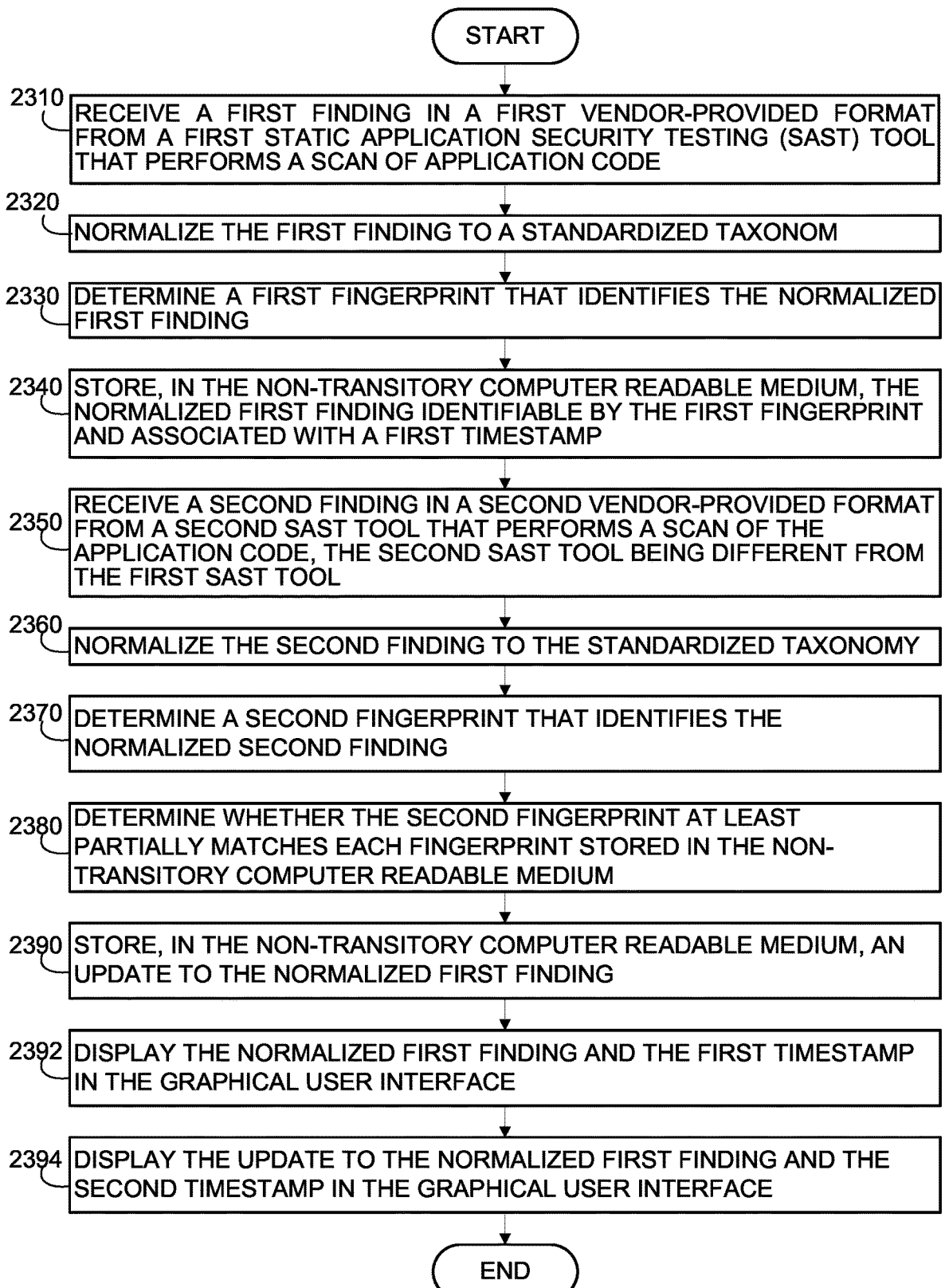
FIG. 23 is an example flow chart of another process performed by the deduplication system according to one aspect of the disclosed technology.

FIG. 23 illustrates another example flow chart of a deduplication process performed by the deduplication system 110. At 2310, the processor 210 may receive the first finding in the first vendor-provided format from a first SAST tool at a first timestamp. The first SAST tool performs a scan of application code. At 2320, the processor 210 may normalize the first finding to a standardized taxonomy. At 2330, the processor 210 may determine a first fingerprint that identifies the normalized first finding;

At 2340, the processor 210 may add the normalized first finding for storage in the non-transitory computer readable medium 220. The normalized first finding may be identifiable by the first fingerprint. The normalized first finding may be associated with the first timestamp.

At 2350, the processor 210 may receive the second finding in a second vendor-provided format from a second SAST tool at a second timestamp. The second SAST tool may perform a scan of the application code. The second SAST tool may be different from the first SAST tool. For instance, the first SAST tool may be Checkmarx™, while the second SAST tool may be Fortify™. The second vendor-provided format may be different from the first vendor-provided format.

At 2360, the processor 210 may normalize the second finding to the standardized taxonomy. At 2370, the processor 210 may determine a second fingerprint that identifies the normalized second finding. At 2380, the processor 210 may determine whether the second fingerprint at least partially matches each fingerprint stored in the non-transitory computer readable medium 220. At 2390, the processor 210 may determine that the second fingerprint at least partially matches the first fingerprint. The processor 210 may also determine that the normalized second finding differs from the normalized first finding. Thereafter, the processor 210 may store an update to the normalized first finding in the non-transitory computer readable medium. The update to the normalized first finding may be based on the normalized second finding. The update to the normalized first finding may be associated with the second timestamp. At 2392, the graphical user interface 262 may display the normalized first finding and the first timestamp. At 2394, the graphical user interface 262 may also display the update to the normalized first finding and the second timestamp.

Figure 24:
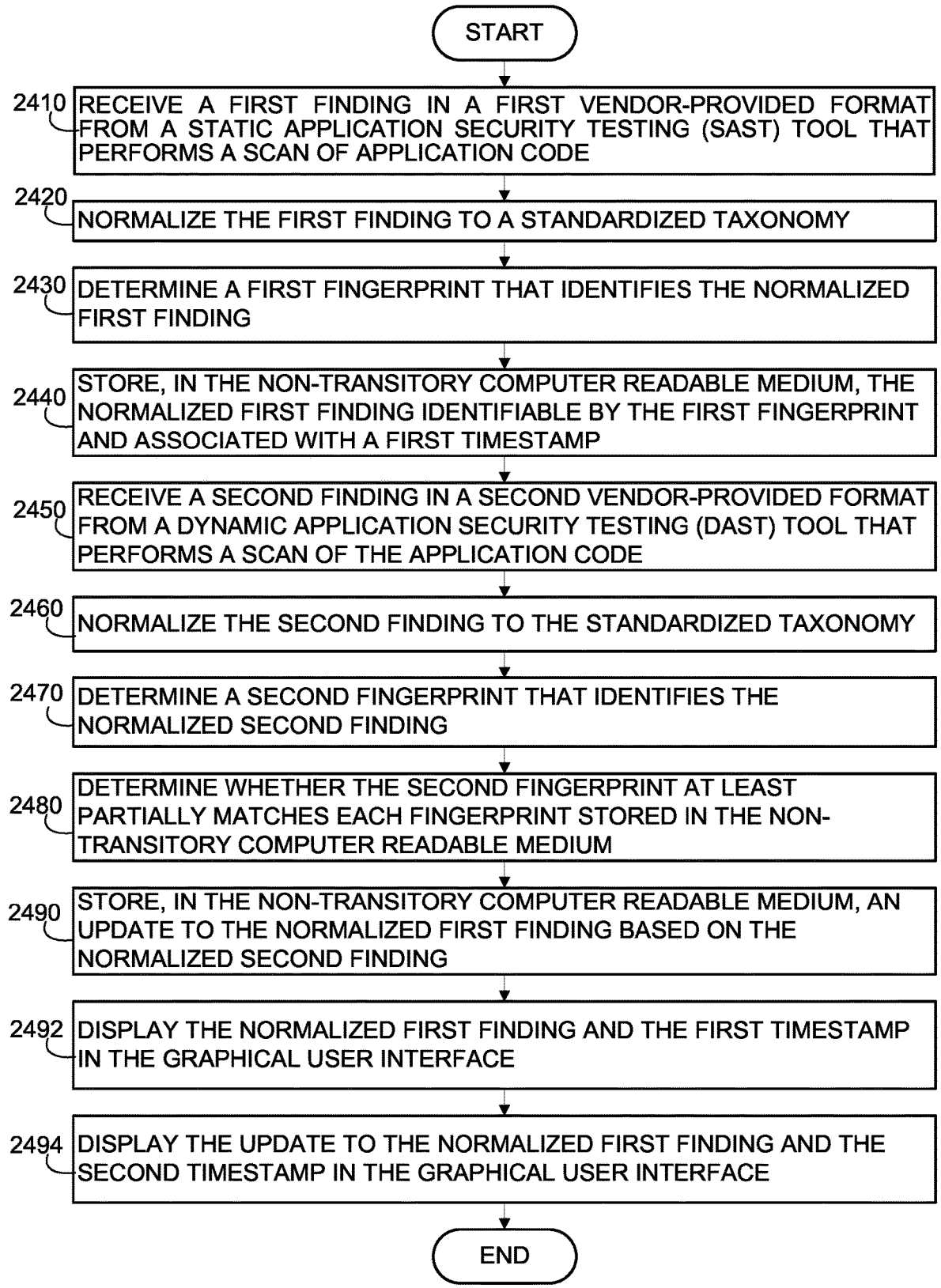
FIG. 24 is an example flow chart of, yet another process performed by the deduplication system according to one aspect of the disclosed technology.

FIG. 24 illustrates another example flow chart of a deduplication process performed by the deduplication system 110. At 2410, the processor 210 may receive a first finding in a first vendor-provided format from a SAST tool at a first timestamp. The SAST tool may perform a scan of application code. At 2420, the processor 210 may normalize the first finding to a standardized taxonomy. At 2430, the processor 210 may determine a first fingerprint that identifies the normalized first finding. At 2440, the processor 210 may add the normalized first finding for storage in the non-transitory computer readable medium 220. The normalized first finding may be identifiable by the first fingerprint. The normalized first finding may be associated with the first timestamp.

At 2450, the processor 210 may receive a second finding in a second vendor-provided format from a DAST tool at a second timestamp. The DAST tool may perform a scan of the application code. At 2460, the processor 210 may normalize the second finding to the standardized taxonomy. At 2470, the processor 210 may determine a second fingerprint that identifies the normalized second finding. At 2480, the processor 210 may determine whether the second fingerprint at least partially matches each fingerprint stored in the non-transitory computer readable medium 220.

At 2490, the processor 210 may determine that the second fingerprint at least partially matches the first fingerprint. The processor 210 may also determine that the normalized second finding differs from the normalized first finding. Afterwards, the processor 210 may store, in the non-transitory computer readable medium, an update to the normalized first finding based on the normalized second finding. The update to the normalized first finding may be associated with the second timestamp.

At 2492, the graphical user interface 262 may be configured to display the normalized first finding and the first timestamp.

At 2494, the graphical user interface 262 may also be configured to display the update to the normalized first finding and the second timestamp.

In one example, the deduplication system 110 may orchestrate the software security analysis tools 120. The deduplication system 110 may interface with and collect information from various software security analysis tools 120 behind scenes. Acting as an abstraction layer on top of underlying interfaces for software security analysis tools 120, the deduplication system 110 may orchestrate the software security analysis tools 120 by activating their scan functions to scan application code of software projects, monitoring or tracking their scan activities throughout scan processes, and reviewing findings once scans are completed. The deduplication system 110 may serve as a single interface or a single end-point between the user and software security analysis tools 120. By serving as a single interface to access scan results of software security analysis tool 120, the deduplication system 110 may reduce complexity of integration and provide consistency when the user reviews scan results.

The deduplication system 110 may trigger multiple software security analysis tools 120 of the same category to start scan simultaneously or at predetermined timestamps. For example, the deduplication system 110 may instruct multiple SAST tools 130A-C to perform scan simultaneously or at predetermined timestamps. SAST tool 130A may be Checkmarx™, and SAST tool 130B may be Fortify™.

Also, the deduplication system 110 may trigger one or more software security analysis tools 120 of different categories to start scan simultaneously or at predetermined timestamps. For example, the deduplication system 110 may instruct multiple SAST tools 130A-B, and multiple OSA tools 150 to perform scan simultaneously or at predetermined timestamps. SAST tool 130A may be Checkmarx™, and SAST tool 130B may be Fortify™. OSA tool 140A may be WhiteSource™, and OSA tool 150B may be Blackduck™.

The deduplication system 110 may trigger the same software security analysis tool 120, such as SAST tool 130A, to perform scan over scan at different timestamps or different scan sessions. SAST tool 130A may be Checkmarx™.

In one scenario, SAST tool 130A reports a finding that identifies a software issue that may need to be resolved to the deduplication system 110. To validate whether the issue has been resolved, the deduplication system 110 may not need to request the same SAST tool 130A to perform scan for a second time. Instead, the deduplication system 110 may wait for remaining tools to complete their scans. Based on findings reported by the remaining tools, the deduplication system 110 may determine that the software issue has been resolved, the deduplication system 110 may update the aggregate scan result.

In one example, as shown in FIG. 2, the deduplication system 110 may be plugged into one or more CI/CD tools 160 such that whenever code is checked in or a change is made to a particular software product, the deduplication system 110 may automatically initiate one or more SAST tools 130A-C, one or more OSA tools 140A-C, one or more DAST tools 150A-C, or one or more IAST tools 160A-C to perform scan. Other software security analysis tools or tool categories may also be implemented. Examples of the CI/CD tools 160 may include Jenkins™ and CircleCI™, among other possibilities.

In one example, the user may operate the deduplication system 110 through one or more external collectors 170. The external collectors 170 may communicate with the API 270 of the deduplication system 110. An example of the external collectors 170 may include Hygieia™, an open source DevOps dashboard for visualizing a development pipeline.

In one example, the deduplication system 110 may rely on the graphical user interface 262 to interact with a user, such as receiving user inquiries, and providing information related to the software security analysis tools 120 and findings to the user.

In one example, when the deduplication system 110 receives a scan request, for example, through the API 270, the deduplication system 110 may automatically trigger one or more software security analysis tools 120 of the same or different categories to start scan. The request may include a minimum level of information needed to selectively activate scan functions on the software security analysis tools 120. In some embodiments, the minimum level of information may be determined based on the selection of security analysis tools 120 accessible to the deduplication system 110, as well as other product or enterprise considerations. The minimum level of information required of a scan request may thus be abstracted from various requirements and parameters of the various security analysis tools, so as to provide an efficient interface for user interaction.

In one example, the scan request received by the deduplication system 110 may include identification of code of a software project. The identification of code may include a directory indicating where the code is stored. Alternatively, the identification of code may include a zip code file. The scan request may identify the language in which the code is written, such as the primary language that the code is written in. The request may also include an identifier for which component within the system it belongs to. After receiving the scan request, the deduplication system 110 may send instructions to interfaces, such as APIs or command line utilities, of the various software security analysis tools 120. The various software security analysis tools 120 may be selectively determined based on the request and/or the code. Some software security analysis tools 120 may require extra information beyond the scope of the scan request to start execution, such as a line count and secondary language of the code. Although such extra information is not present (or requested of a user) in the scan request received by the deduplication system 110, the deduplication system 110 may independently determine and provide such extra information to the software security analysis tools 120, without user intervention.

Traditionally, when an organization wants to transition from one security tool to another, or swaps out one or more security tools, the organization may need to retool. Such efforts are saved by the deduplication system 110. With the deduplication system 110, backend tools may be added to or removed from the deduplication system 110 in a process transparent to the user or internal customer of the organization.

Each tool 120 may have a different interface or protocol. For example, SAST tools 130A-C, OSA tools 140A-C, DAST tools 150A-C, and IAST tools 160A-C may have interfaces 232A-C, 242A-C, 252A-C and 262A-C, respectively. These tools may have different types of interfaces, including RESTful API, SOAP API, and a command line utility among other possibilities. Traditionally, the user needs to learn protocols of each tool. For instance, in a situation where a first tool has a RESTful API, a second tool has a SOAP API, and a third tool does not have an API but has a command line utility, the user needs to learn how to construct appropriate requests or parameters to execute each tool. With the deduplication system 110 of the example embodiments, the user is no longer involved with constructing requests or parameters required by the individual protocols of each tool. By dealing with the deduplication system 110 alone, the user does not need to learn protocols of each software security analysis tool 120 and does not need to deal with separate interfaces such as APIs or command lines.

The deduplication system 110 may initiate scan activities on multiple software security analysis tools 120, and monitor scan activities performed by each tool from start to completion. As each software security analysis tool 120 completes its scan activity, the deduplication system 110 may receive its findings, store the received findings in the non-transitory computer readable medium 220, and wait for remaining software security analysis tools 120 to complete scans. The non-transitory computer readable medium 220 may store historical information associated with scan activity performed by each software security analysis tool 120, including but not limited to historical developments of findings.

In one example, the deduplication system 110 may compute one or more confidence scores for findings produced by the software security analysis tools 120. The confidence scores may indicate accuracy of the findings. More tools 120 yield the same finding, the more accurate the finding, and the higher the confidence score. For instance, if only two out of three tools 120 generate the same finding, then the finding may have a lesser confidence score compared to a finding reported by all three tools 120.

In another example, the deduplication system 110 may receive findings from three SAST tools 130, where the first two tools generate the same finding, and the third tool does not. The deduplication system 110 may determine a quality of the findings based on what tools found the issue. The deduplication system 110 may compare each confidence score to a predetermined threshold. When the computed confidence score is lower than the predetermined threshold, such as 80%, the finding may be deemed non-real. When the computed confidence score meets the predetermined threshold, the finding may be deemed real. In one example, the graphical user interface 262 of the deduplication system 110 may only show findings that are deemed real.

The deduplication system 110 may orchestrate multiple findings, combine those findings in a way and generate confidence scores that allow the user to decide whether that result is a true positive, false positive, or what other combinations of those. By doing so, the deduplication system 110 may provide a more accurate and complete scan result than what an individual tool would produce. A user may disposition a finding returned by a software security analysis tool 120 as "false positive". In one example, the deduplication system 110 may identify a "false positive" scan result. The deduplication system 110 may subsequently instruct at least one software security analysis tool 120 to perform additional scans to validate the "false positive" scan result.

Each deduplication system 110 may include one or more physical or logical devices (e.g., servers). For example, the deduplication system 110 may be a single device or server or may be configured as a distributed computer system including multiple servers, devices, or computers that interoperate to perform one or more of the processes and functionalities associated with the disclosed embodiments. In some embodiments, the deduplication system 110 may further include a peripheral interface, a transceiver, a mobile network interface in communication with the processor 210, a bus configured to facilitate communication between the various components of the deduplication system 110, and a power source configured to power one or more components of the deduplication system 110.

A peripheral interface may include hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, Zig-Bee™, and ambient backscatter communications (ABC) protocols or similar technologies.

A mobile network interface may provide access to a cellular network, the Internet, a local area network, or another wide-area network. In some embodiments, a mobile network interface may include hardware, firmware, and/or software that allows the processor(s) 210 to communicate with other devices via wired or wireless networks, whether local or wide area, private or public, as known in the art. A power source may be configured to provide an appropriate alternating current (AC) or direct current (DC) to power components.

The processor 210 may include one or more of a microprocessor, microcontroller, digital signal processor, co-processor or the like or combinations thereof capable of executing stored instructions and operating upon stored data. The processor 210 may be one or more known processing devices, such as a microprocessor from the Pentium™ family manufactured by Intel™ or the Turion™ family manufactured by AMD™. The processor 210 may constitute a single core or multiple core processor that executes parallel processes simultaneously. For example, the processor 210 may be a single core processor that is configured with virtual processing technologies. In certain embodiments, the processor 210 may use logical processors to simultaneously execute and control multiple processes. The processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

The non-transitory computer readable medium 220 may contain an operating system ("OS") 222 and a program 226. The non-transitory computer readable medium 220 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the non-transitory computer readable medium 220. The non-transitory computer readable medium 220 may include one or more memory devices that store data and instructions used to perform one or more features of the disclosed embodiments. The non-transitory computer readable medium 220 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The non-transitory computer readable medium 220 may include software components that, when executed by the processor 210, perform one or more processes consistent with the disclosed embodiments. In some embodiments, the non-transitory computer readable medium 220 may include a database 224 to perform one or more of the processes and functionalities associated with the disclosed embodiments. The non-transitory computer readable medium 220 may include one or more programs 226 to perform one or more functions of the disclosed embodiments. Moreover, the processor 210 may execute one or more programs 226 located remotely from the deduplication system 110. For example, the deduplication system 110 may access one or more remote programs 226, that, when executed, perform functions related to disclosed embodiments.

The deduplication system 110 may also include one or more I/O devices 260 that may comprise one or more interfaces for receiving signals or input from devices and providing signals or output to one or more devices that allow data to be received and/or transmitted by the deduplication system 110. For example, the deduplication system 110 may include interface components, which may provide interfaces to one or more input devices, such as one or more keyboards, mouse devices, touch screens, track pads, trackballs, scroll wheels, digital cameras, microphones, sensors, and the like, that enable the deduplication system 110 to receive data from one or more users. The deduplication system 110 may include a display, a screen, a touchpad, or the like for displaying images, videos, data, or other information. The I/O devices 260 may include the graphical user interface 262.

In exemplary embodiments of the disclosed technology, the deduplication system 110 may include any number of hardware and/or software applications that are executed to facilitate any of the operations. The one or more I/O interfaces 260 may be utilized to receive or collect data and/or user instructions from a wide variety of input devices. Received data may be processed by one or more computer processors as desired in various implementations of the disclosed technology and/or stored in one or more memory devices.

Turning back to FIG. 1, the networks 180 may include a network of interconnected computing devices more commonly referred to as the internet. The network 180 may be of any suitable type, including individual connections via the internet such as cellular or WiFi networks. In some embodiments, the network 180 may connect terminals, services, and mobile devices using direct connections such as radio-frequency identification (RFID), near-field communication (NFC), Bluetooth™, low-energy Bluetooth™ (BLE), WiFi™, ZigBee™ ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security. The network 180 may comprise any type of computer networking arrangement used to exchange data. For example, the network 180 may be the Internet, a private data network, virtual private network using a public network, and/or other suitable connection(s) that enables components in system environment 100 to send and receive information between the components of system 100. The network 180 may also include a public switched telephone network ("PSTN") and/or a wireless network. The network 180 may also include local network that comprises any type of computer networking arrangement used to exchange data in a localized area, such as WiFi, Bluetooth™ Ethernet, and other suitable network connections that enable components of system environment 100 to interact with one another.

According to some embodiments, the host server 190 may host websites, web portal or software application, data or software applications that may access and interact with the deduplication system 110. A website may be an internal page/site associated with an enterprise, or a publicly accessible website.

Exemplary Use Cases

The following example use case describes examples of implementations of the deduplication system 110. This is intended solely for explanatory purposes and not limitation.

FIG. 6 illustrates a screenshot 600 for operating the deduplication system 110 to perform SAST scans and OSA scans of application code. As shown in FIG. 6, by sending a request to the pictured "/assessment/static" endpoint, backend scans may be orchestrated for all (or a subset of) enabled SAST tools 130 such as Fortify on Demand™ and Checkmarx™ and all enabled OSA tools 150 such as Whitesource™. The simplified interface shown in the screenshot 600 has two required inputs and two optional inputs (the remaining parameters and configurations etc. being handled automatically by the deduplication system 110), significantly lower than most individual tool integrations. The deduplication system 110 handles the rest of the required integration with various tools 120 behind the scenes, the required and optional inputs having been abstracted out for ease of use of the user.

FIG. 7 illustrates a screenshot 700 of the graphical user interface 262 of the deduplication system 110, according to an example implementation. FIG. 7 illustrates a few elements of the orchestration process. The screenshot 700 depicts a view in the deduplication system 110 for a given application or component showing its scan history. As shown, events may be shown sorted in an order from newest to oldest. The oldest event shows a "Completed" assessment where a single scan performed by tool A was run. Thereafter, the screenshot 700 also shows another assessment where two scans performed by tool A and tool B are in progress. In parallel to those scans, another assessment shows a scan performed by tool C with a "Completed" status. For example, tool A may be Checkmarx™, tool B may be Fortify on Demand™, and tool C may be WhiteSource™. Lastly, an additional request, listed as "Queued," is on hold until the scans that are currently in progress have completed.

The deduplication system 110 monitors scan statuses of all tools 120 from start to completion. Once all scans of an assessment have completed, the assessment is marked as "Completed." Upon assessment completion, individual scan results of each tool 120 may be combined into a unified finding view and presented by the deduplication system 110.

The screenshot 700 also shows the ability for admins to configure specific scanners. This may be automatically done as components are enrolled, but can be overridden by admins. As shown in FIG. 7, next to that configuration, scores are shown. This set of three scores are outcomes of most scan recent results. The first score represents a combined static analysis result. The second score represents a combined open source license analysis. The third score represents open source known vulnerabilities.

FIG. 8 illustrates a screenshot 800 of the example graphical user interface 262 of the deduplication system 110, according to an example implementation. The screenshot 800 shows findings after each scan has finished. These findings are an aggregate scan result of multiple software security analysis tools 120. As shown in the screenshot 800, the first finding (e.g., a sensitive data exposure—hardcoded secret) was found by both two software security analysis tools: tool A and tool B. For examples, tool A may refer to Checkmarx™, and tool B may refer to Fortify on Demand™ (FOD). The shown results are filterable based on a category and name assigned to each result or finding. In some embodiments, the category and name may be based on a common internal taxonomy that may not directly correspond to a finding output by any one or more tools. After each tool yield its finding, the deduplication system 110 may through its de-duplication process determine that findings provided by each tool in fact refer to the same issue. Instead of creating separate records for the same issue, the deduplication system 110 may consolidate the findings by different tools as a single finding, as shown in the example of the first finding in FIG. 8.

The deduplication system 110 may unify various common fields, such as severity, category, and name to common internal taxonomy, rather than relying on CWE or some other external way to link them. The screenshot 800 illustrates a disposition side-bar where users may dispose findings, where disposition is handled across tools and across assessments/scans.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some implementations of the disclosed technology.

These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

Implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for performing code security scan, comprising:

one or more processors;
a graphical user interface (GUI); and
memory storing instructions that, when executed by the one or more processors, cause the one or more processors to:
receive code to be scanned;
analyze the code to be scanned with two or more software security analysis tools, each of the two or more software security analysis tools selected from a different category of a plurality of categories comprising a first category for performing Static Application Security Testing (SAST), a second category for performing Dynamic Application Security Testing (DAST), and a third category for performing Interactive Software Security Testing (IAST);
display, in the GUI, status information of the analysis from each of the two or more software security analysis tools, the status information comprising a selectable button to configure each of the two or more software security analysis tools;
receive a result from each of the two or more software security analysis tools; and
aggregate the result from each of the two or more software security analysis tools.

2. The system of claim 1, wherein the instructions further cause the one or more processors to:
determine that a license status is expired for at least one of the two or more software security analysis tools;
generate a license renewal request for the at least one software security analysis tool;
send, to a licensor of the at least one software security analysis tool, the license renewal request;
receive, from the licensor, a license renewal for the at least one software security analysis tool; and
update the license status for the at least one software security analysis tool to a renewed license status.

3. The system of claim 2, wherein the status information further comprises the license status, the licensor, and the renewed license status.

4. The system of claim 1, wherein the instructions further cause the one or more processors to:
display a request on the GUI comprising the first category, the second category, and the third category for the two or more software security analysis tools selected from a different category; and
receive a selection of the two or more software security analysis tools for execution on the code.

5. The system of claim 1, wherein the aggregation of the result from each of the two or more software security analysis tools displayed in the GUI comprises a severity, a category, and a name of the result.

6. The system of claim 1, wherein the instructions further cause the one or more processors to:
display, on the GUI, (i) the aggregation from each of the two or more software security analysis tools, and (ii) a confidence score for each of the two or more software security analysis tools;
identify at least one false positive result; and
instruct an additional software security analysis tool from each category to perform a security scan on the code associated with the false positive result.

7. The system of claim 1, wherein the aggregation of the result from each software security analysis tool displayed in the GUI further comprises:
a first score for a combined static analysis result;
a second score for open source license analysis; and
a third score for open source known vulnerabilities.

8. The system of claim 1, further comprising:
a scan database storing information of historical scan activity performed by each category of software security analysis tools.

9. The system of claim 8, wherein the instructions further cause the one or more processors to: receive a request for historical scan activity corresponding to one software security analysis tool from the two or more software security analysis tools; and provide, on the GUI, the historical scan activity.

10. The system of claim 1, wherein the status information comprises an execution progress for each of the two or more software security analysis tools, the execution progress comprising one or more of: completed, in progress, and queued.

11. A multi-tool orchestration system comprising:
one or more processors;
a graphical user interface (GUI); and
memory storing instructions that, when executed by the one or more processors, cause the one or more processors to:
receive, from a host server, an analysis request comprising software code to be scanned and two or more software security analysis tools to perform the scan, each of the two or more software security analysis tools selected from a different category of a plurality of categories comprising a first category for performing Static Application Security Testing (SAST), a second category for performing Dynamic Application Security Testing (DAST), and a third category for performing Interactive Software Security Testing (IAST);
analyze, with the two or more software security analysis tools, the software code;
display, on the GUI, status information of the analysis from each of the two or more software security analysis tools, the status information comprising a selectable button to configure each of the two or more software security analysis tools;
aggregate the analysis from each of the two or more software security analysis tools to create an aggregate result; and
provide, to the host server, the aggregate result for a presentation on a multi-tool security analysis website.

12. The system of claim 11, wherein the instructions further cause the one or more processors to:
determine that a license status is expired for at least one of the two or more software security analysis tools;
generate a license renewal request for the at least one software security analysis tool;
send, to a licensor of the at least one software security analysis tool, the license renewal request;
receive, from the licensor, a license renewal for the at least one software security analysis tool; and
update the license status for the at least one software security analysis tool to a renewed license status.

13. The system of claim 12, wherein the status information further comprises the license status, the licensor, and the renewed license status.

14. The system of claim 11, wherein the aggregation of the analysis from each software
security analysis tool displayed on the GUI further comprises:
a first score for a combined static analysis result;
a second score for open source license analysis; and
a third score for open source known vulnerabilities.

15. The system of claim 11, further comprising:
a scan database storing historical scan activity performed by each category of software security analysis tools.

16. The system of claim 15, wherein the instructions further cause the one or more processors to:
receive a request for historical scan activity corresponding to one software security analysis tool from the two or more software security analysis tools; and
provide, on the GUI, the historical scan activity.

17. The system of claim 11, wherein the instructions further cause the one or more processors to:
receive, from the host server, user configuration settings corresponding to at least one of the two or more software security analysis tools; and
configure the at least one software security analysis tool based on the user configuration settings.

18. A multi-tool security analysis system comprising:
one or more processors;
a graphical user interface (GUI); and
memory storing instructions that, when executed by the one or more processors, cause the one or more processors to:
receive an analysis request comprising software code to be scanned and two or more software security analysis tools, each of the two or more software security analysis tools being selected from different categories of a plurality of categories comprising a first category for performing Static Application Security Testing (SAST), a second category for performing Dynamic Application Security Testing (DAST), and a third category for performing Interactive Software Security Testing (IAST);
analyze, with the two or more software security analysis tools, the software code;
display, in the GUI, status information of the analysis from each of the two or more software security analysis tools, the status information comprising a selectable button to configure each of the two or more software security analysis tools;
receive, from the GUI, user configuration settings corresponding to at least one of the two or more software security analysis tools;
configure the at least one of the two or more software security analysis tools based on the user configuration settings;
aggregate a vendor-specific output from each of the two or more software security analysis tools to create an aggregate result;
send the aggregate result to a multi-tool security analysis website for presentation; and
display, on the GUI, (i) the aggregate result and (ii) a confidence score for each of the two or more software security analysis tools.

19. The system of claim 18, wherein the instructions further cause the one or more processors to:
determine that a license status is expired at least one of the two or more software security analysis tools;
generate a license renewal request for the at least one software security analysis tool;
send, to a licensor of the at least one software security analysis tool, the license renewal request;
receive, from the licensor, a license renewal for the at least one software security analysis tool; and
update the license status for the at least one software security analysis tool to a renewed license status.

20. The system of claim 18, wherein the instructions further cause the one or more processors to:
receive a request for historical scan activity corresponding to one software security analysis tool of the two or more software security analysis tools; and
provide, on the GUI, the historical scan activity.

* * * * *